(12) United States Patent
Miwa et al.

(10) Patent No.: US 6,285,825 B1
(45) Date of Patent: Sep. 4, 2001

(54) OPTICAL DISC, RECORDING APPARATUS, A COMPUTER-READABLE STORAGE MEDIUM STORING A RECORDING PROGRAM, AND A RECORDING METHOD

(75) Inventors: Katsuhiko Miwa, Moriguchi; Tomoyuki Okada, Katano; Tomotaka Yagi, Nishinomiya; Kazuhiro Tsuga, Takarazuka, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/425,973

(22) Filed: Oct. 25, 1999

Related U.S. Application Data

(62) Division of application No. 09/210,949, filed on Dec. 15, 1998, now abandoned.

(30) Foreign Application Priority Data

Dec. 15, 1997 (JP) .................................................. 9-344872
Oct. 20, 1998 (JP) ................................................ 10-298213

(51) Int. Cl.[7] ......................................................... H04N 5/91
(52) U.S. Cl. ................................. 386/98; 386/52; 386/126
(58) Field of Search ................................... 386/39, 45–46, 386/52, 54, 96, 98, 99, 104–106, 125–126; 348/480–485; H04N 5/91

(56) References Cited

U.S. PATENT DOCUMENTS 5,694,332  12/1997  Maturi .
5,751,280   5/1998  Abbott et al. .
5,892,848   4/1999  Nishiwaki et al. .
5,905,845   5/1999  Okada et al. .
5,936,925   8/1999  Yoshio et al. .

FOREIGN PATENT DOCUMENTS

| | | |
|---|---|---|
| 0677961 | 10/1995 | (EP) . |
| 0737975 | 10/1996 | (EP) . |
| 0795870 | 9/1997 | (EP) . |
| 0812108 | 12/1997 | (EP) . |
| 0847198 | 6/1998 | (EP) . |
| 7-334938 | 12/1995 | (JP) . |
| 8-339637 | 12/1996 | (JP) . |
| 9-252449 | 9/1997 | (JP) . |

*Primary Examiner*—Wendy R. Garber
*Assistant Examiner*—Vincent F. Boccio
(74) *Attorney, Agent, or Firm*—Wenderoth, Lind & Ponack, L.L.P.

(57) ABSTRACT

An optical disc records video objects that are obtained by multiplexing a video stream and an audio stream. The audio stream is an arrangement of a plurality of sets of audio frame data. Each video object unit in a video object is an arrangement of packs that have a different payload. The video stream and audio stream are divided using a predetermined size and the resulting data divisions are arranged into packs. At least one video object unit includes packs where stuffing bytes or a padding packet is arranged with part or all of a set of audio frame data so that the boundary with the next video object unit corresponds to a boundary between a boundary between sets of audio frame data. Since the boundary between video objects is made to match a boundary between sets of audio frame data, partial deletes that are performed with a video object unit as the smallest unit will not result in unnecessary parts of data remaining on the optical disc.

19 Claims, 33 Drawing Sheets

FIG. 2A
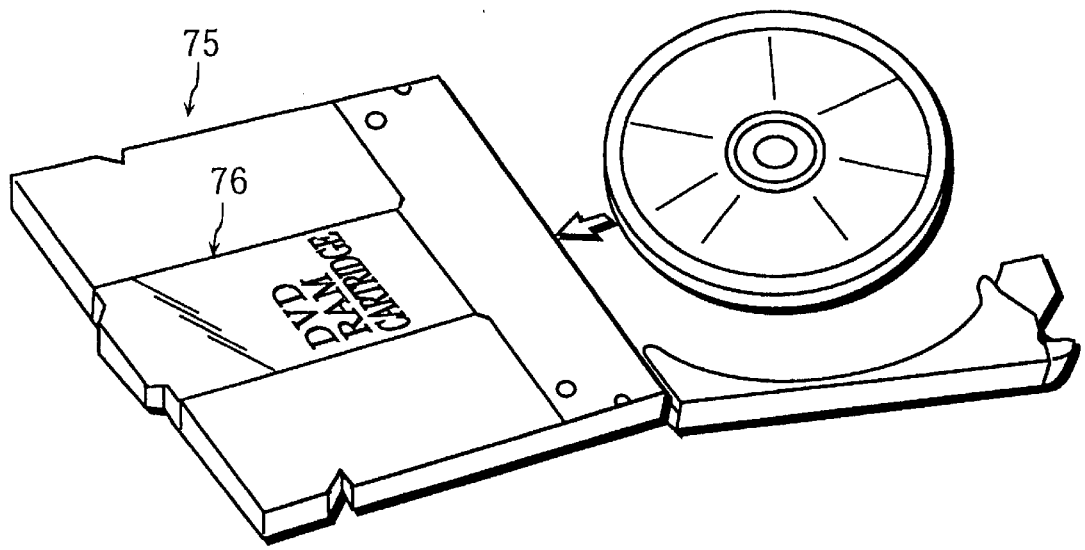
FIG. 2B
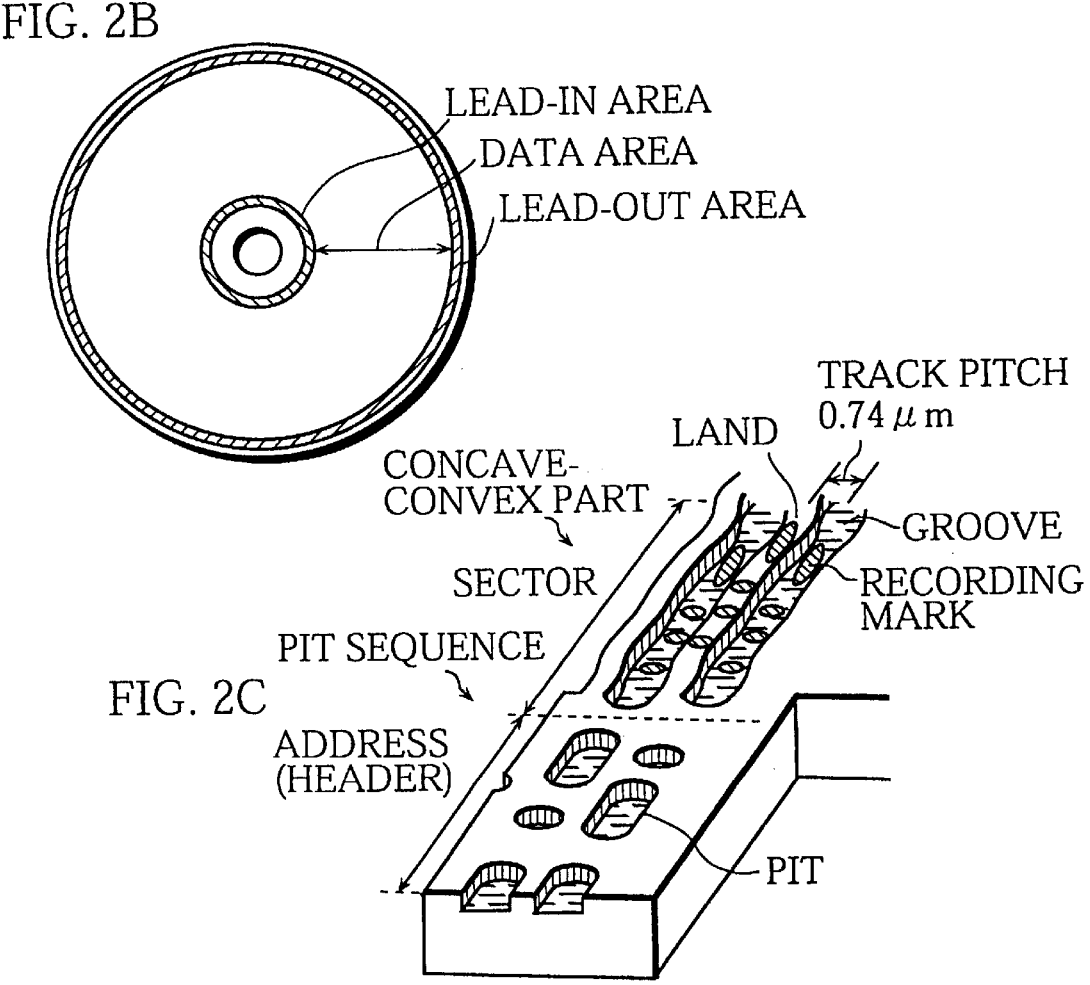
FIG. 2C

FIG. 3A
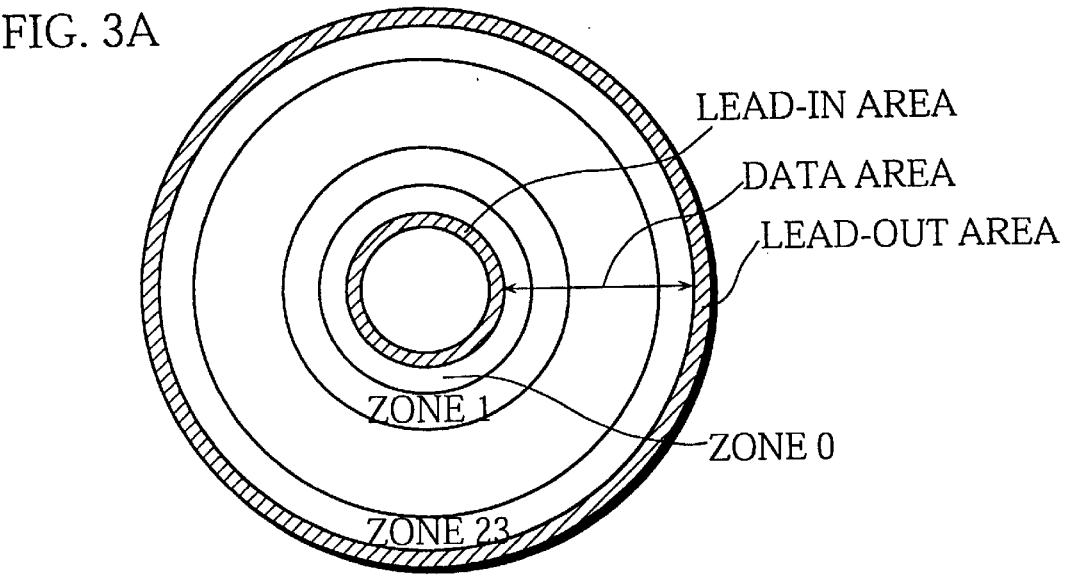
FIG. 3B
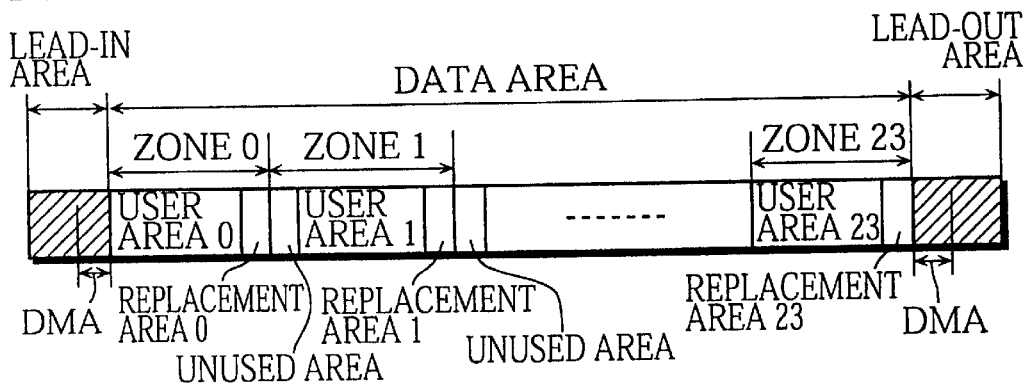
FIG. 3C
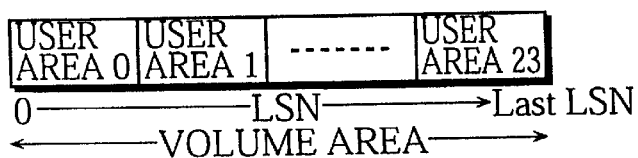
FIG. 3D
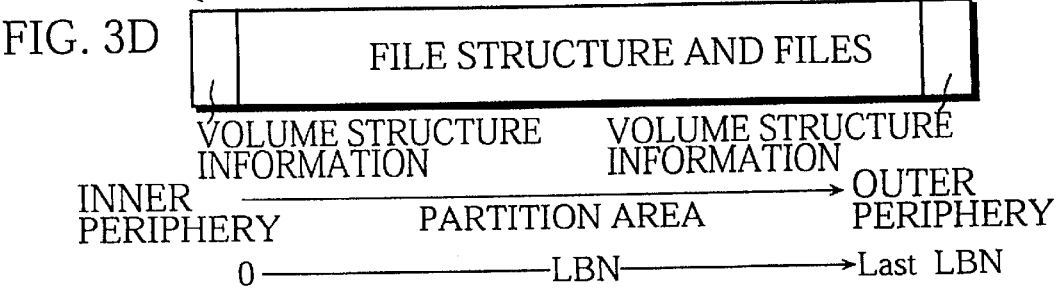

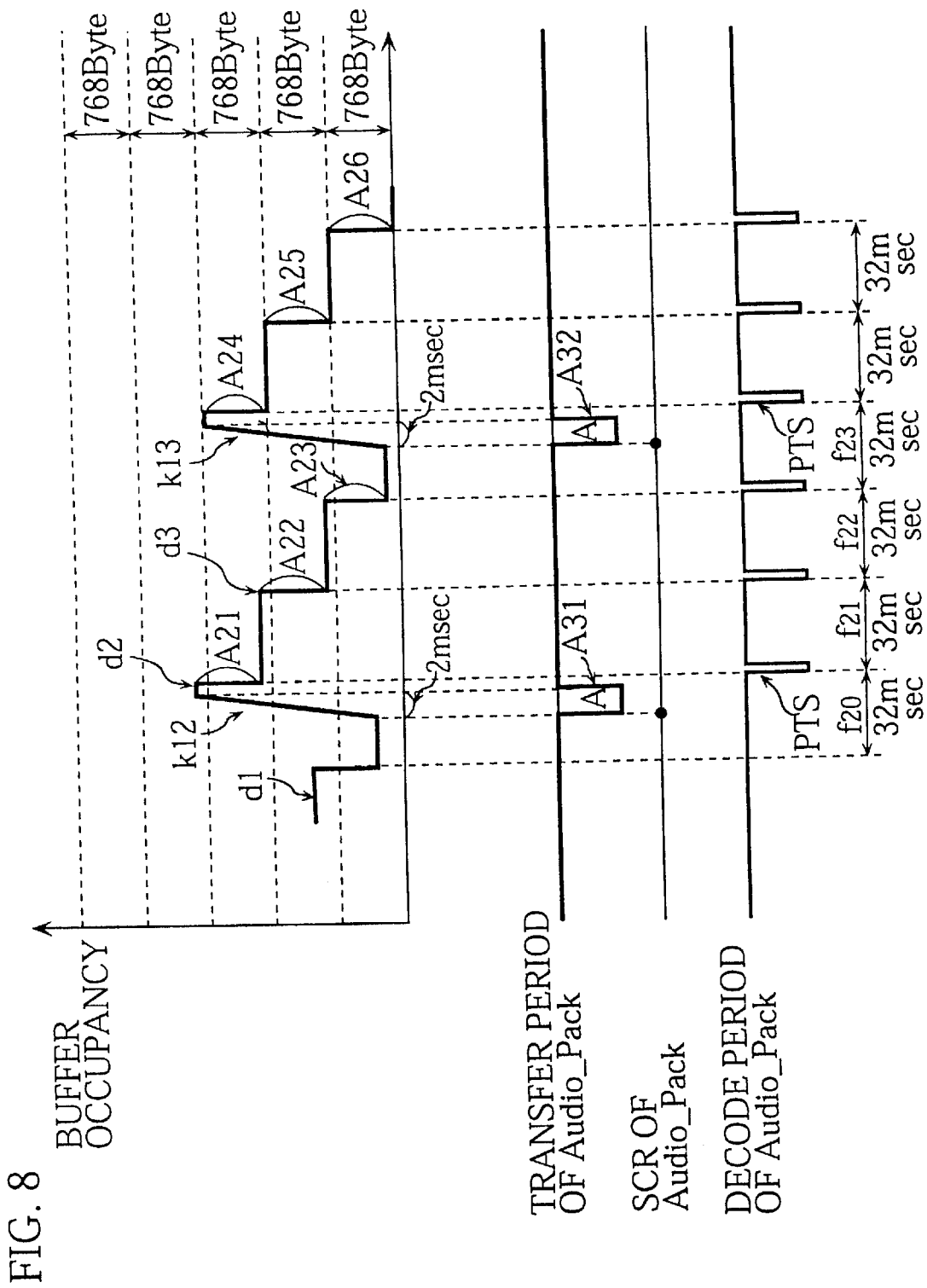

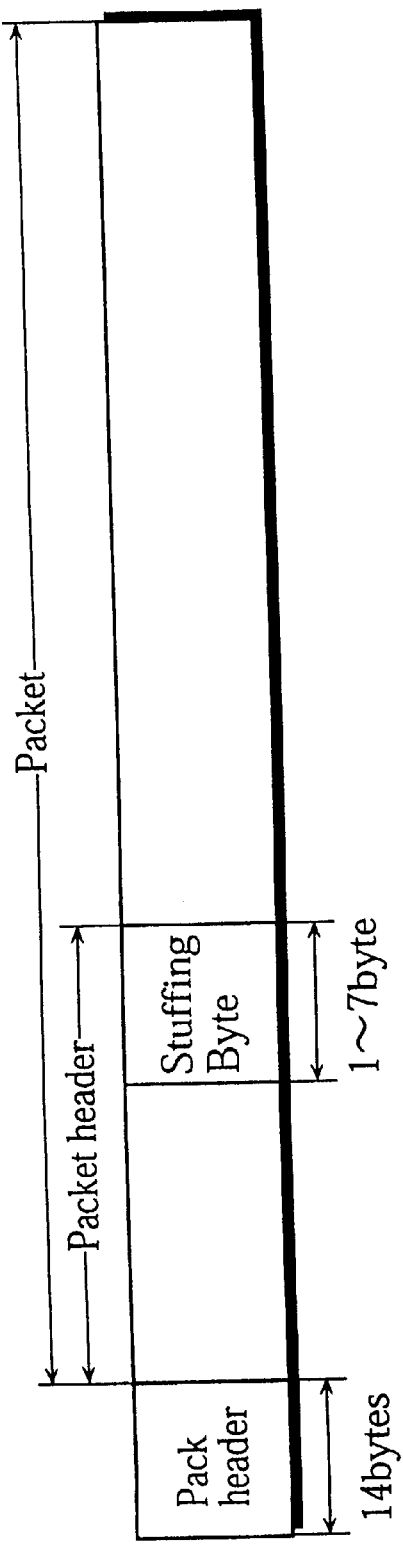
FIG. 13A  UNUSED SIZE 1~7byte
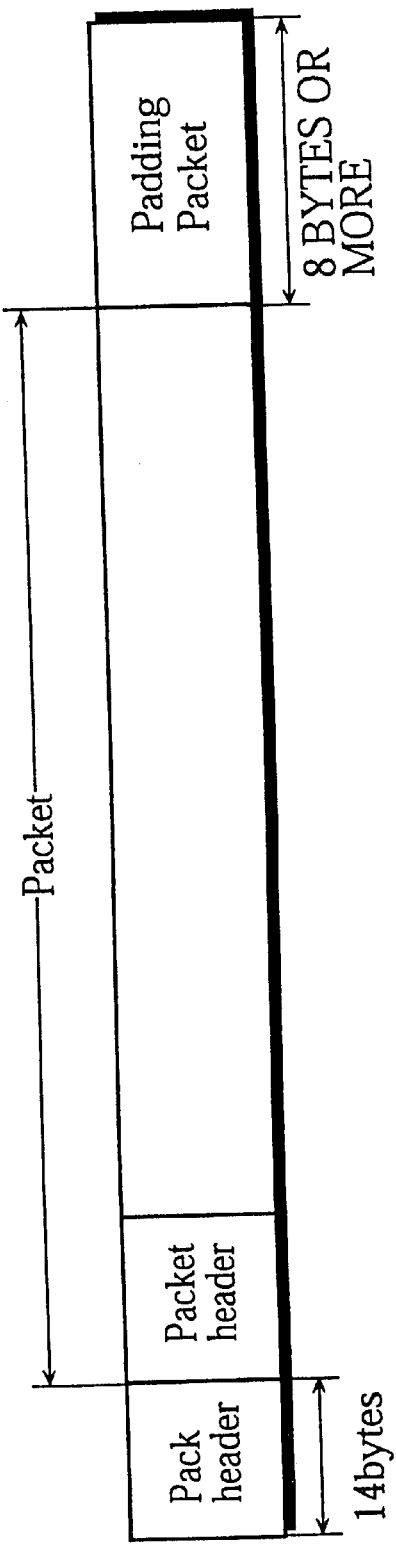
FIG. 13B  UNUSED SIZE 8 BYTES OR MORE

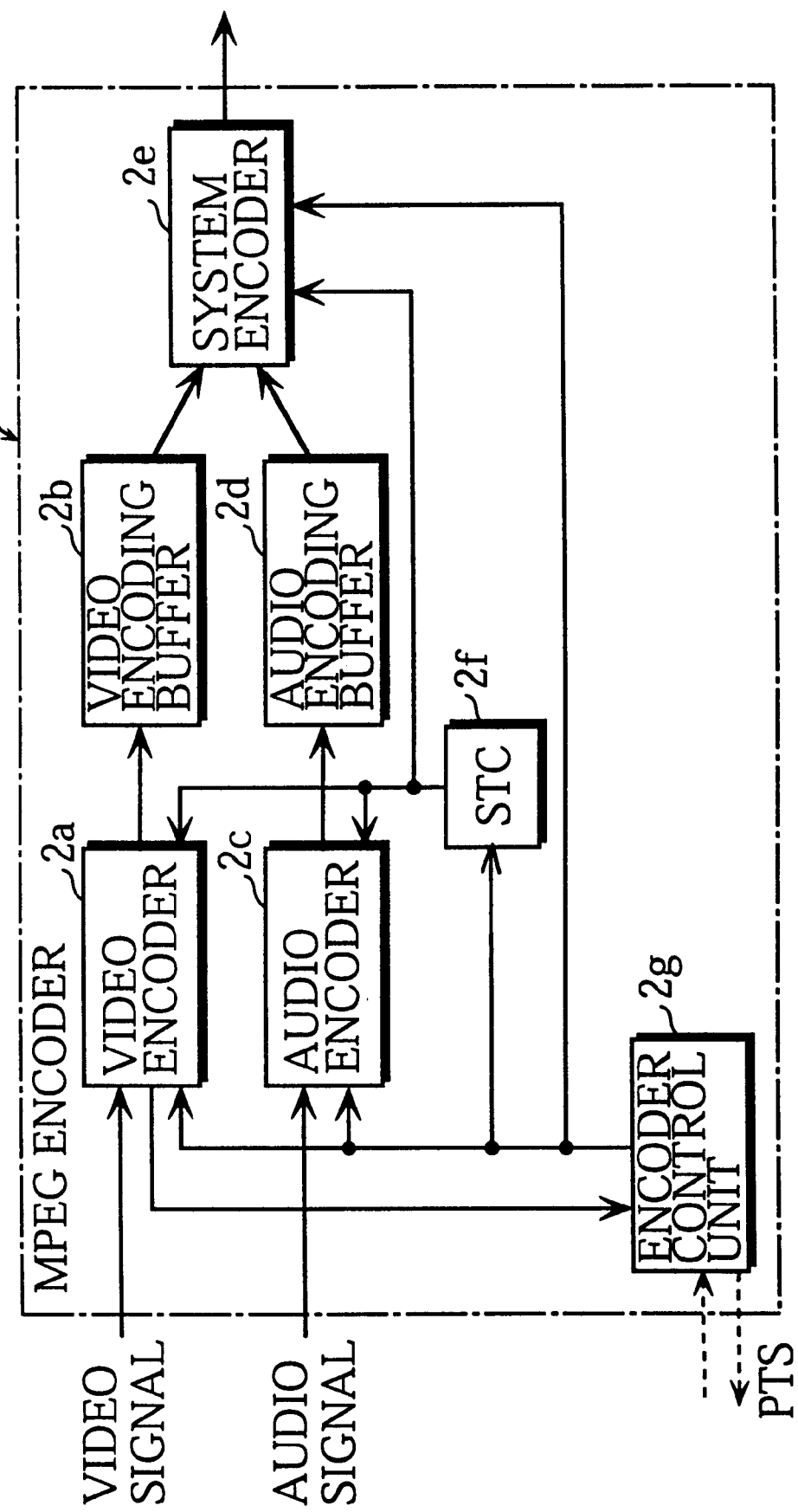

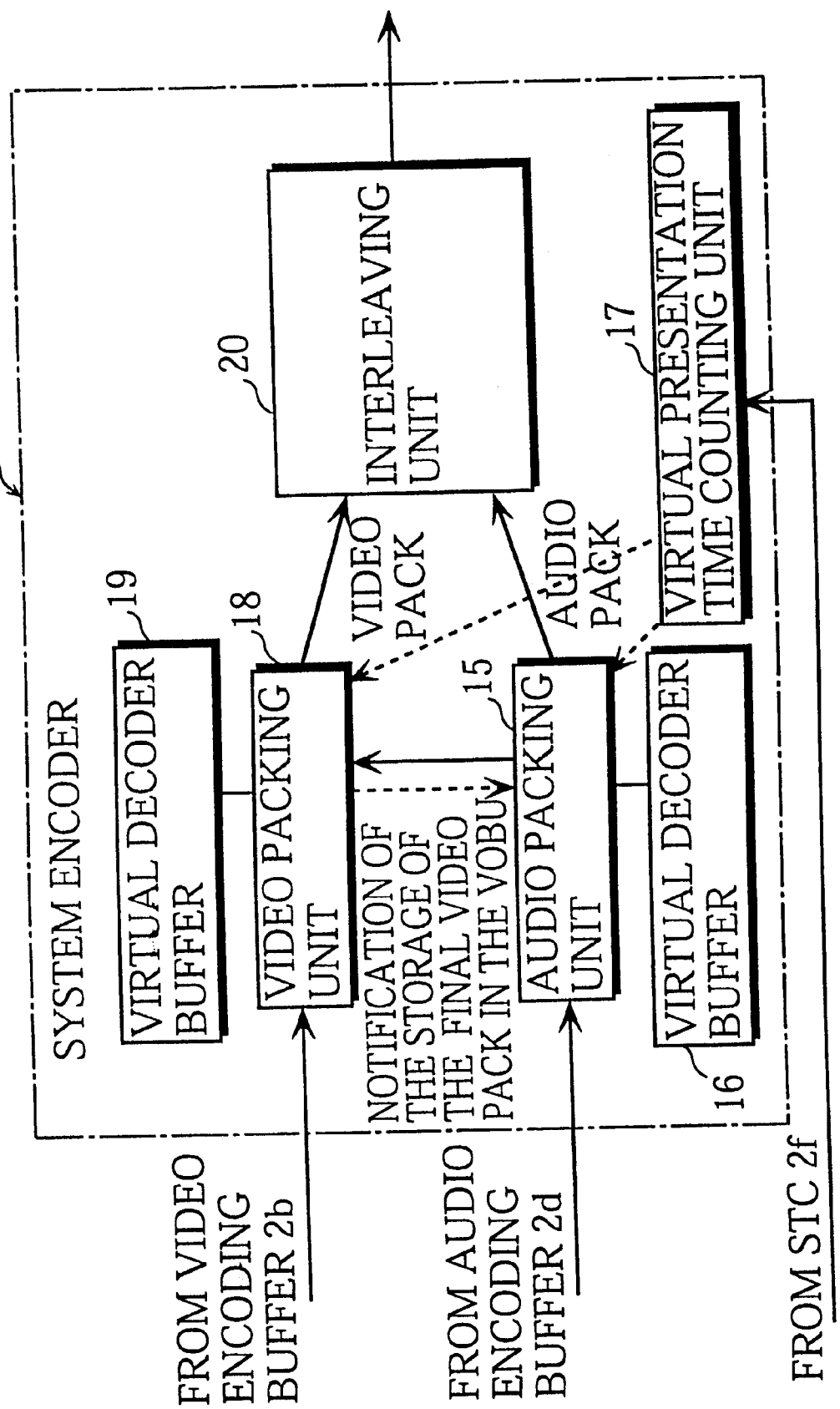

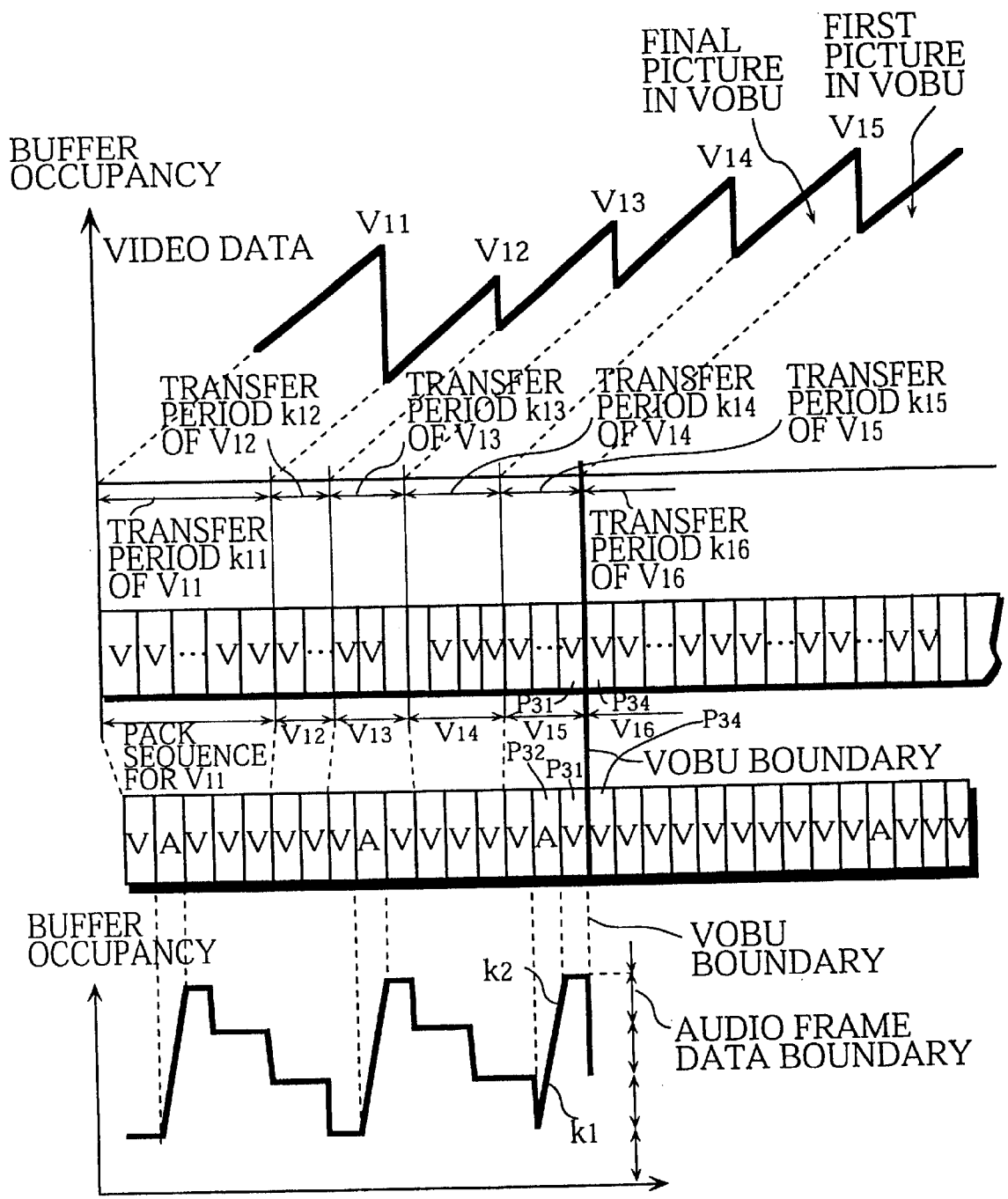

WHEN DELETED AREA IS LOCATED AT THE START OF THE DELETED AREA

WHEN DELETED AREA IS LOCATED AT THE END OF THE DELETED AREA

WHEN DELETED AREA IS LOCATED MIDWAY THROUGH THE DELETED AREA

OPTICAL DISC, RECORDING APPARATUS, A COMPUTER-READABLE STORAGE MEDIUM STORING A RECORDING PROGRAM, AND A RECORDING METHOD

This is a Divisional of Ser. No. 09/210,949, filed Dec. 15, 1998 now abandoned.

BACKGROUND OF THE INVENTION

1. Field of the Invention

The present invention relates to an optical disc that records MPEG (Moving Pictures Experts Group) streams in which video streams and audio streams have been multiplexed. The present invention also relates to a recording apparatus, and a computer-readable storage medium storing a recording program for the optical disc.

2. Description of the Background Art

Many movie and home movie fans are not satisfied with merely viewing video images and want to freely edit the content of recorded images.

When editing images, a user may delete an unwanted section from an MPEG stream that has been obtained by multiplexing one or more video streams and audio streams. Users may also change the reproduction order of an edited MPEG stream as desired.

File systems that handle MPEG streams like a computer handles files have been subject to increasing attention for their role in the realization of the editing functions described above. The term "file system" is a general name for a data construction for managing the areas on a random access storage medium, like a hard disk drive or an optical disc. As one example, file systems standardized under ISO/IEC (International Standardization Organization/International Electrotechnical Commission) 13346 are used to store MPEG streams in files.

In such a file system, the files that store MPEG streams are managed using management information called directory files and file entries. Of these, a file entry includes a separate allocation descriptor for each extent that composes a file. Each allocation descriptor includes a logical block number (LBN) showing the recording position of an extent in the file and an extent length showing the length of the extent. By updating the logical block numbers (LBN) and extent lengths, logical sectors on a disc medium can be set as "used" or "unused". This enables the user to partially delete data in units of logical sectors.

When a user partially deletes an MPEG stream where the minimum deletable unit is one logical sector of 2,048 bytes, decoding may not be possible for the resulting video stream and/or audio stream.

This problem is caused by the partial deletion being performed without consideration to the actual amount of MPEG stream data stored in each logical sector. For DVD Standard, data is recorded as compressed MPEG streams according to MPEG2 Standard. The data size of each pack to be recorded on a DVD is set equal to the logical sector size.

As a result, one pack in an MPEG stream is recorded in each logical sector. Here, a pack refers to a unit of data in an MPEG stream. Under MPEG, video streams and audio streams are divided into data divisions of a predetermined size. These data divisions are then converted into packets. A grouping of one or more packets is a pack. Packs are given time stamps for data transfer of the MPEG stream, making packs the unit used for data transfer. On a DVD, there is one-to-one correspondence between packs and packets. In this data construction, one packet exists within each pack. Video packs store divided data for three kinds of picture data, namely, Intra (I), Predicative (P), and Bidirectionally Predicative (B) pictures. An I picture results from compression of an image using spatial frequency characteristics within the image, without referring to other images. A P picture results from compression of an image using correlation with preceding images. A B picture results from compression of an image using correlation with both preceding and succeeding images.

When a partial deletion operation updates the management information, video packs that store one frame of picture data may be partially deleted. If B pictures or P pictures that refer to the partially deleted frame of picture data remain, decoding of such pictures will no longer be possible.

For audio, audio frame data for a plurality of frames is stored in one audio pack. Hereafter, the term "audio frame data" refers to the amount of audio data that is reproduced for one audio frame. This is generally called an "access unit". For an MPEG stream, this is the minimum unit for both decoding and reproduction output.

To give specific examples, Dolby-AC3 method uses a frame length of 32 msec for the encoded audio stream, while MPEG uses a frame length of 24 msec, and LPCM (Linear Pulse Code Modulation) uses a frame length of approximately 1.67 msec (1/600 sec to be precise). Since the bitrate when decoding audio frame data for Dolby-AC3 is 192 Kbps, the size of one set of audio frame data is 768 (32 msec*192 Kbps) bytes.

When loading audio frame data into packs, the payload size of a pack is subject to a maximum size of 2016 bytes. For Dolby-AC3, this is the non-integer value of 2.624 times the audio frame data size. Since the payload size is a non-integer multiple of the audio frame data size, dividing the audio stream into units of the payload size of the packs and storing the data divisions in order in packs will result in certain sets of audio frame data extending over a boundary between audio packs.

The upper part of FIG. 1 shows example audio frames. In FIG. 1, each section between the "<" and ">" symbols is an audio frame, with the "<" symbol showing the presentation start time and the ">" symbol showing the presentation end time. This notation for audio frames is also used in the following drawings. The audio frame data that should be reproduced (presented) for an audio frame is inputted into a decoder before the presentation start time of the audio frame. This audio frame data should be taken out of the buffer by the decoder at the presentation start time.

The lower part of FIG. 1 shows an example of how the audio frame data to be reproduced in each audio frame is stored in audio packs. In this figure, the audio frame data to be reproduced for audio frames f81, f82 is stored in audio pack A71, the audio frame data for audio frame f84 is stored in audio pack A72, and the audio frame data for audio frame f86 is stored in audio pack A73.

The audio frame data for audio frame f83 is divided between the audio pack A71 that comes first and the audio pack A72 that comes later. In the same way, the audio frame data for audio frame f85 is divided between the audio pack A72 that comes first and the audio pack A73 that comes later. The reason the audio frame data to be reproduced for one audio frame is divided and stored in two audio packs is that the boundaries between audio frames do not match the boundaries between packs. The reason that such boundaries do not match is that the data structure of packs under MPEG standard is totally unrelated to the data structure of audio streams.

If a partial deletion operation in logical sector (pack) units is performed by updating the file management information with a set of audio frame data extending over a pack boundary as shown in FIG. 1, a set of audio frame data that extends over a pack boundary that marks a boundary for the partial deletion will be changed. As a result, one part of the audio frame data will be located in a pack that is managed as "unused" while the other part will be located in a pack that is managed as "used". An example of a set of audio frame data that extends over a pack boundary is audio frame data f83 in FIG. 1.

MPEG standard stipulates that a continuous stream is reproduced from beginning to end and uses a model where the unit for decoding is one set of audio frame data. Accordingly, a decoder for MPEG standard performs decoding under the premise that the beginning and end of the continuous stream are the boundaries of a set of audio frame data. As a result, there is no guarantee that a decoder will be able to correctly decode an audio stream that includes sets of audio frame data whose beginning or end is missing. This is due to the loss of some of the audio frame data needed for the decoding.

To ensure that an MPEG stream can be properly decoded after a partial deletion, it is necessary to first read the MPEG stream before the partial deletion, to separate the MPEG stream into video packs and audio packs, and to re-encode the video stream in the area outside the deleted area in a way that ensures decoding will be possible. This re-encoding equates to a reconstructing of GOPs. On the other hand, the audio stream that is no longer needed is merely discarded, and the remaining audio streams are not re-encoded. Note that the discarded audio data includes the remaining parts of partially deleted sets of audio frame data.

After re-encoding, the audio packs and video packs are multiplexed again to produce an MPEG stream. This is then recorded on the storage medium and the management information is updated.

When partial deletion is performed in this way, the analysis of MPEG streams, re-encoding and re-multiplexing make hardware and software demands on a reproduction apparatus. This is to say, recording and/or reproduction apparatuses (hereinafter, "recording apparatuses") that do not include the required hardware and software are not able to perform partial deletion. Since there is a great variety of recording apparatuses that range from portable models to devices that are installed in personal computers, it cannot be said that all of such recording apparatuses are equipped with the required hardware and software.

In particular, many recording apparatuses that are installed in personal computers are only equipped with the hardware, software and file system that enable the reproduction of MPEG streams. If such specific hardware and software requirements exist for the realization of partial deletion operations, only certain types of recording apparatus will be able to perform partial deletion. This greatly limits the opportunities with which users of optical discs will be able to perform partial deletion operations.

SUMMARY OF THE INVENTION

It is a first object of the present invention to provide an optical disc that enables reproduction apparatus that only have a function for updating management information to perform the partial deletion of MPEG streams. At the same time, the present invention aims to provide a recording apparatus, a recording method, and a recording program that record these MPEG streams onto an optical disc.

The first object of the present invention can be achieved by an optical disc for recording video objects that are obtained by multiplexing a video stream including a plurality of sets of picture data and an audio stream including a plurality of sets of audio frame data, each video object comprising a plurality of video object units whose lengths are within a predetermined range, and each video object unit storing complete sets of picture data and complete sets of audio frame data.

With the stated construction, each video object unit includes a plurality of complete sets of audio frame data. Provided a partial deletion operation is performed in units of video object units, there is no risk of a partial deletion operation leaving a former or latter part of a set of audio frame data on the optical disc. Since no unwanted parts of audio frame data are left on the disc, the partial deletion of video objects can be performed without needing to re-encode the data on the optical disc. Since the partial deletion operation can be completed by merely updating the management information in units of video object units, partial deletion operations become possible for a wide variety of recording apparatuses.

Here, picture groups may be formed in the video stream, each picture group including at least one set of picture data that has been intra-encoded, and each video object unit may include at least one complete picture group.

With the stated construction, each video object unit includes a plurality of video packs that compose a picture group. A picture group includes a set of picture data that has been intra-frame encoded, so that as long as a recording apparatus performs a partial deletion operation in units of video object units, no picture data that depends on deleted data will be left on the optical disc. As a result, proper reproduction is guaranteed for the picture data that is left on the optical disc after the partial deletion operation. This means that recording apparatuses can simply perform partial delete operations by merely updating the management information in video object units.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2A shows the outward appearance of a DVD-RAM disc that is the recordable optical disc used in the embodiments of the present invention;

FIG. 2B shows the recording areas on a DVD-RAM;

FIG. 2C shows the cross-section and surface of a DVD-RAM cut at sector level;

FIG. 3A shows the zones 0 to 23 on a DVD-RAM;

FIG. 3B shows the zones 0 to 23 arranged into a horizontal sequence;

FIG. 3C shows the logical sector numbers (LSN) in the volume area;

FIG. 3D shows the logical block numbers (LBN) in the volume area;

FIG. 8 is a graph showing the buffer state of the audio decoder buffer;

FIGS. 13A and 13B show examples of packs in which padding packets and stuffing bytes have respectively been inserted;

FIG. 23A shows the construction the MPEG encoder 2;

FIG. 23B shows the internal construction of the system encoder 2e;

FIG. 24 is a representation of when a boundary between VOBUs matches a boundary between sets of audio frame data;

DESCRIPTION OF THE PREFERRED EMBODIMENTS

Figure 1:
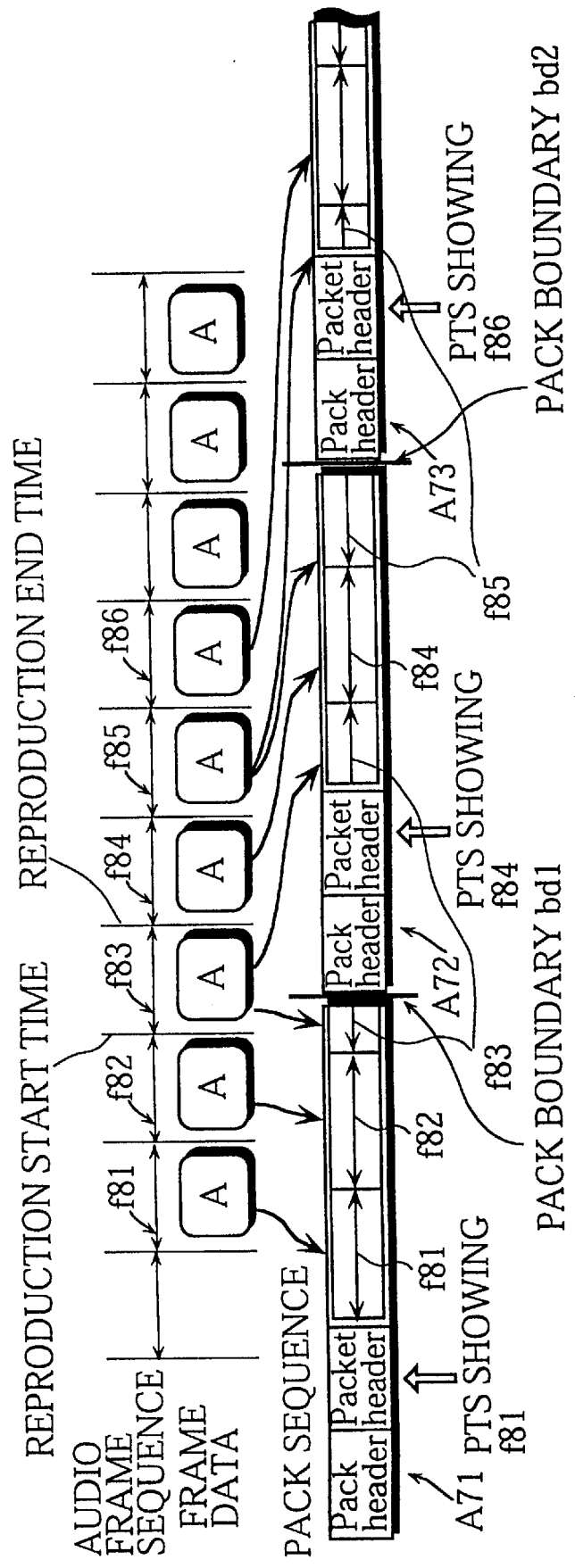
FIG. 1 shows how sets of audio frame data can extend over pack boundaries.

The following is an explanation of an optical disc and a recording apparatus that are embodiments of the present invention. This explanation refers to the accompanying drawings.

(1-1) Physical Structure of a Recordable Optical Disc

FIG. 2A shows the external appearance of a DVD-RAM disc that is a recordable optical disc. As shown in this drawing, the DVD-RAM is loaded into a recording apparatus having been placed into a cartridge 75. This cartridge 75 protects the recording surface of the DVD-RAM, and has a shutter 76 that opens and closes to allow access to the DVD-RAM enclosed inside.

FIG. 2B shows the recording area of a DVD-RAM disc. As shown in the figure, the DVD-RAM has a lead-in area at its innermost periphery, a lead-out area at its outermost periphery, and a data area in between. The lead-in area records the necessary reference signals for the stabilization of a servo during access by an optical pickup, and identification signals to prevent confusion with other media. The lead-out area records the same types of reference signals as the lead-in area. The data area, meanwhile, is divided into sectors that are the smallest unit for which access to the DVD-RAM is possible. Here, the size of each sector is set at 2 KB.

FIG. 2C shows the cross-section and surface of a DVD-RAM cut at the header of a sector. As shown in the figure, each sector includes a pit sequence that is formed in the surface of a reflective film, such as a metal film, and a concave-convex part.

The pit sequence includes 0.4 μm~1.87 μm pits that are carved into the surface of the DVD-RAM to show the sector address.

The concave-convex part includes a concave part called a "groove" and a convex part called a "land". Each groove and land has a recording mark composed of a metal film attached to its surface. This metal film is capable of phase change, meaning that the recording mark can be in a crystalline state or a non-crystalline state depending on whether the metal film has been exposed to a light beam. Using this phase change characteristic, data can be recorded into the concave-convex part. While it is only possible to record data onto the land part of an MO (Magnetic-Optical) disc, data can be recorded onto both the land and the groove parts of a DVD-RAM. This means that the recording density of a DVD-RAM exceeds that of an MO disc. Error correction information is provided on a DVD-RAM for each group of 16 sectors. In this specification, each group of 16 sectors that is given an ECC (Error Correcting Code) is called an ECC block.

On a DVD-RAM, the data area is divided to several zones to realize rotation control called Z-CLV(Zone-Constant Linear Velocity) during recording and reproduction.

FIG. 3A shows the plurality of zones provided on a DVD-RAM. As shown in the figure, a DVD-RAM is divided to 24 zones numbered zone 0~zone 23. Each zone is a group of tracks that are accessed using the same angular velocity In this embodiment, each zone includes 1888 tracks. The rotational angular velocity of the DVD-RAM is set separately for each zone, and is higher the closer a zone is located to the inner periphery of the disc. Division of the data area into zones ensures that the optical pickup can move at a constant velocity while performing access within a single zone. This raises the recording density of the DVD-RAM and facilitates rotation control during recording and reproduction.

FIG. 3B shows a horizontal arrangement of the lead-in area, the lead-out area, and the zones 0–23 that are shown in FIG. 3A.

The lead-in area and lead-out area each include a defect management area (DMA). This defect management area records position information showing the positions of sectors that include defects and replacement position information showing whether the sectors used for replacing defective sectors are present in any of the replacement areas.

Each zone has a user area, in addition to a replacement area and an unused area that are provided at the boundary with the next zone. A user area is an area that the file system can use as a recording area. The replacement area is used to replace defective sectors when such defective sectors are found. The unused area is an area that is not used for recording data. Each unused area only includes two tracks and is provided to prevent mistaken identification of sector addresses. The reason for this is that while sector addresses are recorded at a same position in adjacent tracks within the same zone, for Z-CLV the recording positions of sector addresses are different for adjacent tracks at the boundaries between zones.

In this way, sectors that are not used for data recording exist at the boundaries between zones. On a DVD-RAM, logical sector numbers (LSN) are consecutively assigned to physical sectors of the user area in order starting from the inner periphery. These LSN show only the sectors used for recording data. As shown in FIG. 3C, the area that records user data and includes sectors that have been assigned an LSN is called the volume area.

(1-2) Data Recorded in the Volume Area

Figure 4A:
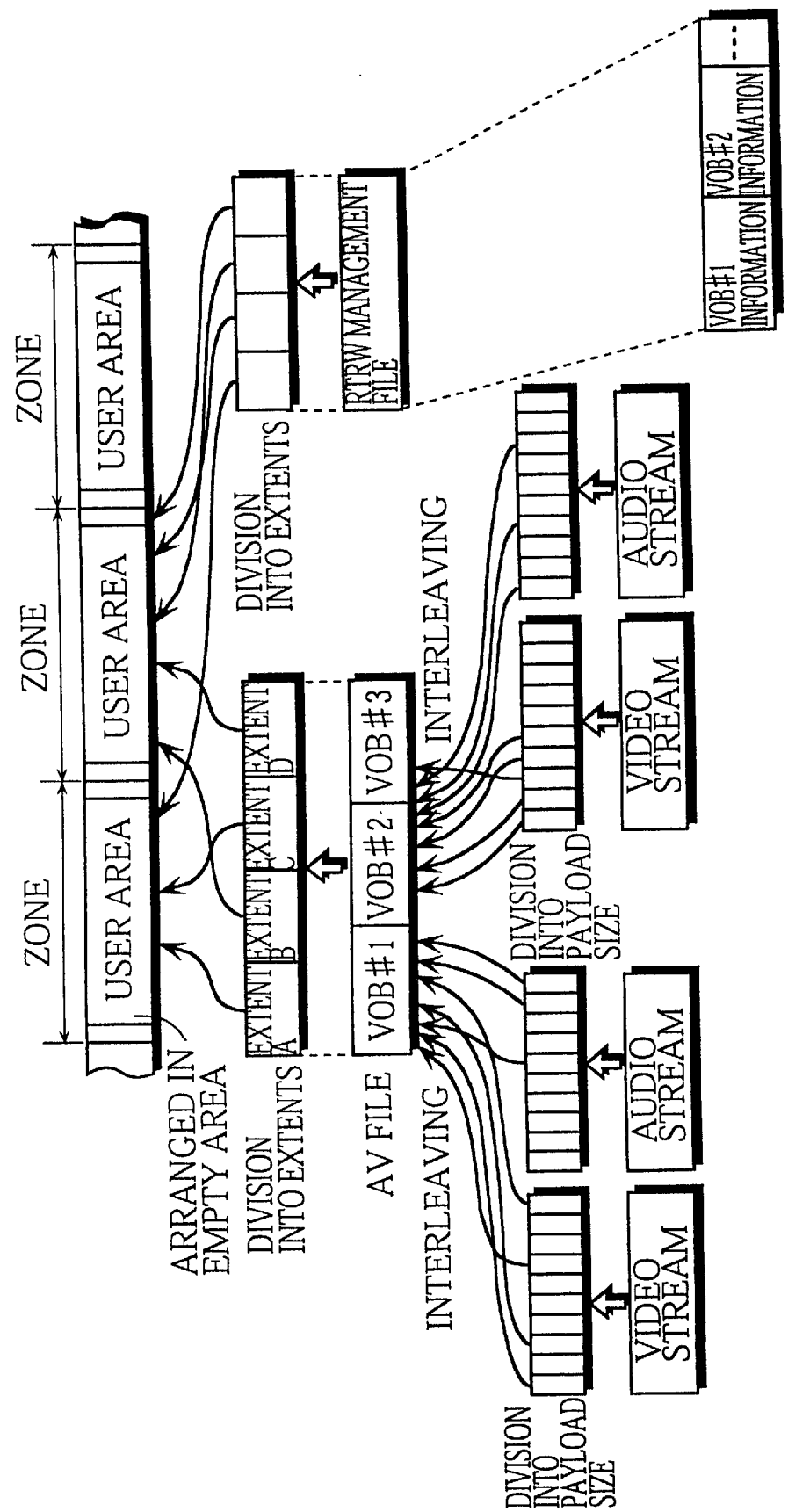
FIG. 4A shows the contents of the data recorded in the volume area.

FIG. 4A shows the content of the data recorded in the volume area of a DVD-RAM.

The volume area is used for recording AV files that are each composed of a plurality of VOBs (video objects) and an RTRW (RealTime ReWritable) management file that is the management information for the AV files.

The fifth (lowest) level in FIG. 4A shows the video stream and audio stream. These streams are divided into the payload size of a packet, as shown on the fourth level. Data divisions produced by this division are stored in video packs and audio packs according to MPEG standard. These packs are multiplexed into the video objects VOB #1, VOB #2 in the AV file shown on the third level. The AV file is divided into a plurality of extents according to ISO/IEC 13346, as shown on the second level. These extents are each recorded in an unused area in a zone area in the volume area, as shown on the top level. Note that none of the extents crosses a zone boundary.

These AV files and RTRW management files are managed using directory files and file entries that have been standardized under ISO/IEC 13346. For the example shown in FIG. 4A, the AV file that stores VOB #1, VOB #2, and VOB #3 is divided into the extents A, B, C, and D. These extents are stored in zone areas, so that the file entry for an AV file includes allocation descriptors for the extents A, B, C, and D. The extents produced by dividing an AV file are called AV blocks. Each AV block has a data size that ensures that a data underflow will not occur in a buffer, called a track buffer, provided for disc access in a recording apparatus.

Figure 4B:
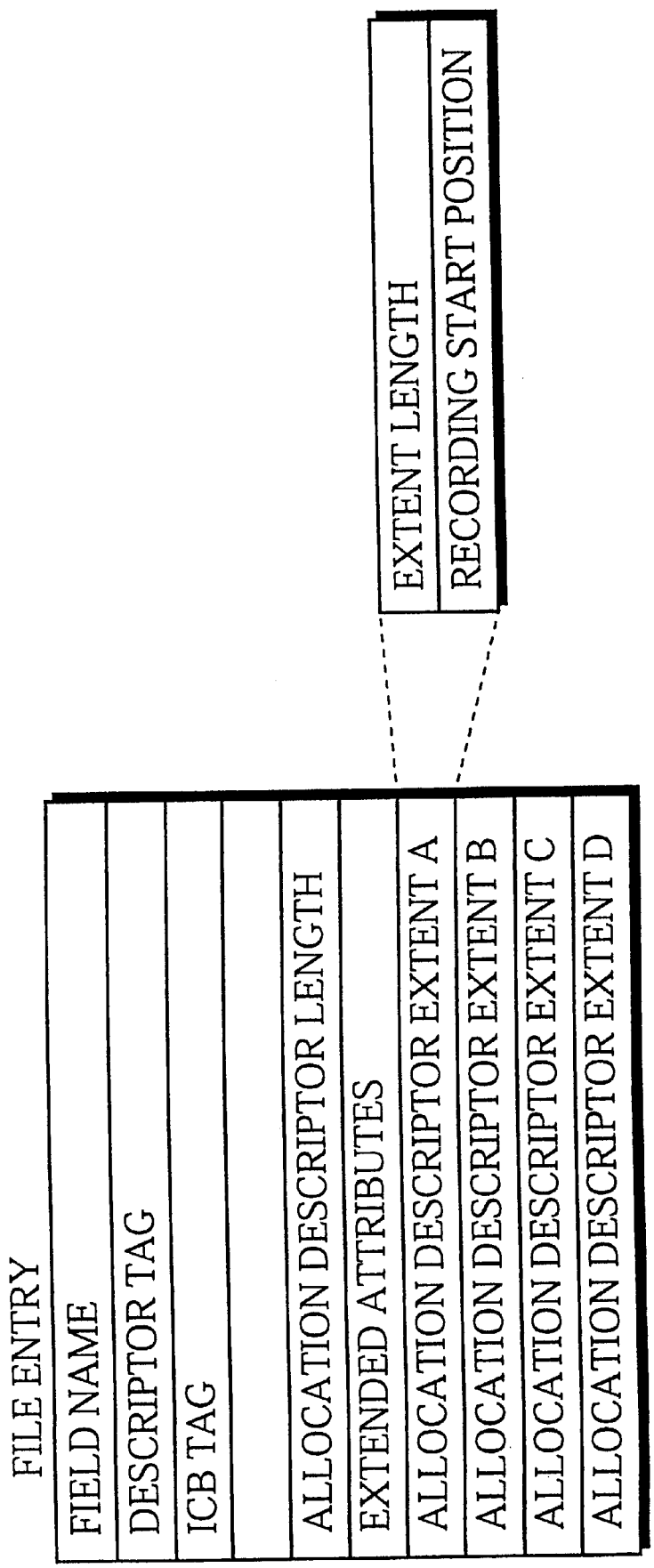
FIG. 4B shows an example data structure of a file entry.

FIG. 4B shows an example data structure of a file entry. In FIG. 4B, a file entry includes a descriptor tag, an ICB tag, an allocation descriptor length, expanded attributes, and allocation descriptors corresponding to each of extents A, B, C, and D.

The descriptor tag is a tag showing that the present entry is a file entry. For a DVD-RAM, a variety of tags are used, such as the file entry descriptor and the space bitmap descriptor. For a file entry, a value "261" is used as the descriptor tag indicating a file entry.

The ICB tag shows attribute information for the file entry itself.

The expanded attributes are information showing the attributes with a higher-level content than the content specified by the attribute information field in the file entry.

The data construction of an allocation descriptor is shown on the right-hand side of FIG. 4B. Each allocation descriptor includes an extent length and a logical block number that shows the recording start position of the extent. The logical sectors on a DVD-RAM that are occupied by an extent are managed as "used", while logical sectors that are not occupied by a valid extent are managed as "unused".

On the other hand, information relating to VOB #1 to VOB #3 is recorded in the RTRW management file as the VOB #1 information, the VOB #2 information, and the VOB #3 information, as shown on the sixth level of FIG. 4A. Like the AV files, the RTRW management file is divided into a plurality of extents that are recorded in the volume area.

(1-2-1) Video Stream

Figure 5:
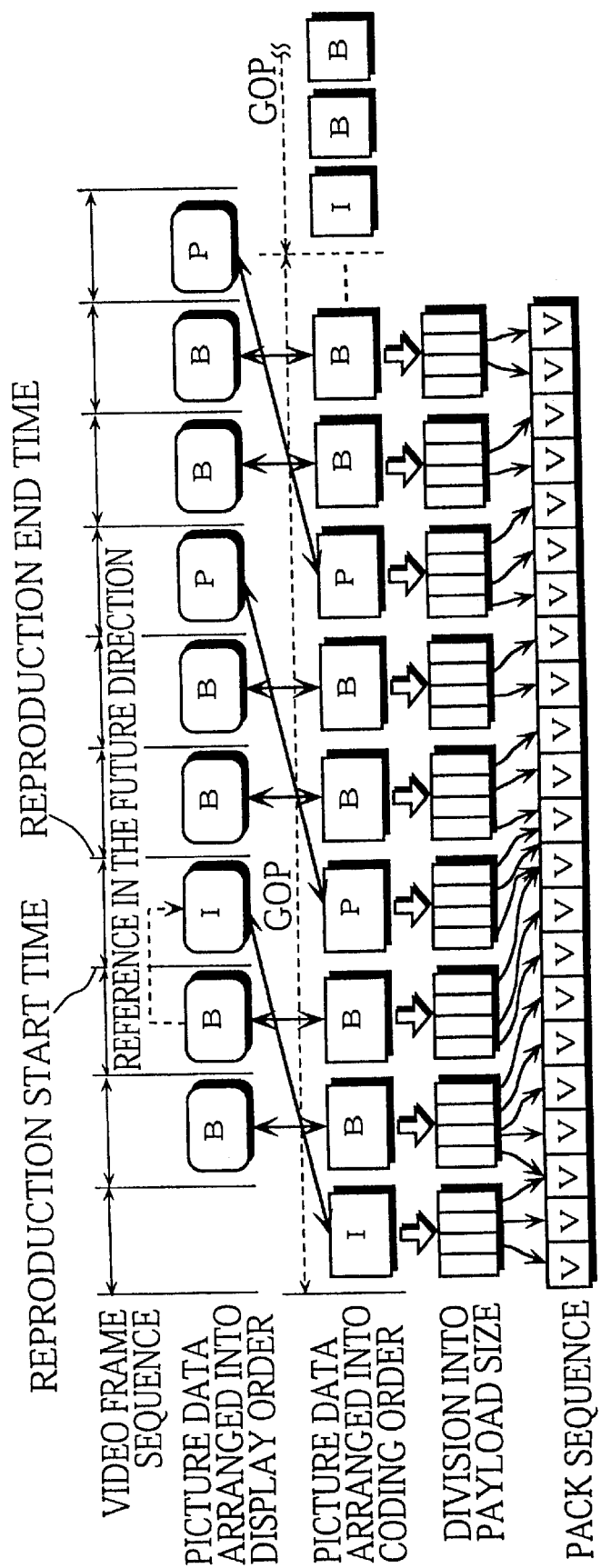
FIG. 5 shows a plurality of sets of picture data arranged in display order and a plurality of sets of picture data arranged in coding order.

The video stream shown in FIG. 5 is an arrangement of a plurality of sets of picture data that each correspond to one frame of video images. This picture data is a video signal according to NTSC (National Television Standards Committee) or PAL (Phase-Alternation Line) standard that has been compressed using MPEG techniques. Sets of picture data produced by compressing a video signal under NTSC standard are displayed by video frames that have a frame interval of around 33 msec ($\frac{1}{29.97}$ seconds to be precise). Sets of picture data produced by compressing a video signal under PAL standard are displayed by video frames that have a frame interval of 40 msec. The top level of FIG. 5 shows examples of video frames. In FIG. 5, the sections indicated between the "<" and ">" symbols are video frames, with the "<" symbol showing the presentation start time (Presentation_Start_Time) for each video frame and the ">" symbol showing the presentation end time (Presentation_End_Time). This notation for video frames is also used in the following drawings. The sections enclosed by these symbols each include a plurality of video fields.

Compression according to MPEG standards uses the spatial frequency characteristics within the image of one frame and the time-related correlation with images that are displayed before or after the frame. Each set of picture data is converted into one of a Bidirectionally Predicative (B) Picture, a Predicative (P) Picture, or an Intra (I) Picture. FIG. 5 shows B pictures, P pictures, and I pictures as all having the same size, although there is in fact great variation in their sizes.

When decoding B pictures or P pictures that use the time-related correlation between frames, it is necessary to refer to the images that are reproduced before or after the picture being decoded. For example, all images referred to by a B picture need to be completely decoded before the decoding of the B picture can be performed.

As a result, an MPEG video stream defines the coding order of pictures in addition to defining the display order of the pictures. In FIG. 5, the second and third levels respectively show the sets of picture data arranged in display order and in coding order.

When a sequence of only B pictures and P pictures is used, problems can be caused by special reproduction features that perform decoding starting midway through the video stream. To prevent such problems, an I picture is inserted into the video data at 0.5 s intervals. Each sequence of picture data starting from an I picture and continuing as far as the next I picture is a GOP (Group Of Pictures). Such GOPs are defined as the unit for MPEG compression. On the third level of FIG. 5, the dotted vertical line shows the boundary between the present GOP and the following GOP. In each GOP, the picture type of the last picture data in the display order is usually a P picture, while the picture type of the first picture data in the coding order is always an I picture.

1-2-2 Data Structure of VOBs

The VOBs (Video Objects) #1, #2, #3 ... shown in FIG. 4A are program streams under ISO/IEC 13818-1 that are obtained by multiplexing a video stream and audio stream. VOBs do not have a program_end_code at the end.

Figure 6A:
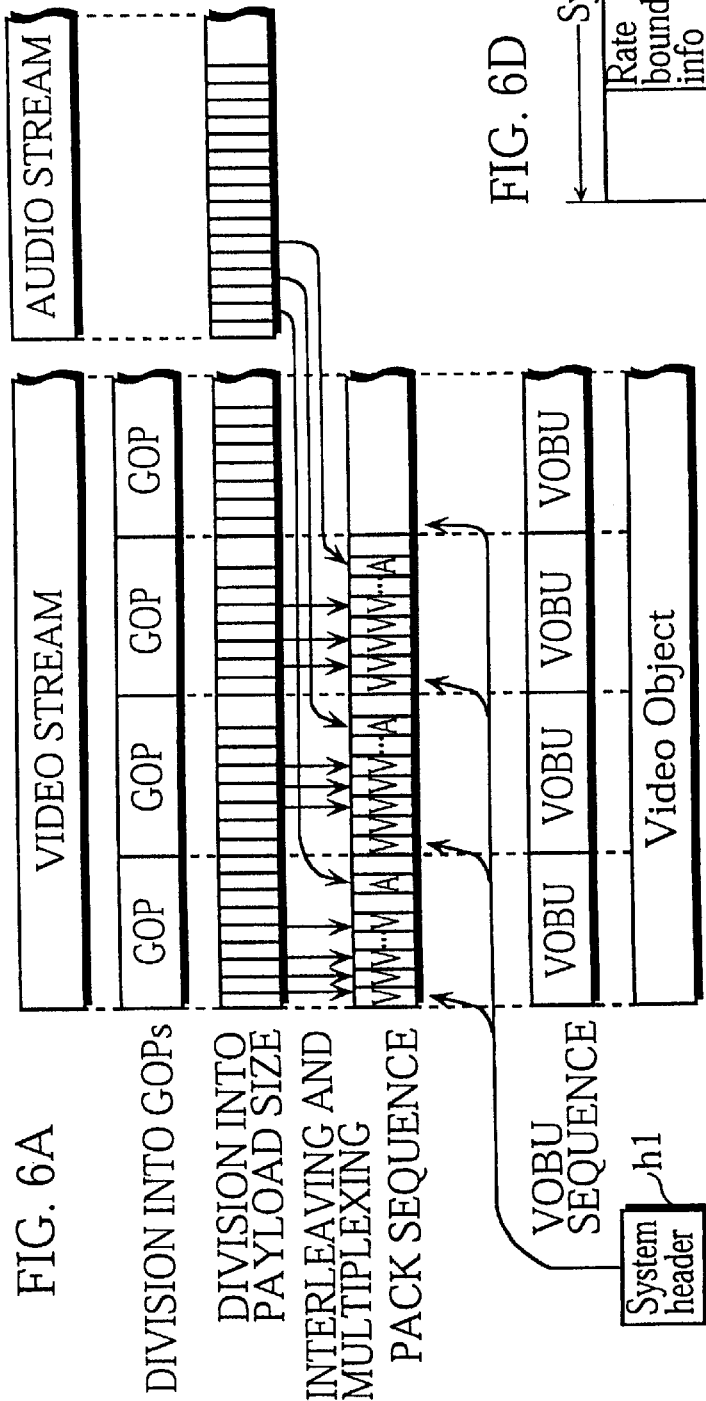
FIG. 6A shows a detailed hierarchy of the logical formats in the data construction of a VOB (Video Object)

FIG. 6A shows the detailed hierarchy for the logical construction of VOBs. This means that the logical format located on the top level of FIG. 6A is shown in more detail in the lower levels.

The video stream that is located on the top level in FIG. 6A is shown divided into a plurality of GOPs on the second level. These GOPs are the same as in FIG. 5, so that the picture data in GOP units has been converted into packs. The audio stream shown on the right of the top level in FIG. 6A is converted into packs on the third level, in the same way as in FIG. 5. The divided picture data for a GOP unit is multiplexed with the audio stream that has been divided in the same way. This produces the pack sequence on the fourth level of FIG. 6A. This pack sequence forms a plurality of VOBUs (Video Object Units) that are shown on the fifth level. The VOBs (Video Objects) shown on the sixth level are composed of a plurality of these VOBUs arranged in a time series. In FIG. 6A, the broken guidelines show the relations between the data in the data structures on adjacent levels. From the guidelines in FIG. 6A, it can be seen that the VOBUs on the fifth level correspond to the pack sequence on the fourth level and the picture data in GOP units on the second level.

As can be seen by tracing the guidelines, each VOBU is a unit that includes at least one GOP that has picture data with a reproduction period of around 0.4 to 1.0 second, as well as audio frame data that a recording apparatus should read from the DVD-RAM at the same time as this picture data. The unit called a GOP is defined under MPEG Video Standard (ISO/IEC 13818-2). Since a GOP only specifies picture data, as shown on the second level of FIG. 6A, the audio data and other data (such as sub-picture data and control data) that are multiplexed with this picture data are not part of the GOP. Under DVD-RAM standard, the expression "VOBU" is used for a unit that corresponds to a GOP, and is the general name for at least one GOP including picture data with a reproduction period of around 0.4 to 1.0 second and the audio data that has been multiplexed with this picture data.

The arrangement of video packs and audio packs in a VOBU is recorded as it is as a sequence of logical sectors on a DVD-RAM. Accordingly, the data stored in these packs will be read from the DVD-RAM in this order. This means that this arrangement of video packs and audio packs is the order in which the data inside the packs is read from a DVD-RAM. Each video pack has a storage capacity of around 2 KB. Since the data size of the video stream in one VOBU can be several hundred kilobytes, the video stream will be divided into several hundred video packs.

The following is an explanation of how a recording apparatus identifies the start of a VOBU. In FIG. 6A, a system header h1 is given, with the arrows that extend from this system header indicating the video packs located at the start of each VOBU. This system header includes a variety of parameters that are required when decoding streams. The arrows show that a system header is stored in the first pack in each VOBU. These system headers act as separators between VOBUs in the data sequence.

(1-2-2-1) Data Construction of the Audio Packs

Figure 6B:
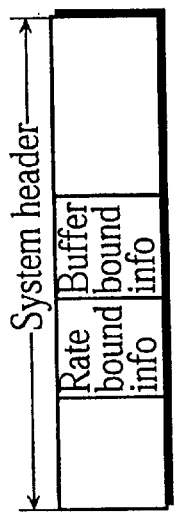
FIG. 6B shows the logical format of a video pack that is arranged at the front of a VOBU.

FIG. 6B shows the logical format of a video pack arranged at the start of a VOBU. As shown in FIG. 6B, the first video pack in a VOBU is composed of a pack header, a system header, a packet header, and video data that is part of the video stream.

Figure 6D:
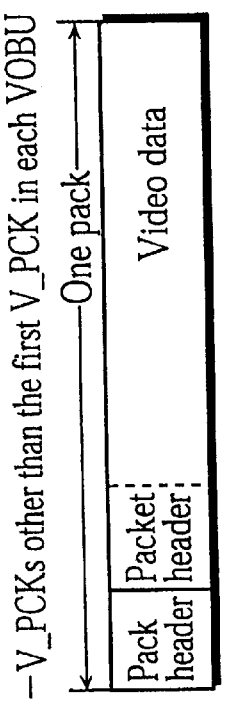
FIG. 6D shows the logical format of a system header.
Figure 6C:
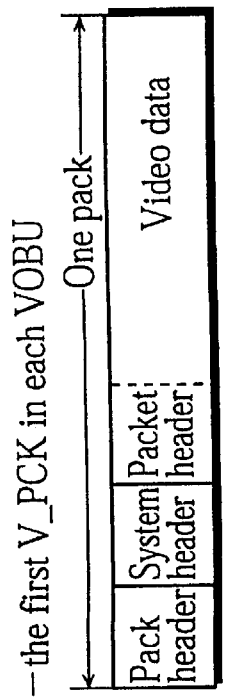
FIG. 6C shows the logical format of a video pack that is not arranged at the front of a VOBU.

FIG. 6C shows the logical format of the video packs that do not come first in the VOBU. As shown in FIG. 6C, these video packs are each composed of a pack header, a packet header, and video data, with no system header.

FIG. 6D shows the logical format of the system header. The system header shown in FIG. 6D is only appended to the video pack that is located at the start of a VOBU. This system header includes maximum rate information (shown as the "Rate.bound.info" in FIG. 6D) and buffer size information (shown as "Buffer.bound.info"). The maximum rate information shows the transfer rate to be requested of the reproduction apparatus when inputting the data. The buffer size information (shown as "Buffer.bound.info" in FIG. 6D) shows the highest buffer size to be requested of the reproduction apparatus when inputting the data in the VOB.

The following is a description of the data construction of each pack. Note that the data construction of video packs is not part of the gist of the present invention. Accordingly, only the data construction of audio packs will be explained.

Figure 7A:
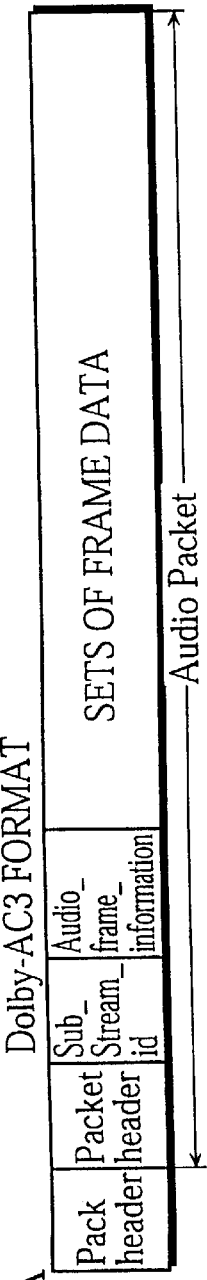
FIG. 7A shows the logical format of an audio pack for Dolby-AC3 methods.

FIG. 7A shows the logical format of an audio pack for Dolby-AC3 format. As shown in FIG. 7A, each audio pack includes a pack header, a packet header, a sub_stream_id showing whether the compression technique for the audio stream in this pack is Linear-PCM or Dolby-AC3, audio frame information, and a plurality of sets of audio frame data that have been compressed using the compression technique indicated by the sub_stream_id.

Figure 7B:
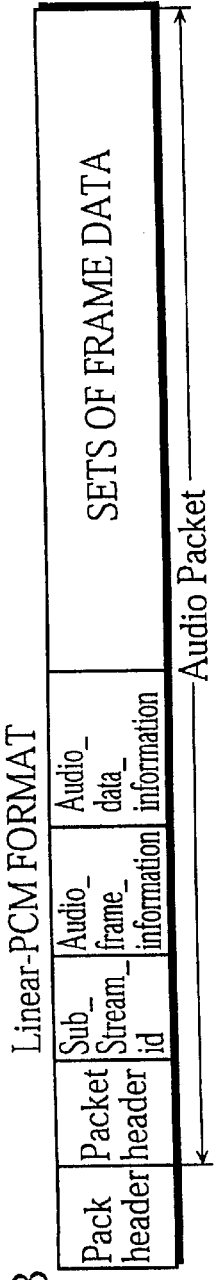
FIG. 7B shows the logical format of an audio pack for Linear-PCM methods.

FIG. 7B shows the logical format of an audio pack for Linear-PCM methods. As shown in FIG. 7B, each Linear-PCM audio pack has the same elements as a Dolby-AC3 audio pack with the addition of audio frame data information. This audio frame data information includes the following:

1. an audio_emphasis_flag showing whether emphasis is on or off;
2. an audio_mute_flag showing whether an audio mute is on or off;
3. an audio_frame_number for writing a frame number of the audio frame that is the first audio frame in the pack in an audio frame group (GOF);
4. a quantization_word_length showing the word length when an audio frame sample has been quantized;
5. an audio_sample_length showing the audio sampling frequency;
6. a number_of_audio_channels that may be set at monaural, stereo, and dual monaural; and
7. a dynamic_range_control that compresses the dynamic_range starting from the first access unit.

Figure 7C:
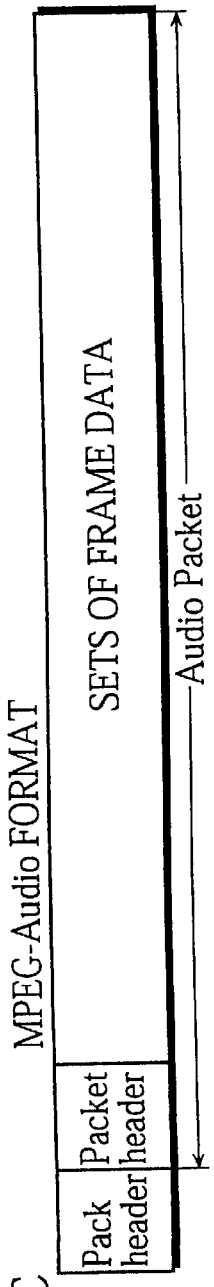
FIG. 7C shows the logical format of an audio pack for MPEG-Audio methods.

FIG. 7C shows the logical format of audio packs under MPEG-Audio methods. As shown in FIG. 7C, each pack of MPEG-Audio has the same elements as the packs in Dolby-AC3, but with no sub_stream_id or audio frame data information.

Figure 7D:
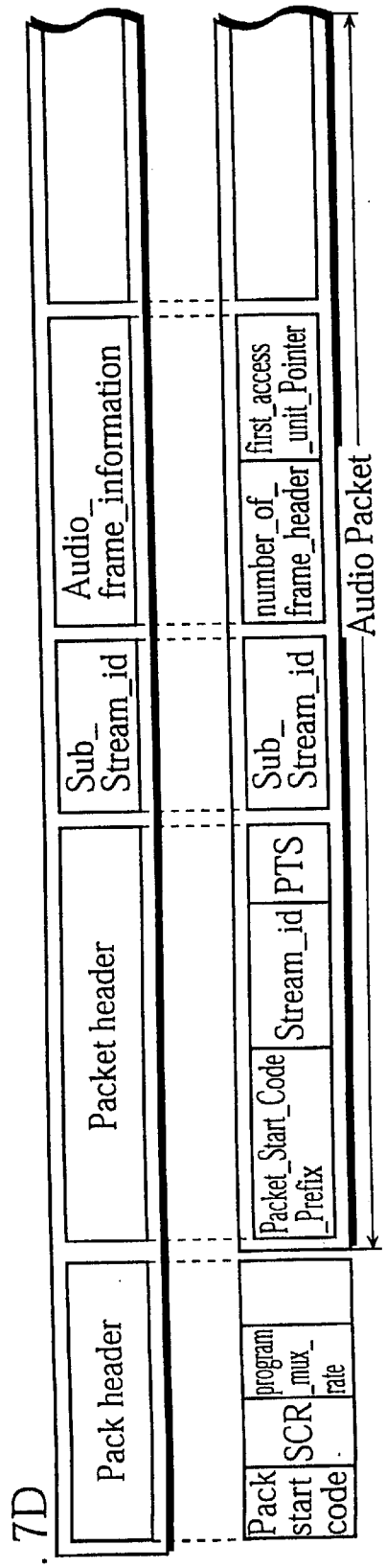
FIG. 7D shows the logical format of a pack header, a packet header, and the audio frame information.

FIG. 7D shows the logical format of a pack header, a packet header, and the audio frame information.

The pack header shown in FIG. 7D includes a Pack_Start_Code, an SCR (System Clock Reference), and a Program_mux_rate. Of these, the SCR shows the time at which the audio frame data in the present pack should be inputted into the decoder buffer (hereinafter, the "audio decoder buffer") provided for the audio stream. In a VOB, the first SCR is the initial value of the STC (System Time Clock) that is provided as a standard feature in a decoder under MPEG standard.

As shown in FIG. 7D, the packet header includes a "packet_start_code_prefix" that is the first code in a packet, a "stream_ID" that is set at the fixed value for a private stream, and a PTS (Presentation Time Stamp) that shows at what time the audio frame data should be outputted.

The audio frame data information includes the "number_of_frame_headers" that gives the number of audio frames in the present audio pack and the "first_access_pointer" that gives the relative number of blocks between this audio frame data information and the first byte in the first access unit (audio frame).

(1-2-2-2) Buffer State of the Audio Decoder Buffer

The following is an explanation of the changes in the internal state of the audio decoder buffer when a PTS or SCR is assigned to a pack header or packet header.

FIG. 8 is a graph showing the buffer state of the audio decoder buffer. In this figure, the vertical axis represents buffer occupancy and the horizontal axis represents time.

The gradient of the inclined sections k11, k12, and k13 in FIG. 8 represents the transfer rate of an audio pack. This transfer rate is the same for each audio pack. The respective heights of the inclined sections k11, k12, and k13 show the amount of audio frame data that is transferred to the audio decoder buffer by each audio pack. Overall, the payload of each audio pack will be filled with audio frame data, so that the height of each of the inclined sections k11, k12, and k13 is 2,016 bytes.

The respective widths of the inclined sections k11, k12, and k13 show the transfer period of one pack, while the respective start positions of the inclined sections k11, k12, and k13 in the horizontal axis show the SCR assigned to each pack.

For the example of Dolby-AC3, the transfer rate to the audio decoder buffer is 384 Kbps for two audio streams and 192 Kbps for one audio stream. The payload size of each pack is 2,016 bytes, so that the transfer period for one pack is 2 msec (=2,016 bytes*8/8 Mbps). This means that the transfer of the 2,016 bytes of audio frame data in the payload of one pack is completed in around 0.0625 (=2 msec/32 msec) times the reproduction period of the pack.

The stepped parts d1, d2, and d3 show the reductions in buffer occupancy of the audio decoder buffer due to the outputting and decoding of accumulated audio frame data at the respective presentation start times of audio frames represented by the audio frame data. The positions of the stepped parts d1, d2, and d3 in the horizontal axis show the PTS assigned to each pack.

The audio pack A31 shown in FIG. 8 stores the audio frame data A21, A22, and A23 that should be decoded at the presentation end times of the audio frames f20, f21, and f22. Of these sets of audio frame data, the audio frame data A21 is decoded at the presentation start time of the audio frame f21, before the audio frame data A22 and A23 are respectively decoded at the presentation start times of the audio frames f22 and f23.

Of the audio frames stored in the audio pack A31, the audio frame data A21 is the first to be decoded. This audio frame data should be decoded at the presentation start time of the audio frame f21, so that the audio pack A31 needs to be read from the DVD-RAM by the end of the presentation period of the audio frame f20. Consequently, the audio pack A31 that includes the audio frame data A21, A22, and A23 is given an SCR that shows an input time that precedes the presentation start time of the audio frame f21.

(1-2-2-3) Buffer State for the Video Stream

The following is an explanation of the changes in the internal state of a decode buffer provided for video streams (hereinafter, the "video buffer") due to the assigning of the time stamps PTS, DTS, and SCR in pack headers and packet headers.

Video streams are encoded with variable code length due to the large differences in code size between the different types of pictures (I pictures, P pictures, and B pictures) used in compression methods that use time-related correlation. Video streams also include a large amounts of data, so that it is difficult to complete the transfer of the picture data to be reproduced, especially the picture data for an I picture, between the decoding time of the video frame that was decoded immediately before and the decoding start time of this I picture, which is to say during the reproduction period of one video frame.

Figure 9A:
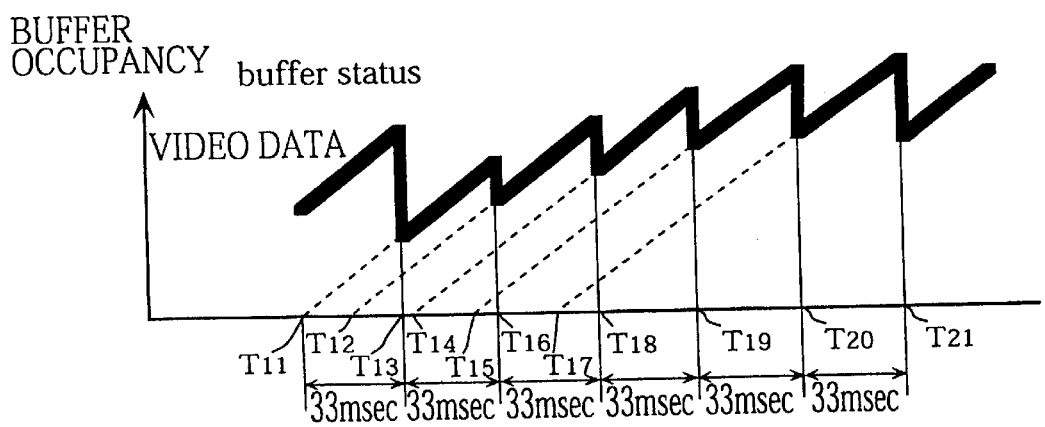
FIG. 9A is a graph showing the buffer state of the video buffer.

FIG. 9A is a graph showing video frames and the occupancy of the video decoder buffer. In FIG. 9A, the vertical axis represents the occupancy of the video decoder buffer, while the horizontal axis represents time. This horizontal axis is split into 33 msec sections that each match the reproduction period of a video frame under NTSC standard. By referring to this graph, it can be seen that the occupancy of the video decoder buffer changes over time to exhibit a sawtooth pattern.

The height of each triangular tooth that composes the sawtooth pattern represents the amount of data in the part of the video stream to be reproduced in each video frame. As mentioned before, the amount of data in each video frame is not equal, since the amount of code for each video frame is dynamically assigned according to the complexity of the frame.

The gradient of each triangular tooth shows the transfer rate of the video stream. The approximate transfer rate of the video stream is calculated by subtracting the output rate of the audio stream from the output rate of the track buffer. This transfer rate is the same during each frame period.

During the period corresponding to one triangular tooth in FIG. 9A, picture data is accumulated with a constant transfer rate. At the decode time, the picture data for the present frame is instantly outputted from the video decoder buffer. The reason a sawtooth pattern is achieved is that the processing from the storage in the video decoder buffer to output from the video decoder buffer is continuously repeated. The DTS given to each video pack shows the time at which the video data should be outputted from the video decoder buffer.

As shown in FIG. 9A, to maintain the image quality of complicated images, larger amounts of code need to be assigned to frames. When a larger amount of code is assigned to a frame, this means that the pre-storage of data in the video decoder buffer needs to be commenced well before the decode time.

Normally, the period from the transfer start time, at which the transfer of picture data into the video decoder buffer is commenced, to the decode time for the picture data is called the VBV (Video Buffer Verify) delay. In general, the more complex the image, the larger the amount of assigned code and the longer the VBV delay.

As can be seen from FIG. 9A, the transfer of the picture data that is decoded at the decode time T16 starts at time T11. The transfer of picture data that is decoded at the decode time T18, meanwhile, starts at time T12. The transfer of the other sets of picture data that are decoded at times T14, T15, T17, T19, T20, and T21 can similarly be seen to start before these decode times.

(1-2-2-4) Transfer Period of Each Set of Picture Data

Figure 9B:
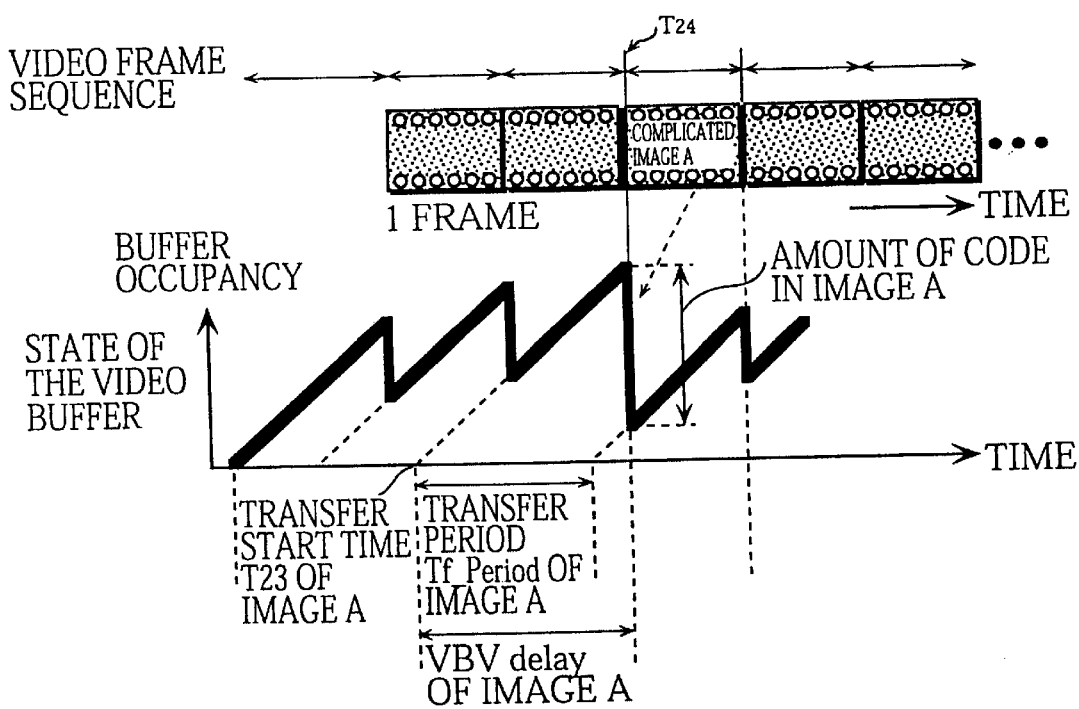
FIG. 9B is a graph showing the transfer period of each set of picture data.

FIG. 9B shows the transfer of sets of picture data in more detail. When considering the situation in FIG. 9A, the transfer of the picture data to be decoded at time T24 in FIG. 9B needs to be completed in the "Tf_Period" between the start time T23 of the "VBV delay" and the start of the transfer of the next picture data to be reproduced. The increase in the occupancy of the buffer that occurs from this Tf_Period onwards is due to the transfer of the following picture data.

The start time of the Tf_Period approximately equates to the SCR given in the first pack out of the packs that store divisions of the corresponding picture data. The end time of the Tf_Period approximately equates the SCR given to the first pack out of the packs that store divisions of the next picture data. This means that a Tf_Period is defined by the SCRs assigned to video packs.

The picture data accumulated in the video decoder buffer waits until the time T24 at which the picture data is to be decoded. At the decode time T24, the image A is decoded, which clears part of the picture data stored in the video decoder buffer, and thereby reduces the total occupancy of the video decoder buffer.

When considering the above situation, it can be seen that while it is sufficient for the transfer of audio frame data to start one frame in advance, the transfer of picture data needs to start well before the decode time of such picture data. In other words, the transfer of picture data should start well before the transfer of audio frame data that is decoded at approximately the same time. Putting this another way, when the audio stream and video stream are multiplexed into an MPEG stream, audio frame data is multiplexed with picture data that has a later decode time. As a result, the picture data and audio frame data in a VOBU are in fact composed of audio frame data and picture data that will be decoded after the audio frame data.

(1-2-2-5) Arrangement of Video Data and Audio Frame Data in Each Pack

Figure 10:
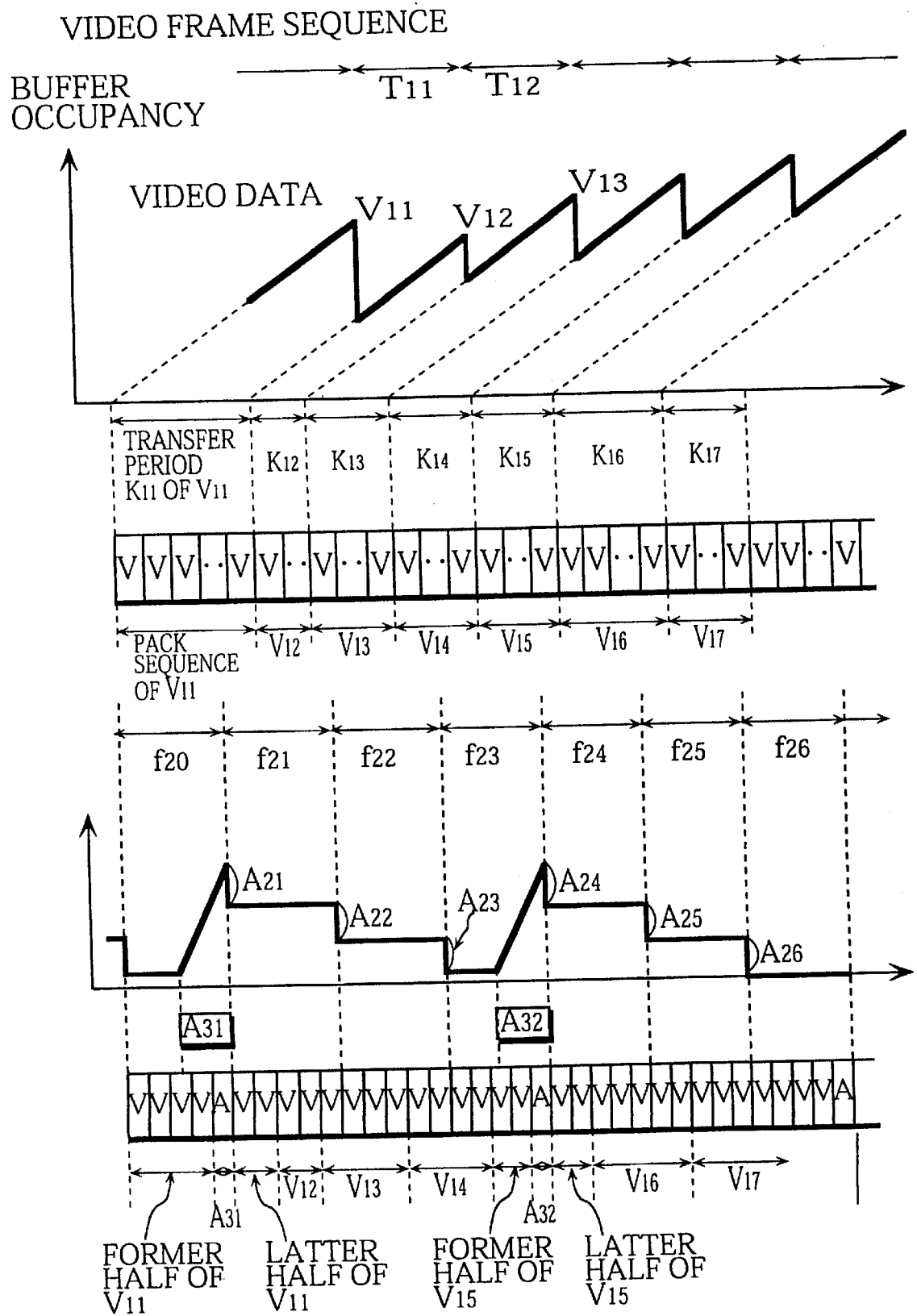
FIG. 10 shows how the audio packs that store the audio frame data reproduced in a plurality of audio frames and the video packs that store the picture data reproduced in each video frame should be recorded.

FIG. 10 shows how audio packs that store a plurality of sets of audio frame data and video packs that store a plurality of sets of picture data may be arranged. In FIG. 10, audio pack A31 stores the sets of audio frame data A21, A22, and A23 that are to be reproduced for f21, f22, and f23. Of the sets of audio frame data in the audio pack A31, the first audio frame data to be decoded is the audio frame data A21. Since the audio frame data A21 needs to be decoded at the presentation end time of the audio frame f20, this audio data A21 needs to be multiplexed with the picture data V11 that is transferred during the same period (period k11) as the audio frame f20. As a result, the audio pack A31 is arranged near the video packs that store the picture data V11, as shown at the bottom of FIG. 10.

The audio pack A32 storing the sets of audio frame data A24, A25, and A26 that are respectively reproduced for f24, f25, and f26 should be multiplexed with the picture data V15 that is transferred at the same time (period k15) as the audio frame f23. As a result, the audio pack A32 is arranged near the video packs that store the picture data V15, as shown at the bottom of FIG. 10.

(1-2-2-6) Arrangement of Packs Near a VOBU Boundary

Since a VOBU is a data unit that includes one GOP, it can be understood that VOBU boundaries are determined based on GOP boundaries. When this is the case, a first problem is the amount of audio frame data stored in one VOBU. As shown in FIG. 10, the audio packs that store sets of audio frame data are arranged so as to be near video packs that store picture data that is reproduced sometime after the audio frame data. This means that the audio frame data that should be inputted into the decoder buffer at the same time as a GOP is stored in a same VOBU as the GOP.

A second problem is how to align the boundaries of sets of audio frame data with the boundaries of VOBUs since VOBUs are fundamentally determined based on GOPs. As stated earlier, each set of picture data is compressed using variable length encoding, so that GOPs have different sizes. Because of this, the number of audio packs that will be inputted into the decoder buffer at approximately the same time as the video packs for a GOP will vary between VOBUs. As result, in a VOB, some VOBUs have a payload for audio packs whose total size corresponds to an integer number of audio packs, while other VOBUs have a payload for audio packs whose total size corresponds to a non-integer number of audio packs. Ignoring differences in the number of audio packs, to align the boundaries of VOBUs with boundaries between sets of audio frame data, the arrangement of packs near the boundaries of video object units will differ between cases where the total size of the payload for audio packs corresponds to an integer number of sets of audio frame data and a case where the total size corresponds to a non-integer number of sets of audio frame data.

Figure 11:
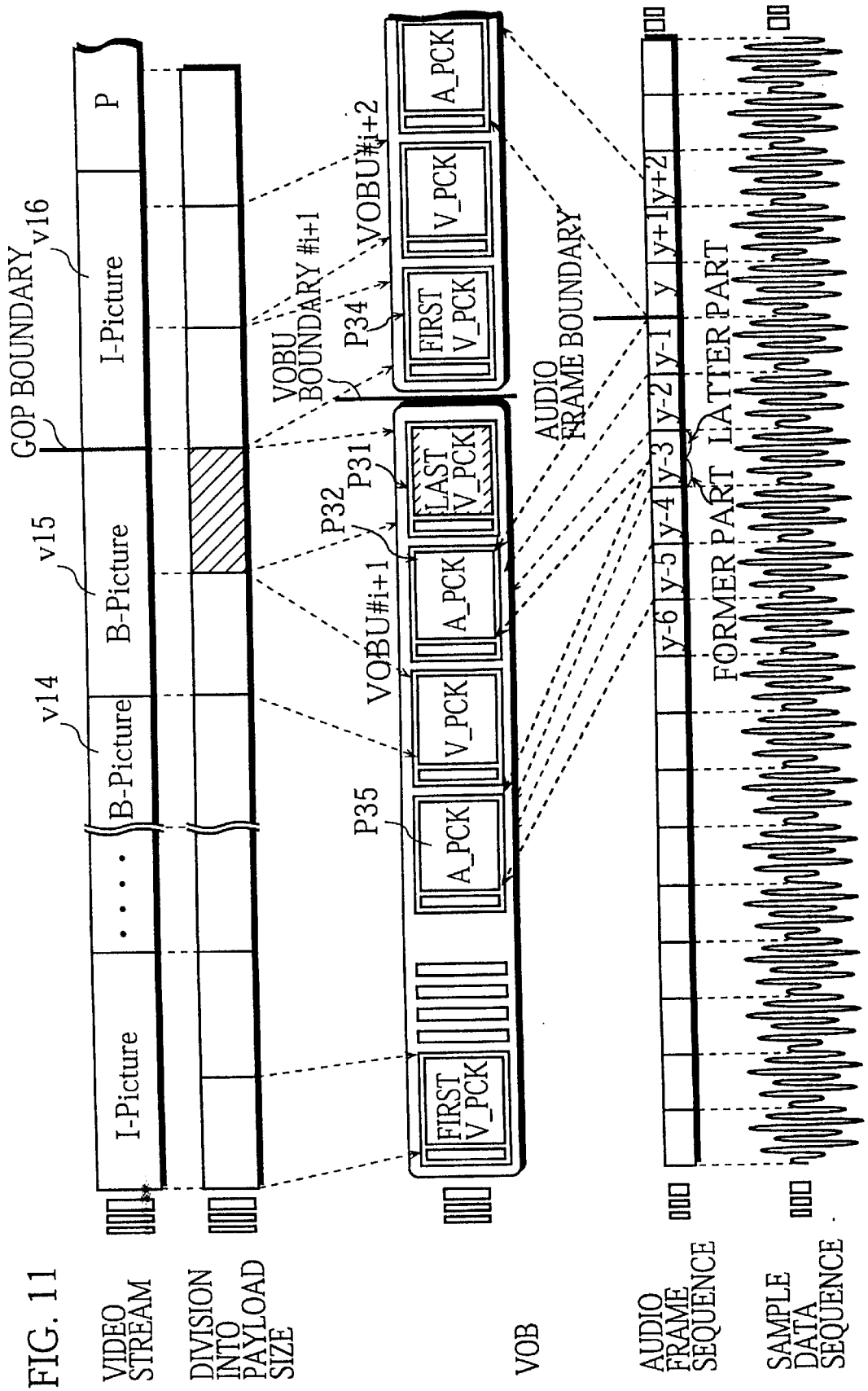
FIG. 11 shows how each set of audio frame data is stored in the payload of each pack when the total size of the payloads of the audio packs included in a VOBU is an integer multiple of the audio frame data size.

FIG. 11 shows how each set of audio frame data is stored into each pack when the total size of the payload for audio packs in a VOBU is an integer number of sets of audio frame data.

The boxes drawn on the top level of FIG. 11 show B pictures, P pictures, and I pictures included in the video stream. The second level shows the division of the video stream on the top level into units with the same size as the payloads of packs. The arrows that extend downward from the second level show how the data divisions obtained by the division into payload size are stored in the video packs.

The example waveform shown on the fifth level in FIG. 11 shows an audio wave obtained by sampling at a sampling frequency of 48 KHz. The fourth level shows a sequence of sets of audio frame data. The sampled data obtained through the sampling is divided into 1536 (=32 msec/(1/48 kHz)) groups to form audio access units (AAU). These AAUs are encoded to produce the sets of audio frame data shown on the fourth level. The correspondence between the sampled data and the sets of audio frame data is shown by the dotted lines that extend upward from the fifth level. Meanwhile, the dotted lines that extend upward from the fourth level show the storage of the sets of audio frame data into audio packs.

The vertical line on the top level that shows the boundaries between the B picture v15 and the I picture v16 is a boundary between GOPs. The video pack that includes the picture data located immediately before this GOP boundary is shown as the video pack P31.

The audio pack P32 located immediately before this video pack P31 is indicated by the arrows that extend from the sets of audio frame data y−1, y−2, and the latter part of y−3, showing that this pack stores these sets of audio frame data. Meanwhile, the audio pack P35 that is located before this audio pack P32 is indicated by the arrows that extend from the sets of audio frame data y−5, y−4, and the former part of y−3, showing that this pack stores these sets of audio frame data.

Figure 12:
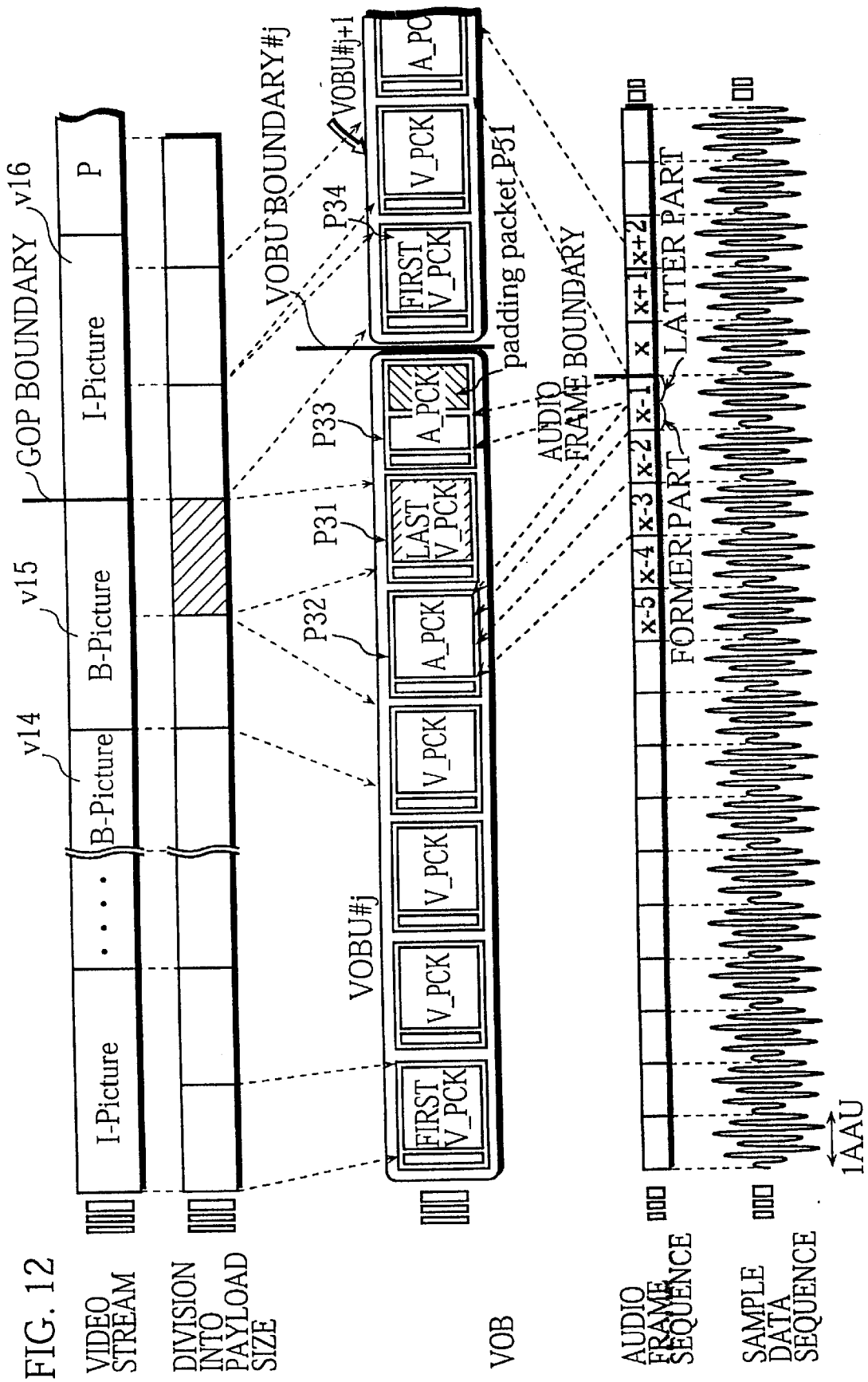
FIG. 12 shows how each set of audio frame data is stored in each pack when the total size of the payloads of the audio packs included in a VOBU is a non-integer multiple of the audio frame data size.

FIG. 12 shows how sets of audio frame data are stored in each pack when the total size of the payload for audio packs included in a VOBU does not correspond to an integer number of sets of audio frame data.

The top level and second level in FIG. 12 are the same as in FIG. 11. The third level differs from that in FIG. 11 in that the audio pack P33 is located immediately after the video pack P31. The correspondence between the sets of audio frame data shown on the fourth level and pack sequence shown on the third level is also different from that shown in FIG. 11.

The audio pack P32 that is located immediately before this video pack P31 is indicated by the arrows that extend from the sets of audio frame data x−3, x−2, and the former part of x−1, showing that this pack stores these sets of audio frame data. Meanwhile, the audio pack P33 that is located immediately after this video pack P31 is indicated by the arrows that extend from the latter part of the set of audio frame data x−1, showing that this pack stores this audio frame data. Since only the latter part of the audio frame data x−1 is stored, an area in the payload of the audio pack P33 is left unused. To fill this remaining area, the padding packet P51 is inserted into the audio pack P33.

Since the latter part of the audio frame data x−1 and the padding packet are arranged into the audio pack P33, the boundary of the VOBUs matches the boundaries between the sets of audio frame data.

In this way, it is ensured that the boundaries of VOBUs match a boundary between the sets of audio frame data, regardless of whether the total payload size of the audio packs included in the VOBUs corresponds to an integer number of sets of audio frame data or a non-integer number. This means that if partial delete operations are performed with a VOBU as the smallest deletable unit of data, the boundary between the deleted data and the remaining data will match a boundary between sets of audio frame data.

(1-2-2-6-1) Selection of Logical Format Based on Free Size of Audio Packs

For the example shown in FIG. 12, a padding packet P51 is inserted into the free area in the pack, though depending on the size of the free area in the payload, a padding packet P51 may be inserted into the pack, or stuffing bytes may be inserted into the packet header. FIGS. 13A and 13B respectively show examples of packs where a padding packet and stuffing bytes have been inserted.

When the remaining area in a pack is between one to seven bytes in size, stuffing bytes are inserted into the packet header, as shown in FIG. 13A. However, when the remaining area in the pack is at least eight bytes in size; a padding packet is inserted into the pack alongside the audio packet, as shown in FIG. 13B. The inserted padding packet has a unique header. A demultiplexer provided in a recording apparatus to separate the multiplexed video and audio data refers to this header and discards the data from the header onwards as invalid data. This means that invalid data is not accumulated in the audio decoder buffer when a padding packet is provided in an audio pack, with this data merely filling the free area in the payload.

(1-3) Composition of the RTRW Management File

Figure 14:
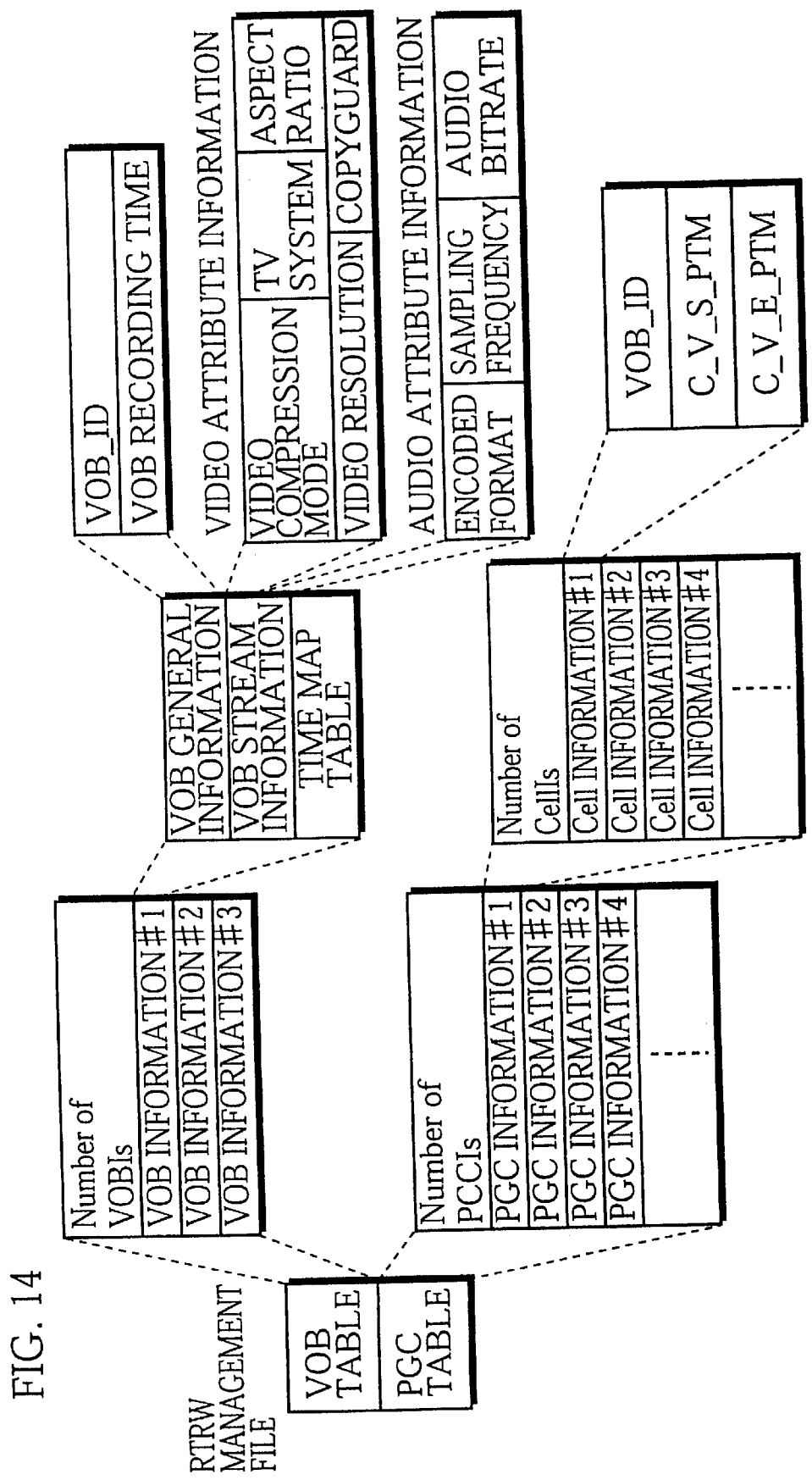
FIG. 14 shows a detailed hierarchy of the stored content of the RTRW management file.

The following is a description of the composition of the RTRW management file. The content of the RTRW management file can be roughly divided into the VOB table and the PGC table. A VOB is a physical unit for indicating the MPEG stream recorded on an optical disc. On the other hand, a PGC (Program Chain) is a logical unit that indicates an arrangement of all or only some of the data divisions in a VOB. PGCs define reproduction sequences. In FIG. 14, more than four sets of PGC information numbered PGC information #1, PGC information #2, PGC information #3, PGC information #4 . . . are present for the three VOBs, VOB #1, VOB #2, and VOB #3. This shows that four or more PGCs can be logically defined for three VOBs that physically exist.

FIG. 14 shows the detailed hierarchical structure in which data is stored in the RTRW management file. The logical format shown on the right of FIG. 14 is a detailed expansion of the data shown on the left, with the broken lines serving as guidelines to clarify which parts of the data structure are being expanded.

From the data structure in FIG. 14, it can be seen that the RTRW management file includes a Number_of_VOBIs (showing the number of sets of VOB information) and VOB information for VOB #1, VOB #2, and VOB #3. This VOB information for each VOB includes VOB general information, VOB stream information, and a time map table.

(1-3-1) Composition of the VOB General Information

The VOB general information includes a VOB-ID that is uniquely assigned to each VOB in an AV file and VOB recording time information of each VOB.

The VOB attribute information is composed of video attribute information and audio attribute information.

The video attribute information includes video compression mode information that indicates one of MPEG2 and MPEG1, TV system information that indicates one of NTSC and PAL/SECAM, aspect ratio information showing "4:3" or "16:9", video resolution information showing "720×480" or "352×240" when the video attribute information indicates NTSC, and copyguard information showing the presence/absence of copy prevention control for a video tape recorder.

The audio attribute information shows the encoding method that may be one of MPEG, Dolby-AC3, or Linear-PCM, the sampling frequency (such as 48 kHz), and an audio bitrate that is written as a bitrate when a fixed bitrate is used or as the legend "VBR" when a variable bitrate is used.

The time map table shows the presentation start time of each VOBU and the address of each VOBU relative to the start of the AV file.

(1-3-2) Composition of the PGC Table

The PGC table includes a Number_of_PGCIs (showing the number of sets of PGC information) and a plurality of sets of PGC information. Each set of PGC information includes a Number_of_CellIs, showing the number of sets of cell information, and a set of cell information for each cell. Each set of cell information includes a VOB_ID, a C_V_S_PTM, and a C_V_E_PTM.

The VOB_ID is a column for entering the identifier of a VOB included in the AV file. When there are a plurality of VOBs in the AV file corresponding to a set of cell information, this VOB_ID clearly shows which of the VOBs corresponds to this cell information.

The cell start time C_V_S_PTM (abbreviated to C_V_S_PTM in the drawings) is information showing the start of the data division that is logically indicated by this cell information. In detail, this indicates the video field located at the start of the data division.

The cell end time C_V_E_PTM (abbreviated to C_V_E_PTM in the drawings) is information showing the end of the data division that is logically indicated by this cell information. In detail, this indicates the video field located at the end of the data division.

Figure 15:
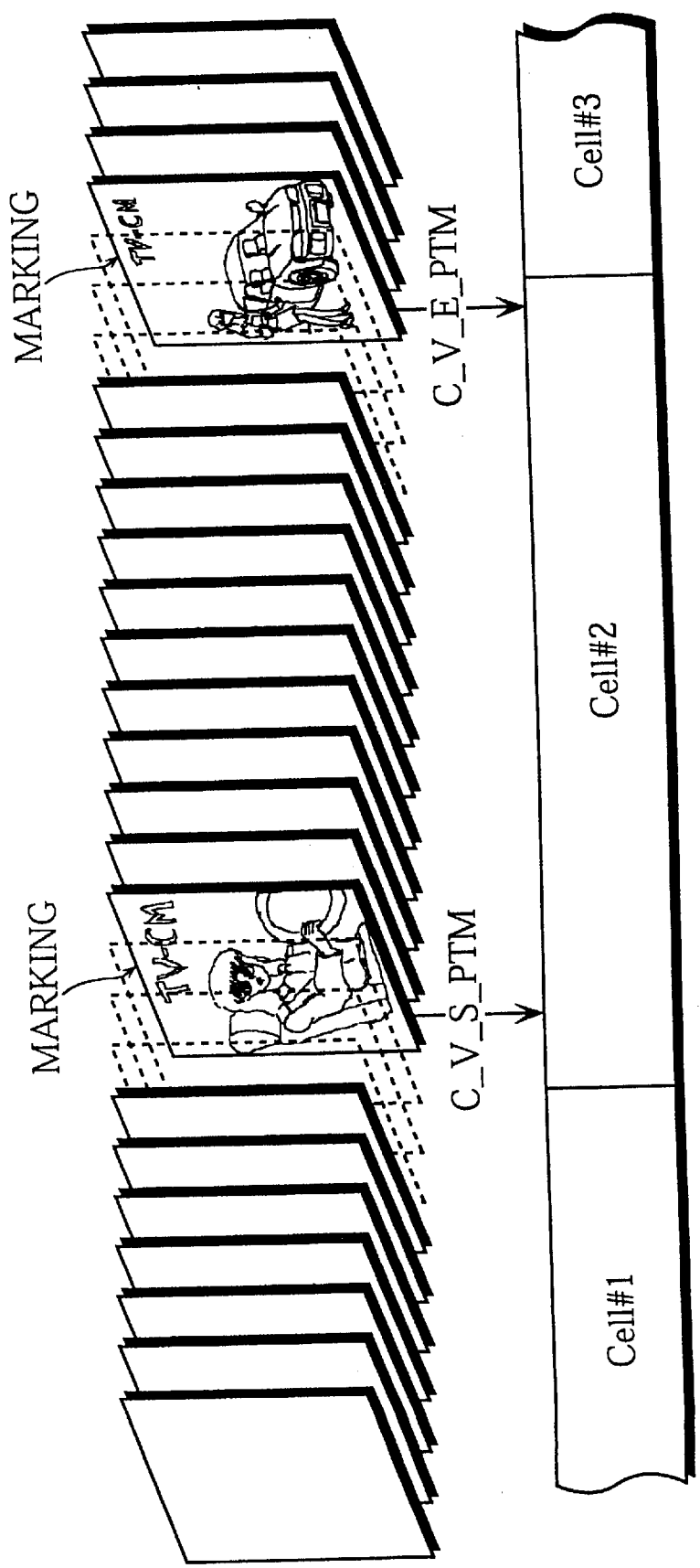
FIG. 15 shows how video fields are specified using the C_V_S_PTM, C_V_E_PTM in the cell information.

The sets of time information given as the cell start time C_V_S_PTM and the cell end time C_V_E_PTM show the start time for the encoding operation by a video encoder and the end time for the encoding operation, and so indicate a series of images marked by the user. As one example, when the user marks the images shown in FIG. 15, the C_V_S_PTM and C_V_E_PTM in the cell information are set to indicate the marked video fields with a high degree of precision.

(1-3-2-1) Reproduction Using the Logical Units (PGCs)

Figure 16:
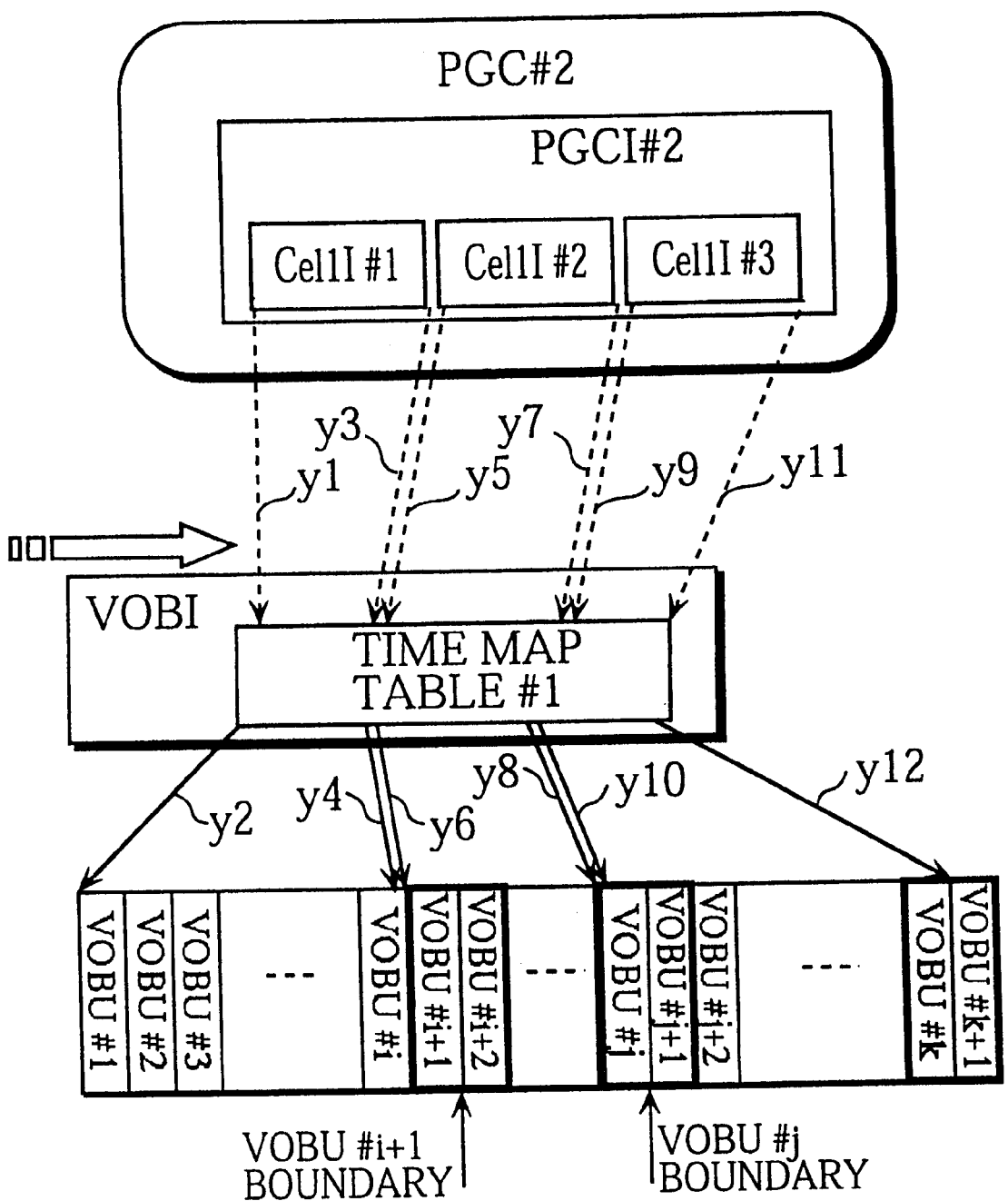
FIG. 16 shows how VOBs are accessed using a PGC.

The following is an explanation of the reproduction of PGCs. FIG. 16 shows how VOBs are accessed using PGCs. The dotted arrows in FIG. 16 show the correspondence between the referring and referred-to data. The arrows y2, y4, y6, and y8 show the correspondence between each VOBU in a VOB and the time codes included in the time map table in the set of VOB information. The arrows y1, y3, y5, and y7 show the correspondence between the time codes included in the time map table in the set of VOB information and sets of cell information.

Here, suppose the user indicates reproduction for one of the PGCs. When the indicated PGC is PGC #2, the recording apparatus extracts the cell information #1 (abbreviated to CellI #1) located at the front of PGC #2. Next, the recording apparatus refers to the AV file and VOB identifier included in the extracted CellI #1, and so finds that the AV file and VOB corresponding to this cell information are AV file #1 and VOB #1, with time map table #1 being specified for this VOB.

Since the address relative to the start of the VOB and the elapsed time are written in the specified time map table #1, the recording apparatus refers to the time map table #1 using the cell start time C_V_S_PTM as shown by arrow y1 and so finds the VOBU in the AV file that corresponds to the cell start time C_V_S_PTM included in cell information #1 and the start address of this VOBU. Once the start address of the VOBU corresponding to the cell start time C_V_S_PTM is known, the recording apparatus accesses VOB #1 as shown by arrow y2 and starts to read the VOBU sequence starting from VOBU #1 that is indicated by this start address.

Here, since the cell end time C_V_E_PTM is included in cell information #1 along with the cell start time C_V_S_PTM, the recording apparatus refers to the time map table #1 using the cell end time C_V_E_PTM, as shown by the dotted arrow y3. As a result, the recording apparatus can find out which VOBU in the AV file corresponds to the cell end time C_V_E_PTM included in cell information #1 and can obtain the end address of this VOBU. Supposing that the VOBU indicated in this way is VOBU #i, the recording apparatus will read the VOBU sequence as far as the end of the VOBU #i that is indicated by the arrow y4 in FIG. 16. By accessing the AV file via the cell information #1 and the VOB information #1 in this way, the recording apparatus can read only the data in VOB #1 of AV file #1 that is specified by cell information #1. By repeating this selective reading of data using cell information #2 and cell information #3, the recording apparatus can read and reproduce all of the VOBUs included in VOB #1.

By performing reproduction based on sets of PGC information, the recording apparatus can reproduce the data in a VOB according to the order in which it is indicated by the sets of PGC information.

Partial reproduction of a PGC is also possible by having the user indicate cells that are included in a PGC. Cells are parts of a VOB that are specified using time information for video fields, so that the user is able to view scenes that he/she has indicated very precisely. However, the user is not able to directly indicate the reproduction of a data division, such as a VOBU, that is smaller than one cell.

(1-3-2-2) Partial Deletion for a PGC

The partial deletion of a VOB is performed with a VOBU as the minimum unit. This is because each VOBU includes (a) GOP(s) in the video stream and because the boundaries between VOBUs will definitely match boundaries between sets of audio frame data. The procedure when performing a partial deletion in the present embodiment is described below.

Figure 17:
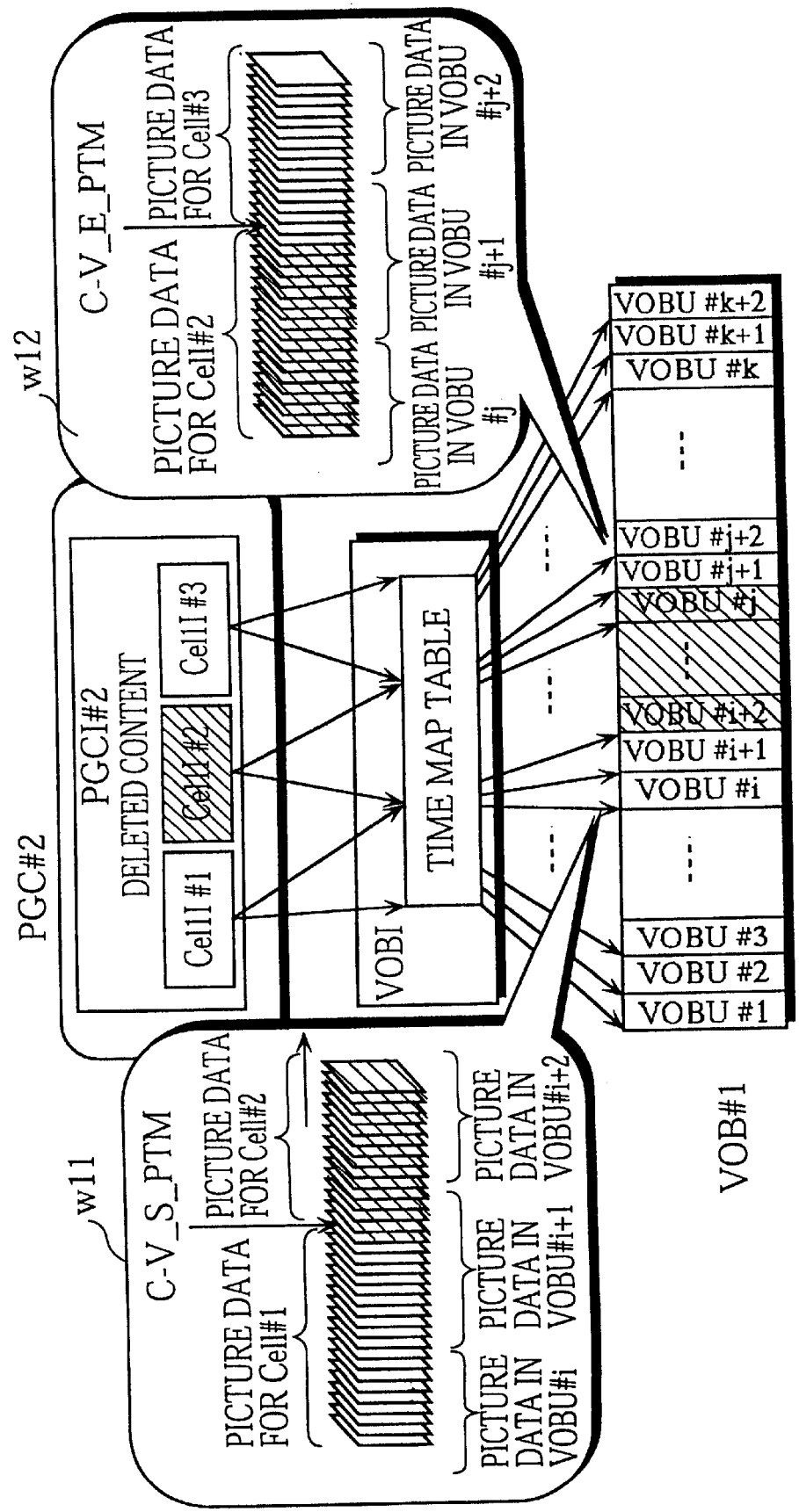
FIG. 17 shows the part, out of the cells shown in FIG. 16, that corresponds to cells subjected to partial deletion using cross hatching.

In the following example, the PGC information #2 shown in FIG. 16 is composed of the cells #1 to #3, with cell #2 being subjected to a partial deletion. In FIG. 17, the area that corresponds to the deleted cell is shown using diagonal shading.

As shown within frame w11 in FIG. 17, cell #2 that is to be deleted indicates one of the video frames, out of the plurality of sets of picture data included in VOBU #i+1, using the cell start time C_V_S_PTM. As shown within frame w12, cell #2 also indicates one of the video frames, out of the plurality of sets of picture data included in VOBU #j+1, using the cell end time C_V_E_PTM.

Figure 18A:
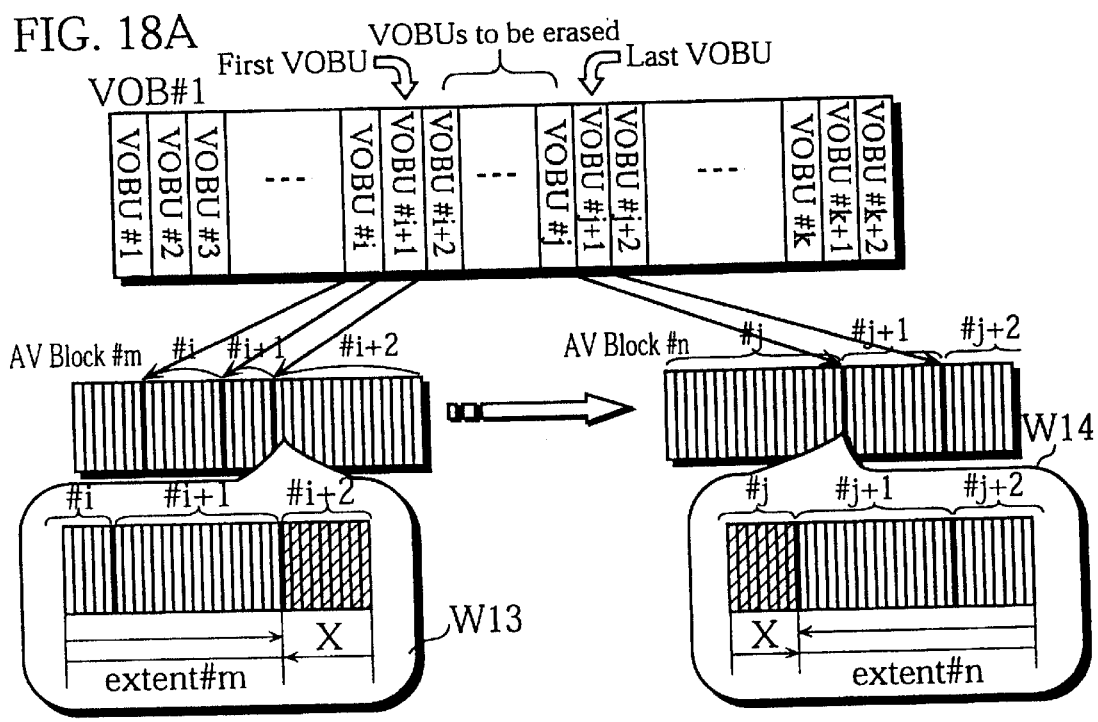
FIG. 18A shows which ECC blocks on a DVD-RAM are freed to become unused areas as a result of a partial deletion that uses PGG information #2.

FIG. 18A shows the extents that are freed by a partial deletion using PGC information #2. As shown on the second level of FIG. 18A, VOBUs #i, #i+1, and #i+2 are recorded in the extent #m, and VOBUs #j, #j+1, and #j+2 are recorded in the extent #n.

As shown in FIG. 18A, cell #2 indicates picture data included in VOBU #i+1 as the cell start time C_V_S_PTM and picture data included in VOBU #j+1 as the cell end time C_V_E_PTM. This means that the area from the extent that VOBU #i+2 occupies to the extent that VOB #j occupies is freed to become an unused area. However, the extents that VOBU #i and VOBU #i+1 occupy and the extents that VOBU #j+1 and VOBU #j+2 occupy are not freed.

Figure 18B:
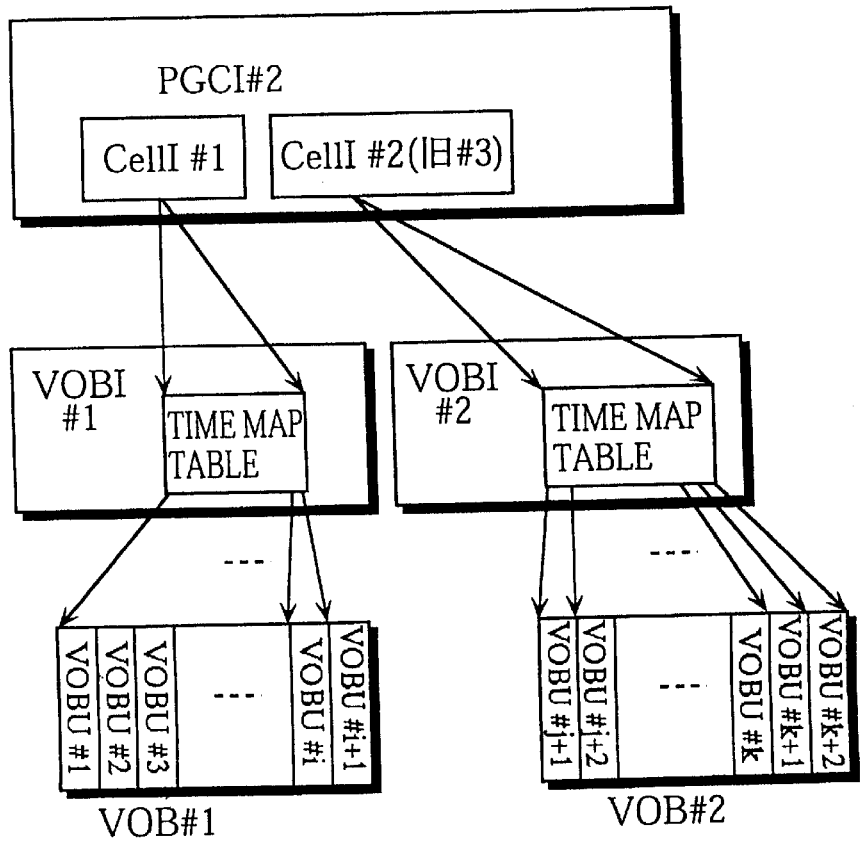
FIG. 18B shows examples of the VOBs, VOB information, and PGC information after a partial deletion.

FIG. 18B shows examples of the VOB, VOB information, and PGC information after the partial deletion described above. Since the part corresponding to the former cell #2 has been deleted, VOB #1 is now composed of the new pair of VOBU #1 and VOBU #2.

The VOB information for VOB #1 is divided into VOB information #1 and VOB information #2. The time map tables that are included in these sets of VOB information are divided into time map table #1 and time map table #2.

Figures 19A, 19B:
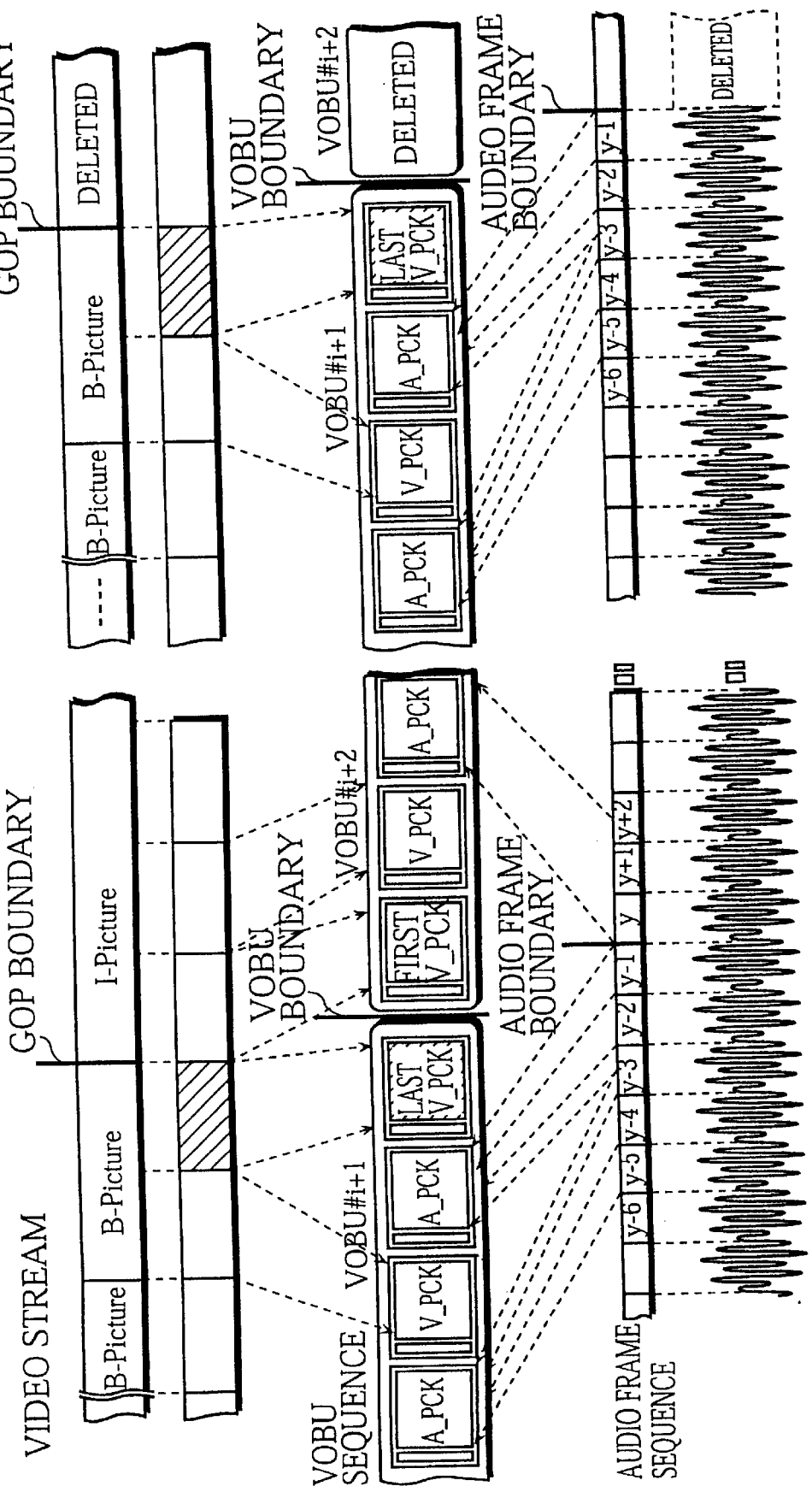
FIGS. 19A and 19B show VOBU #i+1 and VOBU #i+2 before and after a partial deletion.

FIGS. 19A and 19B show VOBU #i+1 and VOBU #i+2 before and after the partial deletion described above. Of these, FIG. 19A shows the state before the partial deletion and has the same content as FIG. 11. In FIG. 19B, the data from VOBU #i+2 onwards has been deleted. Since the boundary between VOBU #i+1 and VOBU #i+2 matched the boundary between the sets of audio frame data y-1 and y, the partial deletion of data from VOBU #i+2 onwards results in the audio frame data up to audio frame data y-1 being left and the audio frame data from audio frame data y onwards being deleted.

Figure 20B:
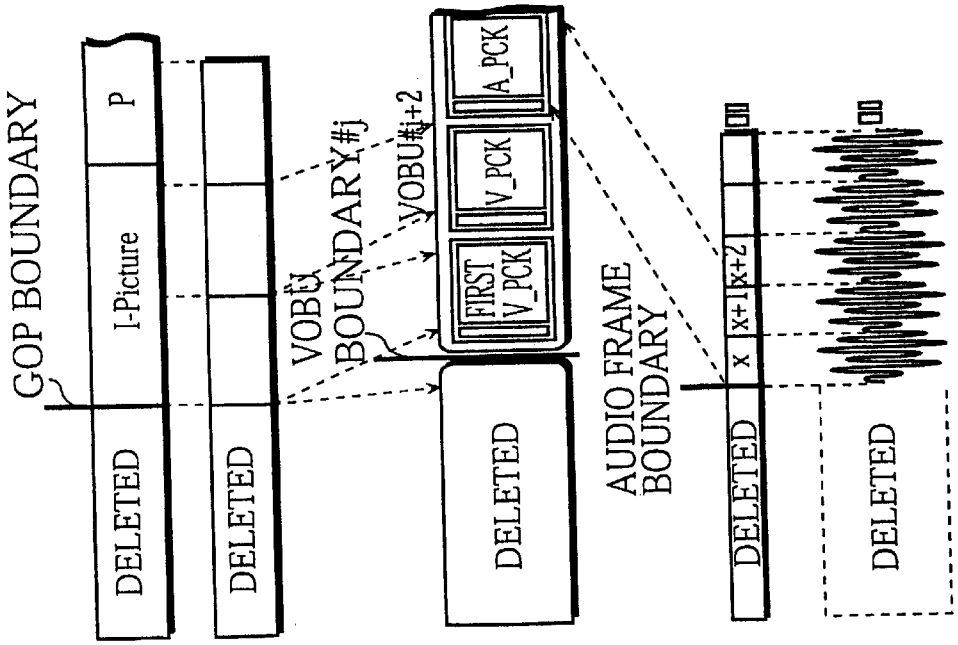
FIGS. 20A and 20B show VOBU #j+1 and VOBU #j+2 before and after a partial deletion.
Figure 20A:
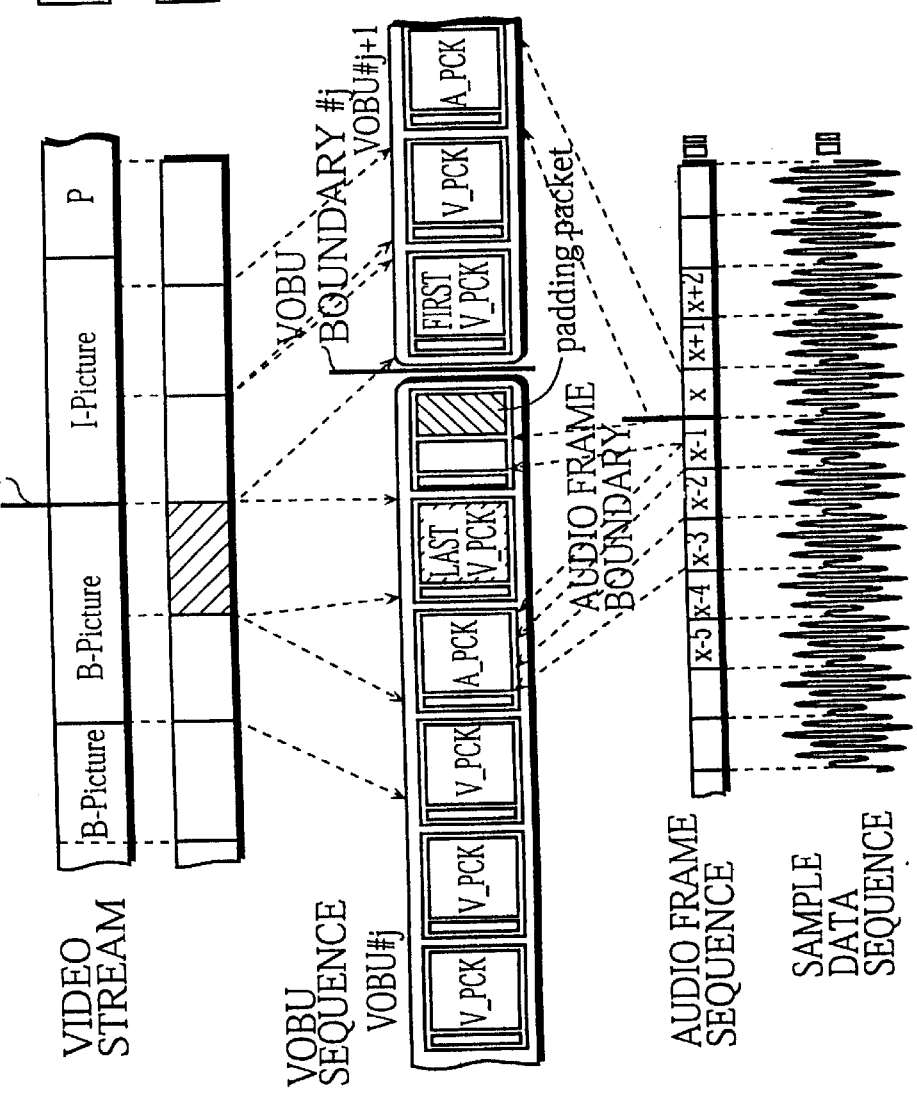

FIGS. 20A and 20B show VOBU #j and VOBU #j+1 before and after the partial deletion described above. Of these, FIG. 20A shows the state before the partial deletion and has the same content as FIG. 12. In FIG. 20B, the data up to VOBU #j has been deleted. Since the boundary between VOBU #j and VOBU #j+1 matched the boundary between the sets of audio frame data x-1 and x, the partial deletion of data up to VOBU #j results in the audio frame data up to audio frame data x-1 being deleted and the audio frame data from audio frame data x onwards being left.

Since the boundaries between VOBUs match the boundaries between sets of audio frame data, it can be seen that partial deletes that are performed in VOBU units have no danger of leaving only part of a set of audio frame data on the optical disc.

(2-1) System Construction of the Recording Apparatus

Figure 21:
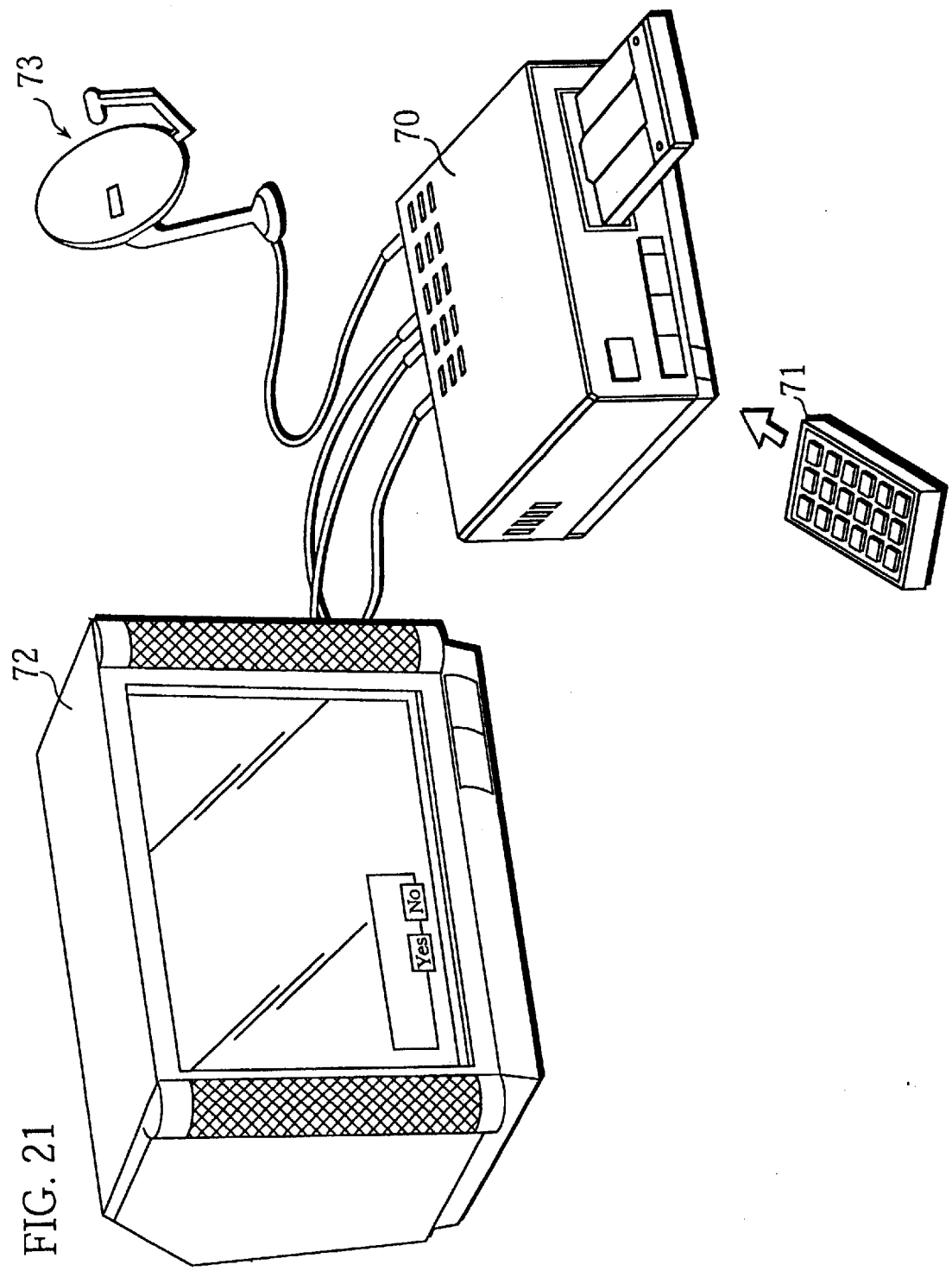
FIG. 21 shows an example configuration of a system that uses the recording apparatus of the present invention.

The recording apparatus of the present embodiment has functions for both a DVD-RAM reproduction apparatus and a DVD-RAM recording apparatus. FIG. 21 shows an example of the system construction that includes the recording apparatus of the present embodiment. As shown in FIG. 21, this system includes a recording apparatus (hereinafter DVD recorder 70), a remote controller 71, a TV monitor 72 that is connected to the DVD recorder 70, and an antenna 73. The DVD recorder 70 is conceived as a device to be used in place of a conventional video tape recorder for the recording of television broadcasts, but also features editing functions. FIG. 21 shows a system where the DVD recorder 70 is used as a domestic video appliance. The DVD-RAM described above is used by the DVD recorder 70 as the recording medium for recording television broadcasts.

When a DVD-RAM is loaded into the DVD recorder 70, the DVD recorder 70 compresses a video signal received via the antenna 73 or a conventional NTSC signal and records the result onto the DVD-RAM as VOBs. The DVD recorder 70 also decompresses the video streams and audio streams included in the VOBs recorded on a DVD-RAM and outputs the resulting video signal or NTSC signal and audio signal to the TV monitor 72.

(2-2) Hardware Construction of the DVD Recorder 70

Figure 22:
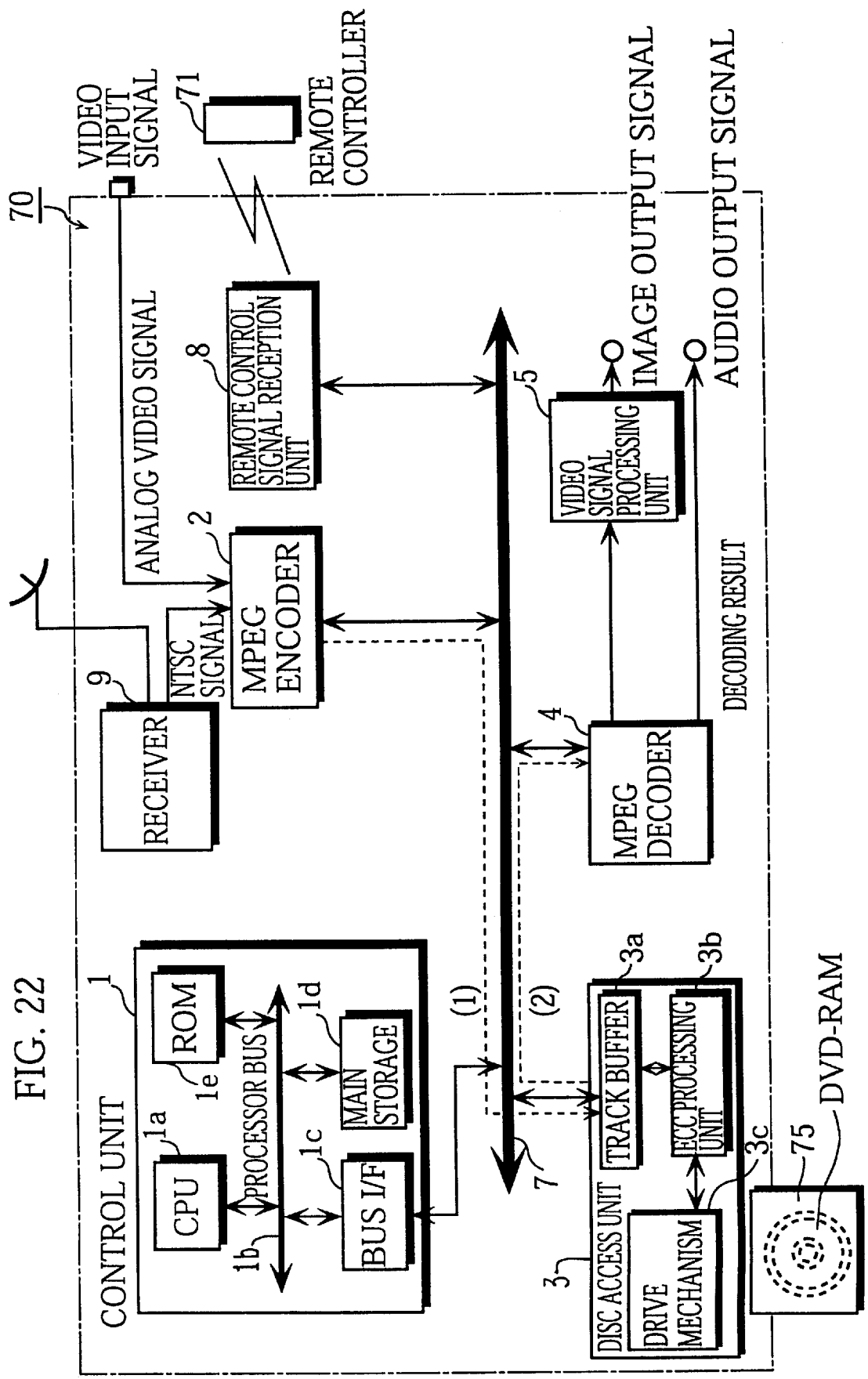
FIG. 22 is a block diagram showing the hardware construction of the DVD recorder 70.

FIG. 22 is a block diagram showing the hardware construction of the DVD recorder 70. The DVD recorder 70 includes a control unit 1, an MPEG encoder 2, a disc access unit 3, an MPEG decoder 4, a video signal processing unit 5, a remote controller 71, a bus 7, a remote control signal reception unit 8, and a receiver 9.

The arrows drawn with solid lines in FIG. 22 show the physical connections that are achieved by the circuit wiring inside the DVD recorder 70. The broken lines, meanwhile, show the logical connections that indicate the input and output of various kinds of data on the connections shown with the solid lines during a video editing operation.

The control unit 1 is the host-side control unit that includes the CPU 1a, the processor bus 1b, the bus interface 1c, the main storage 1d, and the ROM 1e. By executing programs stored in the ROM 1e, the control unit 1 records and reproduces VOBs.

The MPEG encoder 2 operates as follows. When the receiver 9 receives an NTSC signal via the antenna 73, or when a video signal outputted by a domestic video camera is received via the video input terminals at the back of the DVD recorder 70, the MPEG encoder 2 encodes the NTSC signal or video signal to produce VOBs. The MPEG encoder 2 then outputs these VOBs to the disc access unit 3 via the bus 7.

The disc access unit 3 includes a track buffer 3a, an ECC processing unit 3b, and a drive mechanism 3c for a DVD-RAM, and accesses the DVD-RAM in accordance with control by the control unit 1.

In more detail, when the control unit 1 gives an indication for recording on the DVD-RAM and the VOBs encoded by the MPEG encoder 2 have been successively outputted as shown by the broken line (1), the disc access unit 3 stores the received VOBs in the track buffer 3a. After the ECC processing unit 3b performs ECC processing, the disc access unit 3 controls the drive mechanism 3c to successively record these VOBs onto the DVD-RAM.

On the other hand, when the control unit 1 indicates a data read from a DVD-RAM, the disc access unit 3 controls the drive mechanism 3c to successively read VOBs from the DVD-RAM. After the ECC processing unit 3b performs ECC processing on these VOBs, the disc access unit 3 stores the result in the track buffer 3a.

The drive mechanism 3c mentioned here includes a platter for setting the DVD-RAM, a spindle motor for clamping and rotating the DVD-RAM, an optical pickup for reading a signal from the DVD-RAM, and an actuator for the optical pickup. Reading and writing operations are achieved by controlling these components of the drive mechanism 3c, although such control does not form part of the gist of the present invention. Since this can be achieved using well-known methods, no further explanation will be given in this specification.

The MPEG decoder 4 operates as follows. When VOBs that have been read from the DVD-RAM by the disc access unit 3 are outputted as shown by the broken line (2), the MPEG decoder 4 decodes these VOBs to obtain uncompressed digital video data and an audio signal. The MPEG decoder 4 outputs the uncompressed digital video data to the video signal processing unit 5 and outputs the audio signal to the TV monitor 72.

The video signal processing unit 5 converts the image data outputted by the MPEG decoder 4 into a video signal for the TV monitor 72. On receiving graphics data from outside, the video signal processing unit 5 converts the graphics data into an image signal and performs signal processing to combine this image signal with the video signal.

The remote control signal reception unit 8 receives a remote controller signal and informs the control unit 1 of the key code in the signal so that the control unit 1 can perform control in accordance with user operations of the remote controller 71.

(2-2-1) Internal Construction of the MPEG Encoder 2

FIG. 23A is a block diagram showing the construction of the MPEG encoder 2. As shown in FIG. 23A, the MPEG encoder 2 is composed of a video encoder 2a, a video encoding buffer 2b for storing the output of the video encoder 2a, an audio encoder 2c, an audio encoding buffer 2d, a system encoder 2e for multiplexing the encoded video stream in the video encoding buffer 2b and the encoded audio stream in the audio encoding buffer 2d, an STC (System Time Clock) unit 2f for generating the synchronization clock of the MPEG encoder 2, and the encoder control unit 2g for controlling and managing these components of the MPEG encoder 2. Of these, the audio encoder 2c encodes audio information that is inputted from outside to generate a plurality of sets of audio frame data that are the minimum data unit that can be independently decoded. The audio encoding buffer 2d stores the plurality of sets of audio frame data encoded by the audio encoder 2c in the order in which they were generated.

(2-2-2) Internal Construction of the System Encoder 2e

FIG. 23B shows the internal construction of the system encoder 2e. As shown in FIG. 23B, the system encoder 2e includes an audio packing unit 15, a virtual decoder buffer 16, a virtual presentation time counting unit 17, a video packing unit 18, a virtual decoder buffer 19, and an interleaving unit 20. The audio packing unit 15 converts the sets of audio frame data stored in the audio encoding buffer 2d into packs. The virtual decoder buffer 16 simulates the buffer state when the packs that store the sets of audio frame data are inputted into a buffer. The virtual presentation time counting unit 17 measures time that is used for assigning an SCR and a PTS based on the synchronization clock of the STC 2f. The video packing unit 18 converts the video data stored in the video encoding buffer 2b into packs. The virtual decoder buffer 19 simulates the buffer state when the packs that store the sets of video data are inputted into a buffer. The interleaving unit 20 generates VOBs by arranging the video packs and audio packs in accordance with the SCR and PTS assigned to the video packs and audio packs. In the present embodiment, the conversion of the audio frame data into packs by the audio packing unit 15 is the main focus, so that this is explained in detail. No detailed description of the generation of video packs by the video packing unit 18 will be given.

(2-2-2-1) Buffer Control by the Audio Packing Unit 15

The audio packing unit 15 extracts an amount of data equivalent to the payload size from the encoded audio frame data accumulated in the audio encoding buffer 2d. The audio packing unit 15 then generates a pack that stores the extracted data in its payload, and outputs the generated pack to the system encoder 2e. This generation of a pack involves the arrangement of data into a payload and the calculation of the input time of this pack into an audio decoder buffer.

The calculation of the input time of a pack into the audio decoder buffer is performed so that the buffer state of the audio decoder buffer can be efficiently controlled. In the model of a reproduction apparatus under DVD standard, the memory capacity of the audio decoder buffer is a mere 4 KB, which equates to only twice the data size of the audio packs used as the unit when reading from a DVD-RAM. As a result, there is a risk of an overflow occurring in the audio decoder buffer if there are no restrictions regarding the input times of audio frame data or the number of sets of audio frame data inputted into the audio decoder buffer at any one time. However, if such restrictions are unsuitable, the opposite case can occur where the audio frame data that needs to be decoded is not present in the audio decoder buffer. This causes an underflow in the audio decoder buffer.

To avoid underflows and overflows, the audio packing unit 15 uses the virtual decoder buffer 16 to simulate increases in the occupancy of the system encoder 2e of a decoder when packs are inputted and decreases in the occupancy as time passes. By doing so, the audio packing unit 15 calculates input times for audio packs so that no underflows or overflows occur in the audio decoder buffer. By giving packs SCRs that show input times calculated in this way, the audio packing unit 15 ensures that overflows and underflows will not occur in the audio decoder buffer. When doing so, the audio packing unit 15 must not assign an SCR to an audio pack that corresponds to an SCR of a video pack. To ensure this happens, the audio packing unit 15 informs the video packing unit 18 of the SCRs that have already been assigned to packs, and the video packing unit 18 assigns SCRs to video packs that do not correspond to the SCRs of audio packs.

The simulation of the audio decoder buffer using the virtual decoder buffer 16 is performed by graphing the buffer state shown in FIG. 8 in the virtual decoder buffer 16, with the time measured by the virtual presentation time counting unit 17 as the horizontal axis.

The audio packing unit 15 has the virtual presentation time counting unit 17 start to measure time. When the first pack accumulated in the audio encoder buffer 16 has been stored in the first pack, the audio packing unit 15 increases the buffer occupancy by the data amount for this first pack and plots an inclined part for the time measured by the virtual presentation time counting unit 17 based on the input bit rate of the pack.

The virtual presentation time counting unit 17 continues to measure time and the audio packing unit 15 plots a stepped part in the graph every time the time measured by the virtual presentation time counting unit 17 reaches the presentation start time of an audio frame. The audio packing unit 15 repeatedly plots stepped parts and, when a free region equivalent to the payload of a pack appears in the audio decoder buffer, stores the audio frame data accumulated in the audio encoding buffer 16 into the next pack and gives the pack an SCR showing the time at that point. By repeating this procedure, the audio packing unit 15 converts audio frame data into packs.

(2-2-2-2) Buffer Control so that VOBU and Audio Frame Data Boundaries Match

In addition to performing the simulation of the buffer state as described above, the audio packing unit 15 of the present embodiment has a characteristic feature in that it performs buffer control so that the boundaries of VOBUs match boundaries between sets of audio frame data. This buffer control controls the audio decoder buffer so that when the last (audio) pack in a VOBU has been transferred, the audio frame data accumulated in the audio decoder buffer will complete an entire audio frame. When such buffer control is maintained, the boundaries between VOBUs will definitely match boundaries between sets of audio frame data.

FIG. 24 shows the case where the boundaries between sets of audio frame data match the boundaries between VOBUs.

The top part of FIG. 24 shows the transition in the buffer state of the video decoder buffer. Below this, the video pack sequence that causes the illustrated transition in the buffer state is shown. In FIG. 24, the sets of picture data v11, v12, v13, v14, v15, and v16 are shown, with video pack p31 storing the final picture data v15 as the final pack in a VOBU. The video pack p34 stores the first picture data v16 in the next VOBU.

A pack sequence where video packs and audio packs have been multiplexed is shown below this in FIG. 24. The bottom part of FIG. 24, meanwhile, shows the transition in the buffer state of the audio decoder buffer. A vertical line drawn at the right side of this graph is marked with "x" at each boundary between sets of audio frame data.

The final video pack p31 in the multiplexed pack sequence has the audio pack p32 immediately before it. The transfer of this audio pack p32 causes the increase in the occupancy of the audio decoder buffer shown by the inclined part k1. As shown by the graph at the bottom of FIG. 24, an amount of audio frame data equal to exactly four audio frames is stored in the audio decoder buffer. This shows that the VOBU boundary matches a boundary between audio frames.

On the other hand, when only part of the audio frame data is stored in the audio decoder buffer, the boundary between VOBUs does not match a boundary between sets of audio frame data. When the boundaries do not match, the audio packing unit 15 can have only the remaining part of a set of audio frame data transferred so that the boundary between VOBUs matches a boundary between audio frames.

Figure 25:
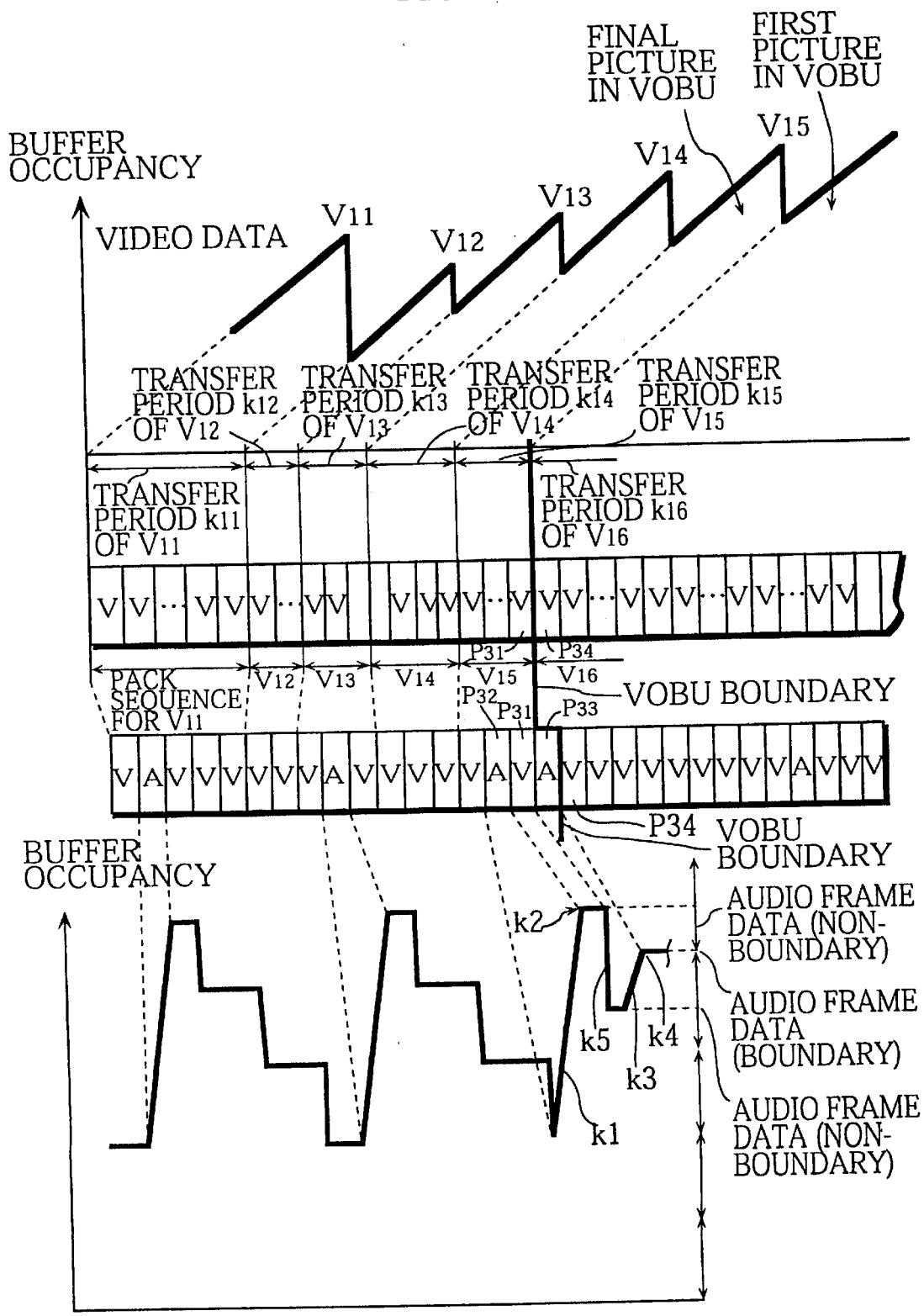
FIG. 25 is a representation of when a boundary between VOBUs is made to match a boundary between sets of audio frame data as a result of the generation of an audio pack that transfers only a remaining part of a set of audio frame data to the audio decoder buffer.

FIG. 25 shows how the audio packing unit 15 has only the remaining part of a set of audio frame data transferred so that the boundary between VOBUs matches the boundary between audio frames.

The top part of FIG. 25 and the video pack sequence below it are the same as in FIG. 24. Below his, the video pack p31 stores the final picture data. v15 as the final pack in a GOP with the audio pack p32 immediately before it, as in FIG. 24. The transfer of this audio pack p32 causes the increase in the occupancy of the audio decoder buffer shown by the inclined part k1, as in FIG. 24. However, after this transfer of audio pack p32, the graph in FIG. 25 differs in that the audio decoder buffer stores audio frame data for four frames and one part of the audio frame data for a fifth audio frame.

As shown by the point k2 on the inclined part k1, the boundary between VOBUs does not match a boundary between sets of audio frame data. At the bottom of FIG. 25, the reaching of the presentation start time of an audio frame results in a reduction in the buffer occupancy, as shown by the stepped part k5. The height of this stepped part is equivalent to the data size of one set of audio frame data, so that the audio decoder buffer ends up storing an incomplete amount of audio frame data.

In this state, the boundary between VOBs does not match the boundary between sets of audio frame data, so that in FIG. 25, the audio pack p33 is arranged immediately after the video pack p31 and immediately before the video pack p34. The audio pack p33 stores the remaining part of a set of audio frame data, so that by inputting this audio pack p33, the inclined part k3 is produced in the graph at the bottom of FIG. 25. As a result, the buffer occupancy of the audio decoder buffer increases to the level shown as k4 that represents an amount of audio frame data that is exactly equal to four sets of audio frame data. This shows that the boundary of VOBUs matches a boundary between sets of audio frame data.

Notification of the final video pack in a VOBU is unexpectedly sent from the video packing unit 18. As a result, the audio packing unit 15 has to suddenly arrange the remaining part of the audio frame data as described above.

It should be especially noted that the size of the audio decoder buffer is only 4 KB, so that there can be many cases where the transfer of an audio pack at the end of a VOBU, such as the transfer of audio pack p31 in the preceding example, will not be possible. One example of this is the case where 4 KB of audio frame data is stored in the audio data buffer even though the final set of audio frame data has only been partly stored. Since the capacity of the audio decoder buffer is 4 KB, which is 5.333 . . . (4096 bytes/768 bytes) times the data size of the audio frame data, it can be seen that this represents a non-integer number of sets of audio frame data.

Figure 26A:
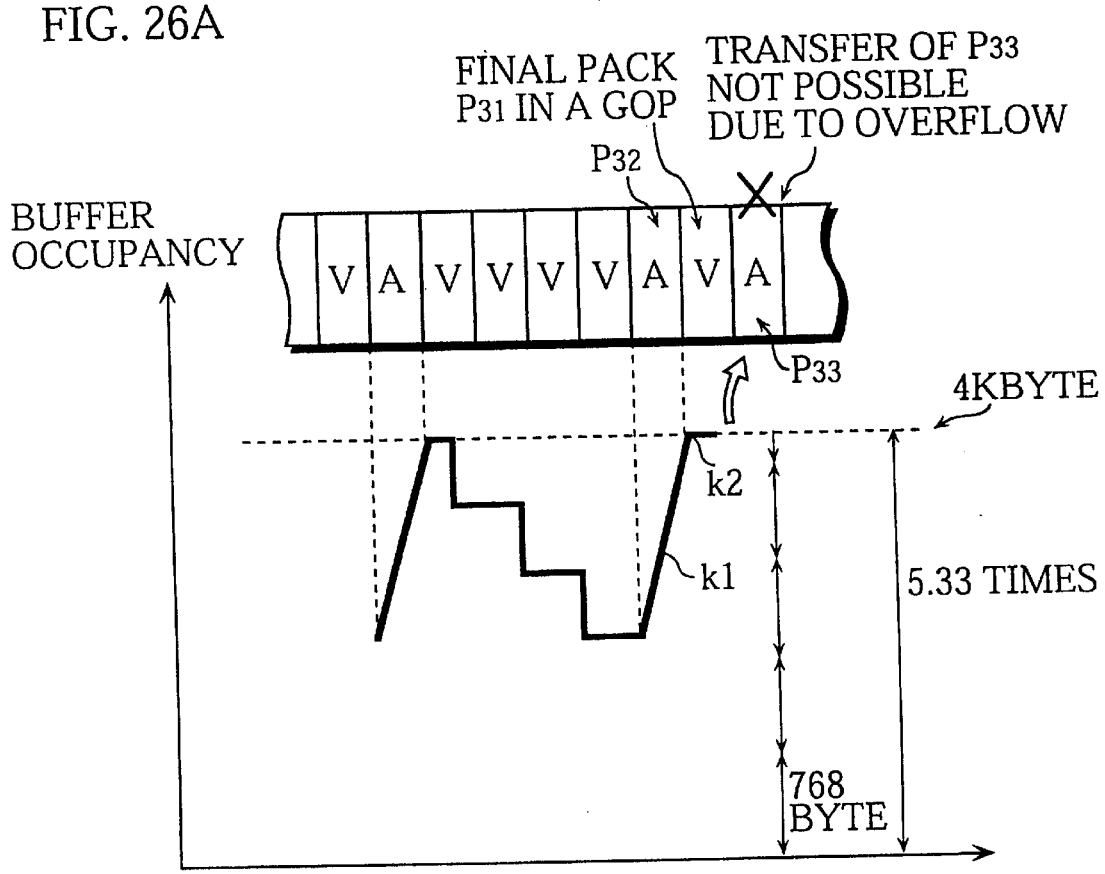
FIG. 26A shows that a final set of audio frame data is only partially stored when 4 KB of audio frame data is stored in the audio decoder buffer.

FIG. 26A shows the state where 4 KB of audio frame data is stored in the audio decoder buffer, though the final set of audio frame data is only partly stored. The upper part of FIG. 26A shows that the video pack p31, which is the final video pack in a VOBU, has the audio pack p32 positioned immediately before it, in the same way as in FIG. 25.

The vertical broken lines that descend from the audio pack p32 indicate the inclined part k1 that shows the increase in buffer occupancy caused by audio pack p32. The horizontal line that extends from the point k2 at the peak of the inclined part k1 does not cross the vertical guideline at a boundary between sets of audio frame data, as in FIG. 25. The difference with FIG. 25 is that the buffer occupancy at the point k2 is 4,096 bytes. Since 4,096 bytes of audio frame data are already stored in the audio decoder buffer, transfer of the audio pack p33 to the audio decoder buffer in the same way as in FIG. 25 will cause an overflow in the audio decoder buffer.

In this case, it is impossible to input the remaining part of the audio frame data in audio pack P33 into the audio decoder buffer, so that the boundary between VOBUs does not match the boundary between sets of audio frame data.

Figure 26B:
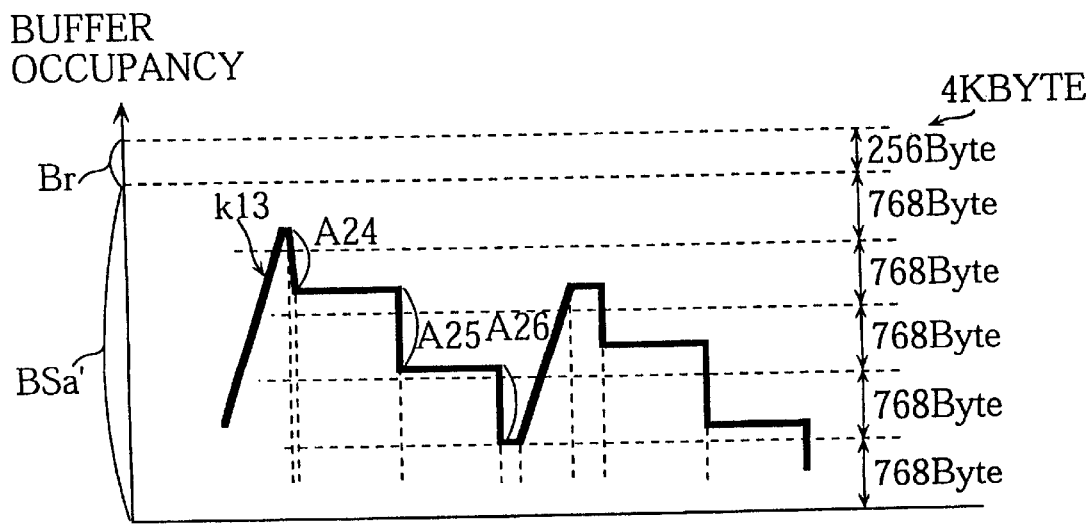
FIG. 26B shows the buffer state when control is performed to prevent the audio decoder buffer from becoming full.

Buffer control is performed by the audio packing unit 15 so as to particularly avoid the situation described above where the audio decoder buffer is completely filled with audio frame data. In detail, the audio packing unit 15 has a buffer state maintained where the predetermined data amount BSa' is set as the upper limit for the amount of data in the audio decoder buffer. FIG. 26B shows the transition in the buffer state when the amount of data in the audio decoder buffer is subjected to the upper limit BSa' and buffer control is performed so that the amount of accumulated data in the audio decoder buffer does not exceed BSa'.

The rules for the determination of this upper limit BSa' depend on the algorithm used by the encoder and there is no especially favorable method for their establishment. In the present embodiment, BSa is set as the value found by the equation below, where the data size of one audio frame is represented by "Aaudio".

$$Br = (4 \text{ KB } \% \text{ Aaudio}) \qquad \text{(Equation 2-1)}$$

$$BSa' = 4 \text{ KB} - Br \qquad \text{(Equation 2-2)}$$

where "%" represents a calculation that finds a remainder

The use of the above equation means that the upper limit for the amount of data in the audio decoder buffer is an integer multiple of the size of the data in one audio frame. This means that the amount of data accumulated in the audio decoder buffer will not exceed this predetermined amount BSa'. Since the amount of accumulated data in the audio decoder buffer will not exceed,the value of BSa' found according to Equation 2-2, there will always be enough space in the audio decoder buffer to input the remaining data in an audio frame. To give actual numerical examples, when Dolby-AC3 and a bitrate of 192 Kbps are used, the value of Aaudio will be 768 bytes, so that Br will be 256 bytes (=4,096 bytes–(768 bytes *5)). This means that in FIG. 26B, the amount of accumulated data in the audio decoder buffer is subjected to an upper limit BSa' of 3,840 bytes.

When storing audio frame data into a pack, the audio packing unit 15 judges whether a value found by adding the accumulated data amount in the virtual decoder buffer 16 to the payload size is no greater than the predetermined size BSa'. If so, the audio packing unit 15 generates the next pack and assigns an SCR that shows the present time to the header. When the total of the accumulated data amount in the virtual decoder buffer 16 and the payload size is greater than the predetermined size BSa', the audio packing unit 15 waits for the accumulated data amount to be reduced by the decoding of the next audio frame. When the accumulated data amount has been sufficiently reduced for the total of the accumulated data amount and the payload size to be within the predetermined size BSa', the audio packing unit 15 generates the next pack and assigns an SCR showing the time at that point to the header.

Figure 27:
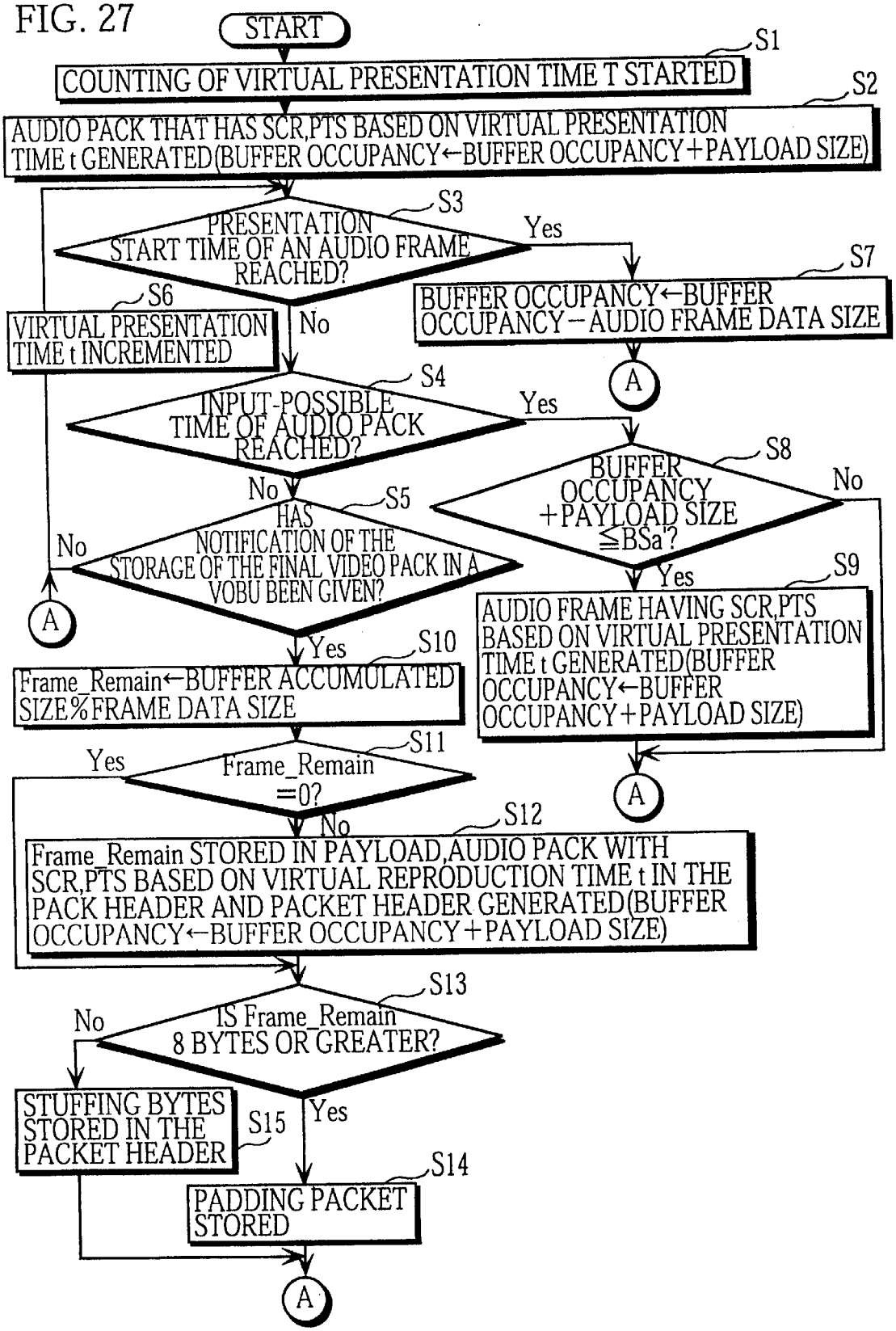
FIG. 27 is a flowchart that shows the procedure by which the audio packing unit 15 generates packs while simulating the audio decoder buffer.

The following is a description of the procedure by which the audio packing unit 15 simulates the state of the audio decoder buffer and generates audio packs based on the principles described above. FIG. 27 is a flowchart that shows the procedure by which the audio packing unit 15 generates audio packs while simulating the state of the audio decoder buffer.

In step S1, the audio packing unit 15 has the virtual presentation time counting unit 17 start to count the virtual presentation time t. In step S2, the audio packing unit 15 extracts audio frame data of a predetermined size from the start of the arrangement of sets of audio frame data stored in the audio encoding buffer 2d. The audio packing unit 15 stores this extracted audio frame data in a pack. Based on the virtual presentation time t, the audio packing unit 15 assigns an SCR and PTS to generate an audio pack. The audio packing unit 15 adds the payload size of the pack to the amount of accumulated data in the buffer, and plots an inclined part in the virtual decoder buffer 16.

In step S3, the audio packing unit 15 judges whether the virtual presentation time t counted by the virtual presentation time counting unit 17 has reached the presentation start time of an audio frame. If not, in step S4 the audio packing unit 15 determines whether the input-possible time of an audio pack has been reached. If not, in step S5, the audio packing unit 15 judges whether the notification of the storage of the final video pack in a VOBU has been given. When the result "No" is given in every judgement in steps S3 to S5, the audio packing unit 15 proceeds to step S6 where it has the virtual presentation time counting unit 17 increment the virtual presentation time t.

The incrementing in step S6 is repeated until the result "Yes" is given in one of judgements in steps S3 to S5. This repeated incrementing of the virtual presentation time t results in the virtual presentation time t reaching the presentation start time of a set of audio frame data. When this is the case, the result "Yes" is given in step S3, and the procedure advances to step S7. In step S7, the audio packing unit 15 plots a stepped part in the virtual decoder buffer 16 to reduce the amount of accumulated data in the buffer by the size of the audio frame data. The processing then advances to step S6 where the virtual presentation time t is incremented again, before entering the loop processing in steps S3 to S6.

On the other hand, when the repeated incrementing of the virtual presentation time t results in the virtual presentation time t reaching the input-possible time of an audio pack, the processing advances to step S8, where the audio packing unit 15 judges whether a size given by adding the amount of data accumulated in the buffer to the payload size is within the predetermined size BSa'.

If this size exceeds the predetermined size BSa', there is the danger that input of the audio pack into the audio decoder buffer will cause an overflow in the audio decoder buffer. As a result, the processing advances to step S6 and then back to the loop from S3 to S6 so that the audio packing unit 15 waits for the amount of accumulated data in the audio decoder buffer to decrease.

If the calculated size is below the predetermined size BSa', the processing advances to step S9 where the audio packing unit 15 extracts audio frame data of a predetermined size from the start of the arrangement of sets of audio frame data stored in the audio encoding buffer 2d. The audio packing unit 15 arranges this extracted audio frame data in a payload of an audio pack. Based on the virtual presentation time t, the audio packing unit 15 assigns an SCR and PTS to the header to generate an audio pack. At the same time, the audio packing unit 15 adds the payload size of the pack to the amount of accumulated data in the buffer, and plots an inclined part in the virtual decoder buffer 16. The processing then proceeds to step S6 where the virtual presentation time t is incremented, before the processing enters the loop of steps S3 to S6 again.

The incrementing of the virtual presentation time t is repeated until the audio packing unit 15 unexpectedly receives notification from the video packing unit 18 that the final video pack in a VOBU has been stored.

On being informed that the final video pack in a VOBU has been stored, the audio packing unit 15 advances to step S10 where it finds the remainder "Frame_Remain" that is left when the capacity of the buffer is divided by the size of one set of audio frame data. Next, in step S11, the audio packing unit 15 judges whether the size of Frame_Remain is zero. If so, the processing proceeds to step S6 where the virtual presentation time t is incremented before the processing enters the loop of steps S3 to S6. If not, the processing advances to step S12, where the audio packing unit 15 extracts the remaining audio frame data from the start of the arrangement of sets of audio frame data stored in the audio encoding buffer 2d. The audio packing unit 15 arranges this extracted audio frame data in a payload of an audio pack.

Based on the virtual presentation time t, the audio packing unit 15 assigns an SCR and PTS to the header to generate an audio pack. The processing then advances to step S13 where the audio packing unit 15 judges whether the difference between the payload size and the data size of Frame_Remain is 8 bytes or more. If so, in step S14 the audio packing unit 15 stores a padding packet in the audio pack. On the other hand, if the difference is less than 8 bytes, in step S15 the audio packing unit 15 stores stuffing bytes into the packet header of the audio pack. After this, the processing proceeds to step S6 where the virtual presentation time t is incremented, before the processing enters the loop of steps S3 to S6 once again.

Since the audio encoding buffer 2d stores the plurality of sets of audio frame data encoded by the audio encoder 2c in the order in which they have been encoded, the audio packing unit 15 may judge whether the next audio frame data to be stored has been partly stored in the immediately preceding audio pack data size of the audio frame data in the audio encoding buffer 2d by referring to the data size of the audio frame data in the audio encoding buffer 2d.

(2-2-2-3) Procedure for the Partial Deletion of a VOB

The control unit 1 performs partial delete operations using a standard function for accessing a data format standardized under ISO/IEC 13346. The standard features provided by the control unit 1 here refers to control of the disc access unit 3 read or write data onto or from the DVD-RAM in directory units and file units.

Representative examples of the standard functions provided by the control unit 1 are as follows.

1. Having the disc recording unit 100 record a file entry and obtaining the file identification descriptor.
2. Converting a recorded area on the disc that includes one file into an empty area.
3. Controlling the disc access unit 3 to read the file identification descriptor of a specified file from a DVD-RAM.
4. Controlling the disc access unit 3 to record data present in the memory onto the disc.
5. Controlling the disc access unit 3 to read an extent that composes a file recorded on the disc.
6. Controlling the disc access unit 3 to move the optical pickup to a desired position in the extents that compose a file.

Figure 28:
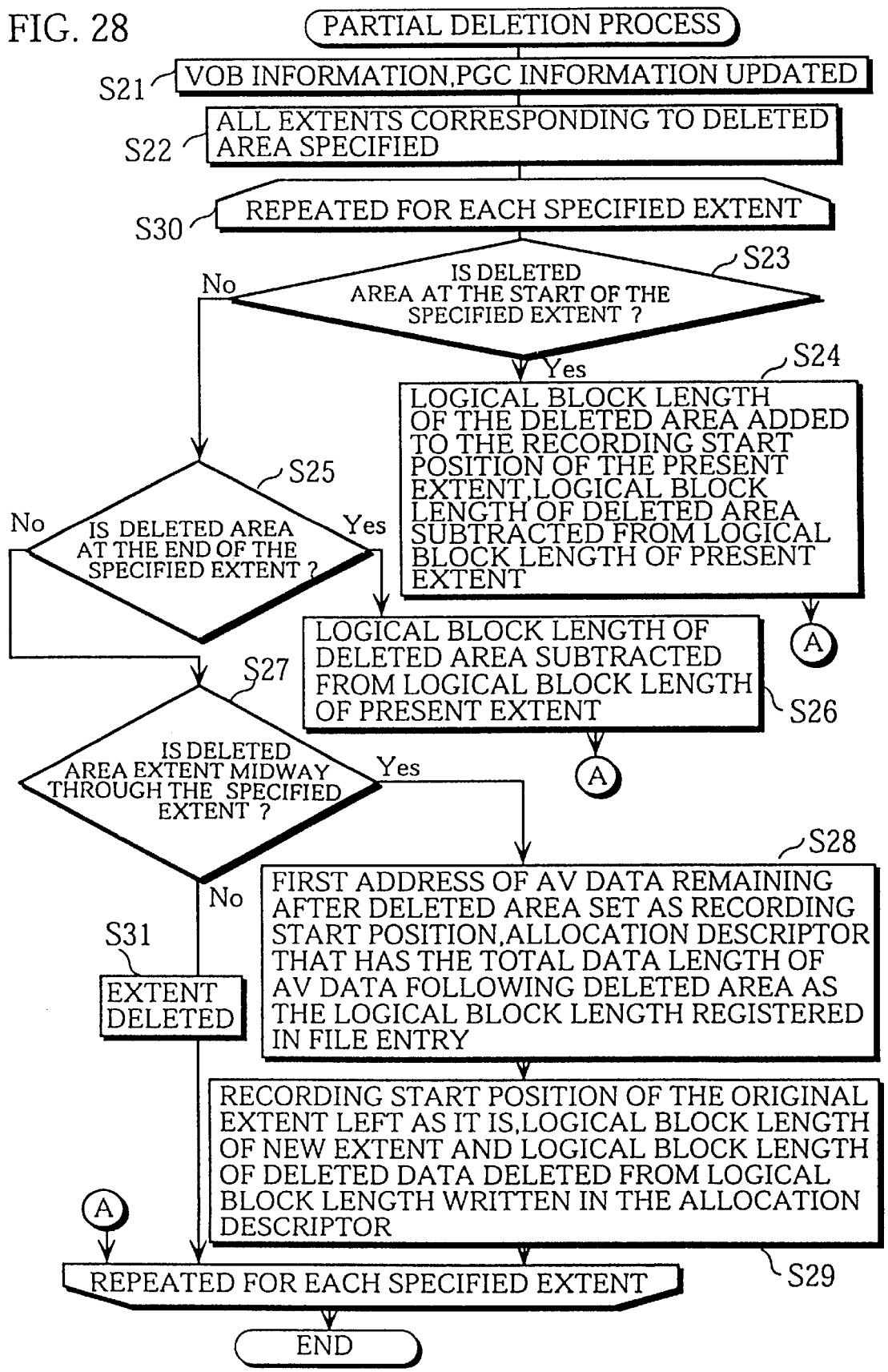
FIG. 28 is a flowchart showing the processing for the partial deletion of a VOB.

The following is an explanation of the processing of the control unit 1 when performing a partial delete based on the procedure shown in FIGS. 17, 18A, and 18B. FIG. 28 is a flowchart showing the processing when performing a partial delete of a VOB. In step S21 of this flowchart, the control unit 1 first renews the VOB information and PGC information as shown in FIGS. 17, 18A, and 18B, and updates the file entries.

In step S22, the control unit 1 refers to the relative address of the VOBU that is given in the time map information, and specifies extents that correspond to the VOBUs that compose the deleted area. Here, the deleted area may correspond to one extent, or to two or more extents. The reason a deleted area composed of a plurality of VOBUs may correspond to a plurality of extents is that an AV file is divided into a plurality of extents completely independently of the structure of the VOBUs.

After the extents have been specified in this way, the processing advances to step S30. Step S30 marks the start of a loop composed of the steps from step S23 to S29 that is performed for each of the specified extents.

Figure 29A:
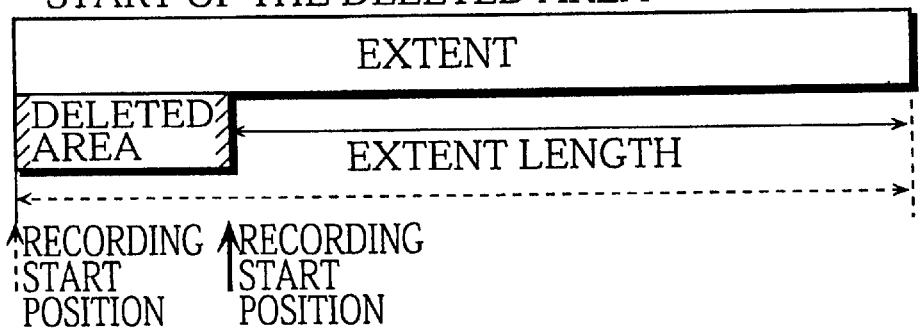
FIG. 29A is a representation of when the deleted area is positioned at the start of an extent.

In step S23, the control unit 1 determines whether the deleted area is positioned at the start of the specified extent. FIG. 29A shows the case where the deleted area is positioned at the start of the specified extent. When the deleted area is at the start of an extent as shown in FIG. 29A, the result "Yes" is given for the judgement in step S23, and the processing proceeds to step S24.

In step S24, the logical block length of the deleted area is added to the recording start position of the specified extent and the logical block length of this extent is reduced by the logical block length of the deleted area. By doing so, the control unit 1 updates the recording start position and extent length from those indicated by the broken lines in FIG. 29A to those indicated by the solid lines.

Figure 29B:
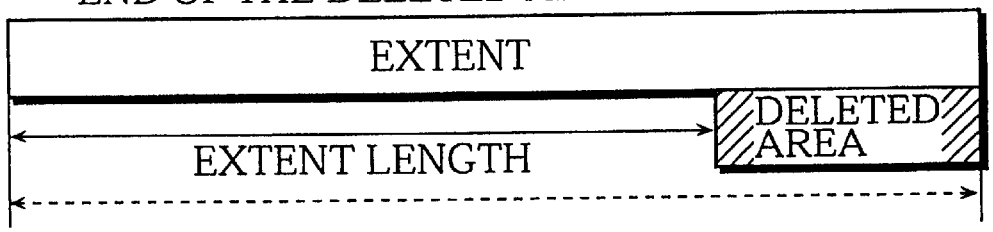
FIG. 29B is a representation of when the deleted area is positioned at the end of an extent.

In step S25, the control unit 1 judges whether the deleted area is positioned at the end of the specified extent. FIG. 29B shows the case where the deleted area is positioned at the end of the specified extent. When the deleted area is at the end of an extent as shown in FIG. 29B, the result "Yes" is given for the judgement in step S25, and the processing proceeds to step S26. In step S26, the logical block length of the present extent is reduced by the logical block length of the deleted area. By doing so, the control unit 1 updates the extent length from the broken line shown in FIG. 29B to the solid line.

Figure 29C:
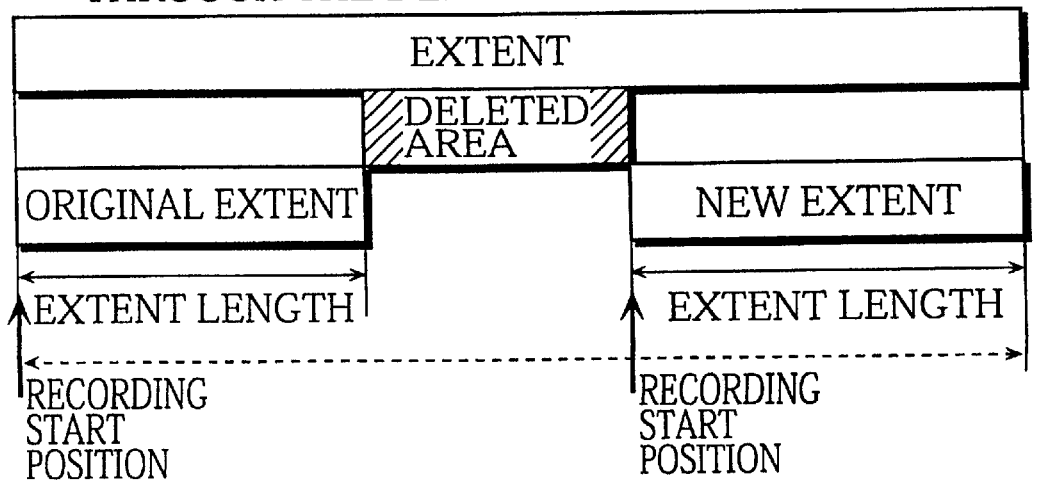
FIG. 29C is a representation of when the deleted area is positioned midway through an extent.

In step S27, the control unit 1 determines whether the deleted area is positioned midway through the specified extent. FIG. 29C shows the case where the deleted area is positioned midway through the specified extent. When the deleted area is midway through an extent as shown in FIG. 29C, the result "Yes" is given for the judgement in step S27, and the processing proceeds to step S28.

In step S28, the control unit first registers the stream data that exists after the deleted area in a file entry as a new extent. The control unit 1 then registers an allocation descriptor in the file entry. This allocation descriptor has the first address in the AV data that follows the deleted area as the recording start position and the data length of this remaining AV data as the logical block length.

Next, in step S29, the recording start position of the original extent is left as it is, and the logical block length written in the allocation descriptor for this extent is reduced by a sum of the logical block length of the deleted area and the logical block length written in the allocation descriptor in the new file entry.

When the result "No" is given in FIG. 27, the specified extent is to be deleted in its entirety, so that the processing proceeds to step S31 where the extent is deleted.

By repeating the above loop process for each extent specified in step S23, the control unit 1 completes the partial delete operation.

In the present embodiment, when the total of the payload size of audio packs in a VOBU is a non-integer multiple of a set of audio frame data, a padding packet or stuffing bytes are inserted into a pack to make the boundary between VOBUs match a boundary between sets of audio frame data. This means that so long as a partial delete is performed in VOBU units, there is no risk of the partial delete leaving only a former or latter part of a set of audio frame data. As a result, by updating management information such as file entries in units of VOBUs, a recording apparatus can easily perform a partial delete.

Even when notification of the storage of the final video pack in a VOBU is suddenly received, the process for inserting a padding packet or stuffing bytes into packs can instantaneously have the boundary of VOBUs aligned with a boundary between sets of audio frame data using a technique defined within the buffer control method of the audio packing unit 15.

Second Embodiment

The second embodiment of the present invention focuses on the storage of sets of audio frame data in packs at a ratio of one set of audio frame data to one pack.

Figure 30:
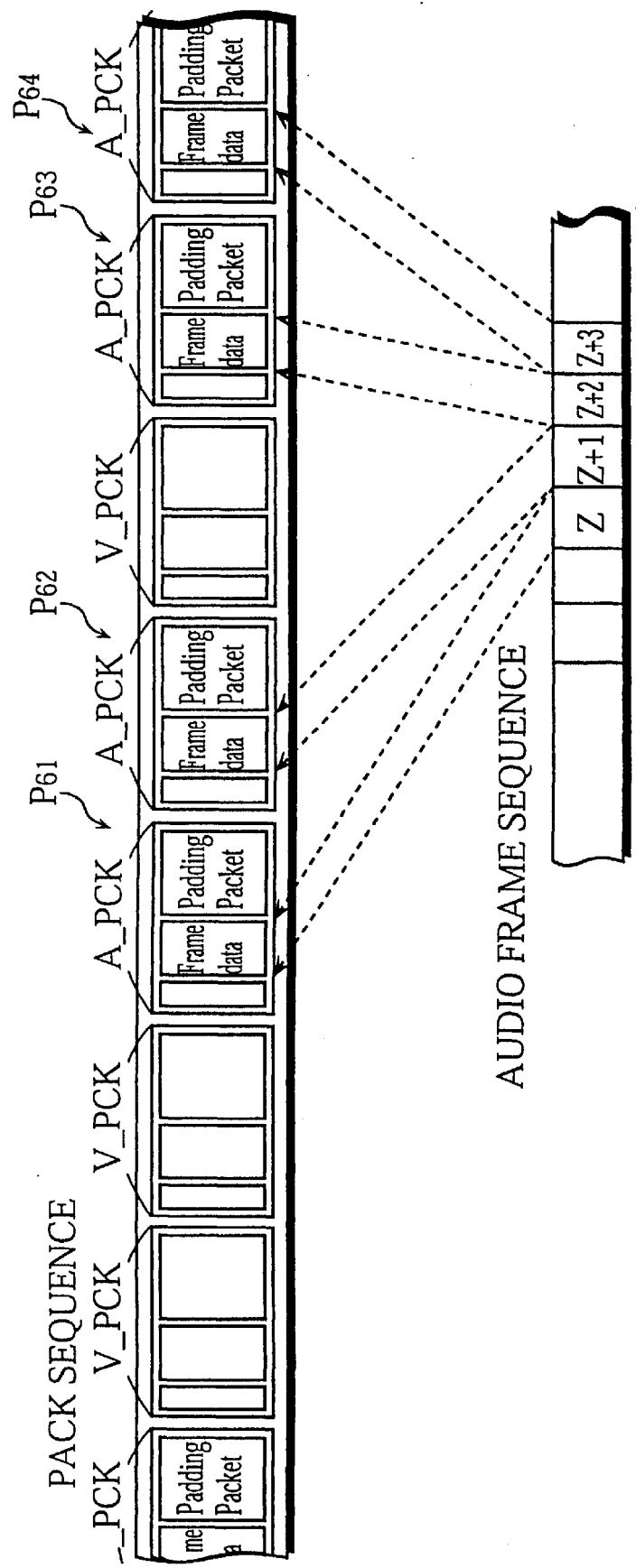
FIG. 30 shows the case where one set of audio frame data is stored in each pack.

FIG. 30 is a representation of when one set of audio frame data is stored in each pack.

The upper part of FIG. 30 shows the VOBUs produced by multiplexing audio packs and video packs. The audio pack P61 in these VOBUs is indicated by the arrows that extend from the audio frame data Z, showing that this pack only stores the audio frame data Z shown in the lower part of FIG. 30. If only the audio frame data Z is stored, an unused area is left in the audio pack P61. To fill this unused area, a padding packet is inserted into the audio pack P61.

In the same way, the audio packs P62, P63, P64 shown in the upper part of FIG. 30 are respectively indicated by the arrows that extend from the sets of audio frame data Z+1, Z+2, Z+3. This shows that these packs respectively only store the sets of audio frame data Z+1, Z+2, Z+3. Since only one set of audio frame data is stored in each audio pack, unused areas are left in the payloads of each of audio packs P62, P63, and P64. To fill these unused areas, a padding packet is inserted into each audio pack.

Figure 31:
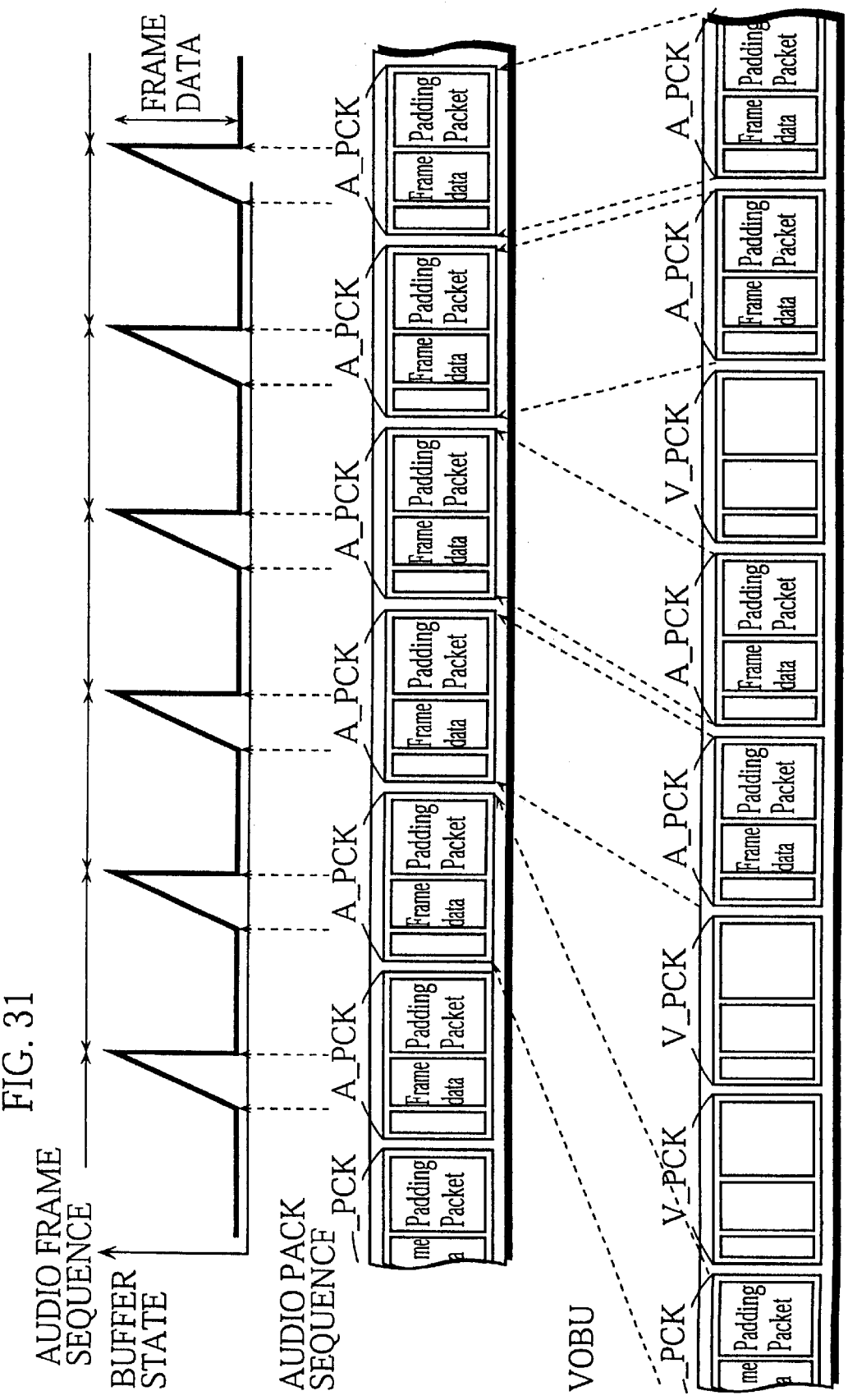
FIG. 31 shows the changes in the buffer state that are caused by the VOBUs shown in FIG. 30.

FIG. 31 shows how the state of the buffer changes due to the VOBUs shown in FIG. 30. The bottom part of FIG. 31 shows the same VOBUs as FIG. 30. The middle part shows a sequence of audio packs that is obtained by separating audio packs from the VOBUs shown in the bottom part. The top part of FIG. 31 is a graph showing the increases in the buffer occupancy of the audio decoder buffer due to the transfer of the audio frame data from the packs in the middle part to the audio decoder buffer.

Each inclined part in the graph in FIG. 31 starts to rise at the SCR given to a packet header and falls at the PTS given to the pack header of the pack. This shows that the input of each audio pack that stores set of audio frame data into the audio decoder buffer is completed by the presentation start time, at which point the audio frame data in the audio pack is decoded.

With the present embodiment, only one set of audio frame data is stored in each audio pack, so that the simulation of the buffer state using the virtual decoder buffer 16 is no longer necessary. This means that the construction of the system encoder 2e can be simplified. The scale of the audio decoder buffer can also be reduced to the size of one set of audio frame data, which reduces the manufacturing cost of the recording apparatus.

The present invention has been described by way of the above embodiments, though these embodiments are mere examples of systems that are presently expected to operate favorably. It should be obvious that various modifications can be made without departing from the technical scope of this invention. Seven representative examples of such modifications are given below.

(a) In the first embodiment, the DVD recorder 70 was described as being a device to be used in place of a domestic non-portable video tape recorder. However, when a DVD-RAM is used as a storage medium for a computer, the following construction is also possible. The disc access unit 3 may be connected to a computer bus via a SCSI (Small Computer Systems Interface), an IDE (Integrated Drive Electronics), or IEEE (Institute of Electrical and Electronics Engineers) 1394 interface so as to operate as a DVD-RAM drive. The components in FIG. 22 aside from the disc access unit 3 may be realized by computer hardware, the computer OS (operating system), and application software that is run on the OS.

When doing so, the procedure shown in the flowchart in FIG. 27 whereby the audio packing unit 15 uses the virtual decoder buffer 16 to simulate the buffer state can be achieved by a machine language program. Such machine language program may be distributed and sold having been recorded on a recording medium. Examples of such recording medium are an IC (integrated circuit) card, an optical disc, or a floppy disc. The machine language program recorded on the recording medium may then be installed into a standard computer. By executing the installed machine language programs, the standard computer can achieve the functions of the recording apparatus of the first embodiment.

(b) In the embodiments, only video streams and audio streams were described as being multiplexed into VOBs. However, a sub-picture stream including text for subtitles that has been subjected to run-length compression may also be multiplexed into VOBs, with the boundaries between VOBs still being aligned with the boundaries between sets of audio frame data.

(c) The embodiments describe the case where one video frame and one audio frame are used as the units. However, there are cases where one picture is in fact depicted using 1.5 frames, such as for a video stream where 3:2 pulldown is used with images for 24 frame per second being subject to compression in the same way as with film materials. This invention does not effectively depend on 3:2 pulldown, so that there is no particular restriction on the frames used.

(d) In the second embodiment, one set of audio frame data is stored in one audio pack, although two or three sets of audio frame data may be stored in one audio pack, provided that this in within the capacity of the audio pack.

(e) In the first and second embodiments, Dolby-AC3, MPEG, and Linear-PCM are given the audio coding modes, although the technical effects described in the embodiments can still be achieved even if other coding modes are used.

(f) In the first and second embodiments, each pack only includes one packet, although a pack may instead include a plurality of packets, as is the case in conventional MPEG methods.

(g) The first and second embodiments describe an example where a DVD-RAM is used, although the present invention is not limited to the use of this recording medium. The same effects may still be achieved if any rewritable medium, such as a hard disk drive or an MO drive, is used.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optical disc for use with an input signal including video data and audio data, said optical disc comprising:
    video objects, each including a plurality of video object units, recorded on said optical disc, wherein each video object unit has a length within a predetermined range and includes one or more complete sets of picture data, and audio data divided into audio packs, each audio pack including audio data of one or more complete audio frames and no audio data of incomplete audio frames.

2. An optical disc as claimed in claim 1, wherein the predetermined range has a value such that a total presentation period of all of the sets of picture data in a video object unit is no longer than one second, the video data includes picture groups and each picture group includes at least one set of picture data that has been intra-encoded, and said each video object unit includes at least one complete picture group.

3. An optical disc as claimed in claim 1, wherein one or more of said audio packs include one or more stuffing bytes.

4. An optical disc as claimed in claim 1, wherein:
    one of said audio packs includes one or more stuffing bytes when a length of the audio data in said one audio pack is shorter than a total length of recordable areas in said one audio pack.

5. An optical disc as claimed in claim 1, wherein:
    one of said audio packs includes one or more stuffing bytes when a difference between a length of said audio data in said one audio pack and the total length of recordable areas in said one audio pack is below a predetermined number of bytes.

6. An optical disc as claimed in claim 1, wherein said video object units are a minimum unit for deletion from said optical disc.

7. A recording apparatus for use with an optical disc and an input signal including video data and audio data, said recording apparatus comprising:
an encoder operable to encode the input signal received from outside said recording apparatus so as to successively output encoded sets of picture data and encoded sets of audio data;
a multiplexer operable to successively generate video object units that compose a video object by successively multiplexing one or more sets of picture data outputted by said encoder with one or more sets of audio data outputted by said encoder such that each video object unit generated by said multiplexer has a length within a predetermined range and includes one or more complete sets of picture data, and audio data divided into audio packs, each audio pack including audio data of one or more complete audio frames and no audio data of incomplete audio frames; and
a recorder operable to record the video object units generated by said multiplexer onto the optical disc as a video object.

8. A recording apparatus as claimed in claim 7, wherein:
said multiplexer is operable insert one or more stuffing bytes into an audio pack to ensure that the audio data in each audio pack is composed of audio data of one or more complete audio frames and no audio data of incomplete audio frames.

9. An optical disc recording video objects that are each obtained by multiplexing an encoded video stream including a plurality of sets of picture data and at least one encoded audio stream including a plurality of sets of audio frame data, each set of picture data being a unit for decoding the video stream, each set of audio frame data being a unit for decoding the audio stream, and one or more recording areas on the disc being managed as a file,
each of said video objects being divided into a plurality of video object units, each of which includes complete sets of picture data that can be independently decoded and one or more sets of audio frame data, said video object units being recorded as aligned portions in sequence within said file, characterized in that
each of said video object units is divided into a plurality of packs, a pack being a unit for reading/writing data from/on said disc,
said one or more sets of audio frame data are arranged into audio packs out of said plurality of packs such that each of said audio packs includes audio data of one or more complete audio frames, an audio frame being audio data that can be independently decoded, but does not include audio data of incomplete audio frames, and
when audio frame data to be stored in a pack is shorter than the length of the pack, one of a padding packet and stuffing byte(s) is inserted into the pack.

10. A recording method for recording a video object obtained as a series of video object units by multiplexing an encoded video stream including a plurality of sets of picture data and at least one encoded audio stream including a plurality of sets of audio frame data, each set of picture data being a unit for decoding the video stream, each set of audio frame data being a unit for decoding the audio stream, each video object unit including complete sets of picture data that can be independently decoded and one or more sets of audio frame data, the method comprising the steps of:
encoding input signals received from outside to successively generate sets of picture data and sets of audio frame data;
successively multiplexing the generated sets of picture data and audio frame data to successively generate a series of video object units that comprise a video object;
recording the video object in one or more recording areas managed as a file using a file system program with the video object units being recorded as aligned portions in sequence within the file, characterized in that each video object unit has a length within a predetermined range and stores sets of picture data that can be independently completely decoded and one or more sets of audio frame data, the method further comprising dividing each of said video object units into a plurality of packs, a pack being a unit for reading/writing data from/on said disc;
arranging said one or more sets of audio frame data into audio packs out of said plurality of packs such that each of said audio packs includes audio data of one or more complete audio frames, an audio frame being audio data that can be independently decoded, but does not include audio data of incomplete audio frames; and
monitoring the length of the audio frame data and when audio frame data to be stored in a pack is shorter than the length of the pack, inserting one of a padding packet and stuffing byte(s) into the pack.

11. A recording method according to claim 10, wherein the recording step records the video object onto an optical disc.

12. A recording method according to claim 11, wherein the file system program is recorded on the optical disc.

13. A recording method according to claim 12, and comprising the step of re-recording a video object by using the file system program to control the over-writing one or more existing video object units with new video object units.

14. A recording method according to claim 11, and comprising the step of re-recording a video object by using the file system program to control the over-writing one or more existing video object units with new video object units.

15. A recording method according to claim 10, and comprising the step of re-recording a video object by using the file system program to control the over-writing one or more existing video object units with new video object units.

16. A recording method according to claim 15, and comprising means for re-recording a video object by using the file system program to control means for over-writing one or more existing video object units with new video object units.

17. A recording method according to claim 10, and comprising means for re-recording a video object by using the file system program to control means for over-writing one or more existing video object units with new video object units.

18. A recording method according to claim 10, wherein the recording means is arranged to record the video object onto an optical disc.

19. A recording apparatus for recording a video object obtained as a series of video object units by multiplexing an encoded video stream including a plurality of sets of picture data and at least one encoded audio stream including a plurality of sets of audio frame data, each set of picture data being a unit for decoding the video stream, each set of audio frame data being a unit for decoding the audio stream, each video object unit including complete sets of picture data that can be independently decoded and one or more sets of audio frame data, the apparatus comprising:

means for encoding input signals received from outside to successively generate sets of picture data and sets of audio frame data;

means for successively multiplexing the generated sets of picture data and audio frame data to successively generate a series of video object units that comprise a video object;

means for recording the video object in one or more recording areas managed as a file using a file system program with the video object units being recorded as aligned portions in sequence within the file, characterized in that each video object unit has a length within a predetermined range and stores sets of picture data that can be independently completely decoded and one or more sets of audio frame data, the apparatus further comprising means for dividing each of said video object units into a plurality of packs, a pack being a unit for reading/writing data from/on said disc;

means for arranging said one or more sets of audio frame data into audio packs out of said plurality of packs such that each of said audio packs includes audio data of one or more complete audio frames, an audio frame being audio data that can be independently decoded, but does not include audio data of incomplete audio frames; and means for monitoring the length of the audio frame data and activating means for inserting one of a padding packet and stuffing byte(s) into the pack when audio frame data to be stored in a pack is shorter than the length of the pack.

* * * * *

UNITED STATES PATENT AND TRADEMARK OFFICE
CERTIFICATE OF CORRECTION

PATENT NO. : 6,285,825 B1
DATED : September 4, 2001
INVENTOR(S) : Katsuhiko Miwa et al.

It is certified that error appears in the above-identified patent and that said Letters Patent is hereby corrected as shown below:

Column 23,
Line 38, "his" should be -- this --;
Line 39, "data." should be -- data --.

Column 25,
Line 2, "exceed," should be -- exceed --.

Signed and Sealed this

Nineteenth Day of March, 2002

Attest:

JAMES E. ROGAN
Director of the United States Patent and Trademark Office

Attesting Officer